(12) United States Patent
Reitter et al.

(10) Patent No.: US 7,831,586 B2
(45) Date of Patent: Nov. 9, 2010

(54) SYSTEM AND METHOD FOR APPLICATION PROGRAMMING INTERFACES FOR KEYWORD EXTRACTION AND CONTEXTUAL ADVERTISEMENT GENERATION

(75) Inventors: Alec Reitter, Palo Alto, CA (US); Barb Chang, San Francisco, CA (US); Ken Sun, Palo Alto, CA (US); Raghav Gupta, Sunnyvale, CA (US); Alvaro Bolivar, Santa Clara, CA (US); Alan Lewis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/645,946

(22) Filed: Dec. 27, 2006

(65) Prior Publication Data

US 2007/0288431 A1 Dec. 13, 2007

Related U.S. Application Data

(60) Provisional application No. 60/804,387, filed on Jun. 9, 2006.

(51) Int. Cl.
*G06F 7/00* (2006.01)
*G06F 17/30* (2006.01)

(52) U.S. Cl. ........................................ 707/709; 707/710
(58) Field of Classification Search ..................... 707/3, 707/9; 705/26, 6
See application file for complete search history.

(56) References Cited

U.S. PATENT DOCUMENTS

| | | | |
|---|---|---|---|
| 5,948,061 A | 9/1999 | Merriman et al. | |
| 6,907,566 B1 | 6/2005 | McElfresh et al. | |
| 6,981,040 B1 | 12/2005 | Konig et al. | |
| 7,089,195 B2 | 8/2006 | Rosenberg | |
| 7,587,357 B1 | 9/2009 | Buck | |

(Continued)

FOREIGN PATENT DOCUMENTS

WO  WO-2006128104 A2  11/2006

(Continued)

OTHER PUBLICATIONS

U.S. Appl. No. 11/646,012 Response filed Aug. 27, 2008 to Non-Final Office Action mailed Jun. 25, 2008, 24 pgs.

(Continued)

*Primary Examiner*—Charles Rones
*Assistant Examiner*—Fariborz Khoshnoodi
(74) *Attorney, Agent, or Firm*—Schwegman, Lundberg & Woessner, P.A.

(57) ABSTRACT

A computer-implemented system and method for keyword extraction and contextual advertisement generation are disclosed. The system in an example embodiment includes a keyword extraction service to receive from a consumer application a request for activation of a keyword extraction service via an application programming interface, the request including an identity of a content source, the request further including an identification of a particular extraction process to be used by the keyword extraction service on the identified content source; determine if the keyword extraction service has already processed the identified content source and retained extracted keywords in a data store; extract keywords from the identified content source using the particular extraction process identified in the request; and make the extracted keywords accessible to the consumer application.

12 Claims, 40 Drawing Sheets

U.S. PATENT DOCUMENTS

| | | | |
|---|---|---|---|
| 2002/0128925 A1* | 9/2002 | Angeles | 705/26 |
| 2002/0174174 A1 | 11/2002 | Ramraj et al. | |
| 2003/0001880 A1 | 1/2003 | Holtz et al. | |
| 2003/0001887 A1 | 1/2003 | Smith | |
| 2003/0110131 A1 | 6/2003 | Alain et al. | |
| 2004/0083133 A1 | 4/2004 | Nicholas et al. | |
| 2004/0143465 A1* | 7/2004 | Imanishi | 705/6 |
| 2004/0249816 A1* | 12/2004 | Tada | 707/9 |
| 2005/0004903 A1* | 1/2005 | Tsuda | 707/3 |
| 2005/0096980 A1 | 5/2005 | Koningstein | |
| 2005/0229224 A1* | 10/2005 | Matsumoto et al. | 725/100 |
| 2006/0020596 A1* | 1/2006 | Liu et al. | 707/6 |
| 2006/0111971 A1 | 5/2006 | Salesin et al. | |
| 2006/0271438 A1 | 11/2006 | Shotland et al. | |
| 2007/0061837 A1 | 3/2007 | Dadush | |
| 2007/0079326 A1 | 4/2007 | Datta et al. | |
| 2007/0100803 A1 | 5/2007 | Cava et al. | |
| 2007/0146812 A1 | 6/2007 | Lawton | |
| 2007/0157227 A1 | 7/2007 | Carpenter et al. | |
| 2007/0265979 A1 | 11/2007 | Hangartner | |
| 2007/0288454 A1 | 12/2007 | Bolivar et al. | |
| 2007/0288514 A1 | 12/2007 | Reitter et al. | |
| 2008/0022300 A1 | 1/2008 | Angiolillo et al. | |
| 2008/0040218 A1 | 2/2008 | van Dijk et al. | |
| 2008/0221987 A1 | 9/2008 | Sundaresan et al. | |
| 2008/0250452 A1* | 10/2008 | Iwamoto | 725/39 |
| 2008/0259906 A1 | 10/2008 | Shkedi | |
| 2009/0018904 A1 | 1/2009 | Shipman et al. | |
| 2009/0177531 A1 | 7/2009 | Dijk et al. | |
| 2009/0177546 A1 | 7/2009 | Dijk et al. | |

FOREIGN PATENT DOCUMENTS

| | | |
|---|---|---|
| WO | WO-2007052285 A2 | 5/2007 |
| WO | WO-2007145775 A2 | 12/2007 |
| WO | WO-2007145775 A3 | 12/2007 |
| WO | WO-2008005502 A2 | 1/2008 |
| WO | WO-2008005502 A3 | 1/2008 |
| WO | WO-2009/009073 A1 | 1/2009 |

OTHER PUBLICATIONS

U.S. Appl. No. 11/646,012 Final Office Action mailed Jan. 23, 2009, 12 pgs.

U.S. Appl. No. 11/646,012, Non-Final Office Action mailed Jun. 25, 2008, 10 pgs.

U.S. Appl. No. 11/646,039 Response filed Oct. 27, 2008 to Non-Final Office Action mailed Jun. 27, 2008, 11 pgs.

U.S. Appl. No. 11/646,039 Final Office Action mailed Jan. 8, 2009, 11 pgs.

U.S. Appl. No. 11/646,039 Non-Final Office Action mailed Jun. 27, 2008, 11 Pgs.

U.S. Appl. No. 11/773,673 Response filed Jun. 10, 2008 to Non-Final Office Action mailed Feb. 28, 2008, 9 pgs.

U.S. Appl. No. 11/773,673, Response filed Jan. 23, 2009 to Final Office Action mailed Sep. 23, 2008, 12 pgs.

U.S. Appl. No. 11/773,673, Non-Final Office Action mailed Feb. 28, 2008, 10 Pgs.

U.S. Appl. No. 11/773,673 Final Office Action mailed Sep. 23, 2008, 9 pgs.

International Application Serial No. PCT/US2007/011992, Search Report mailed Jul. 15, 2008, 5 pgs.

International Application Serial No. PCT/US2007/011992, Written Opinion mailed Jul. 15, 2008, 4 pgs.

International Application Serial No. PCT/US2008/008431 Search Report & Written Opinion mailed on Oct. 1, 2008, 11 pgs.

U.S. Appl. No. 11/646,012 Non-Final Office Action mailed Jul. 2, 2009, 13 pgs.

U.S. Appl. No. 11/646,012, Response filed Apr. 23, 2009 to Final Office Action mailed Jan. 23, 2009, 14 pgs.

U.S. Appl. No. 11/646,039, Non-Final Office Action mailed Jul. 6, 2009, 15 pgs.

U.S. Appl. No. 11/646,039, Response filed May 8, 2009 to Final Office Action mailed jan. 8, 2009, 12 pgs.

U.S. Appl. No. 11/773,673, Non-Final Office Action mailed Mar. 4, 2009, 13 pgs.

U.S. Appl. No. 11/773,673, Response filed Jun. 4, 2009 to Non Final Office Action mailed Mar. 4, 2009, 14 pgs.

"U.S. Appl. No. 11/646,012, Response filed Jun. 11, 2010 to Final Office Action mailed Jan. 11, 2010", 13pgs.

"U.S. Appl. No. 11/646,039, Response filed Jun. 14, 2010 to Final Office Action mailed Jan. 13, 2010", 13 pgs.

"U.S. Appl. No. 11/773,673, Response filed Jun. 15, 2010 to Non Final Office Action mailed Jan. 15, 2010", 10 pgs.

"U.S. Appl. No. 11/774,671, Response filed Apr. 12, 2010 to Non Final Office Action mailed Dec. 11, 2010", 10 pgs.

"U.S. Appl. No. 12/347,887, Final Office Action mailed Apr. 26, 2010", 10.

"U.S. Appl. No. 12/347,893, Final Office Action mailed Apr. 21, 2010", 10.

"U.S. Appl. No. 12/347,893, Response filed Feb. 1, 2010 to Non Final Office Action mailed Oct. 1, 2009", 10 pgs.

"Australian Application Serial No.2007269597, First Examination Report Mailed Feb. 3, 2010", 2 Pages.

"International Application Serial No. PCT/US2007/015494, Search Report mailed Mar. 21, 2008", 3 pgs.

"International Application Serial No. PCT/US2007/015494, Written Opinion, mailed Mar. 21, 2008", 6 pgs.

"U.S. Appl. No. 11/773,673 Final Office Action Mailed Sep. 15, 2009", 14 pgs.

"U.S. Appl. No. 11/646,012, Final Office Action mailed Jan. 11, 2010", 16 pgs.

"U.S. Appl. No. 11/646,012, Response filed Oct. 2, 2009 to Non Final Office Action mailed Jul. 2, 2009", 14 pgs.

"U.S. Appl. No. 11/646,039, Final Office Action mailed Jan. 13, 2010", 15 pgs.

"U.S. Appl. No. 11/646,039, Response filed Nov. 5, 2009 to Non Final Office Action mailed Jul. 6, 2009", 11 pgs.

"U.S. Appl. No. 11/773,673, Response filed Nov. 13, 2009 to Final Office Action mailed Sep. 15, 2009", 13 pgs.

"U.S. Appl. No. 11/774,671, Non-Final Office Action mailed Dec. 11, 2009", 11 pgs.

"U.S. Appl. No. 12/347,887, Non-Final Office Action mailed Sep. 23, 2009", 11 pgs.

"U.S. Appl. No. 12/347,887, Response filed Dec. 23, 2009 to Non Final Office Action mailed Sep. 23, 2009", 10 pgs.

"U.S. Appl. No. 12/347,893, Non-Final Office Action mailed Oct. 1, 2009", 11 pgs.

"U.S. Appl. No. 11/773,673, Non-Final Office Action mailed Jan. 15, 2010", 12 Pgs.

"European Application No. 07796696.8, Office Action Mailed Dec. 22, 2009", 1 pg.

"European Application No. 07796696.8, EP search report mailed Sep. 28, 2009", 7 pgs.

"Notice from the European Patent Office dated Oct. 1, 2007 concerning business methods", *Official Journal of the European Patent Office*, 30(11), (Nov. 1, 2007), 592-593.

* cited by examiner

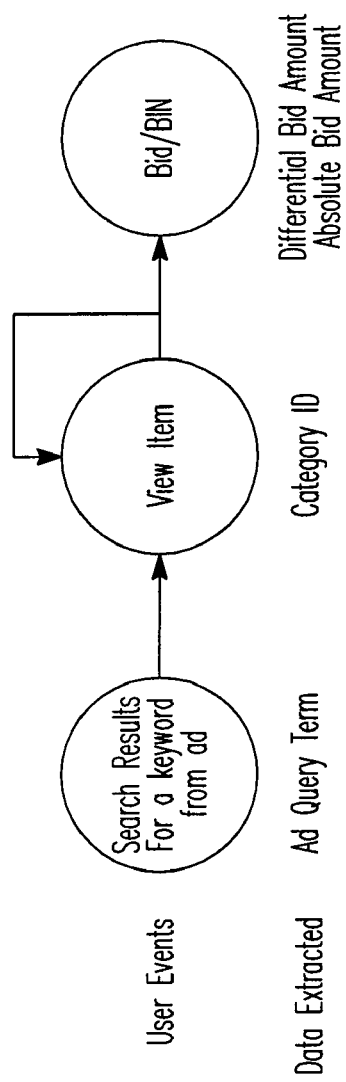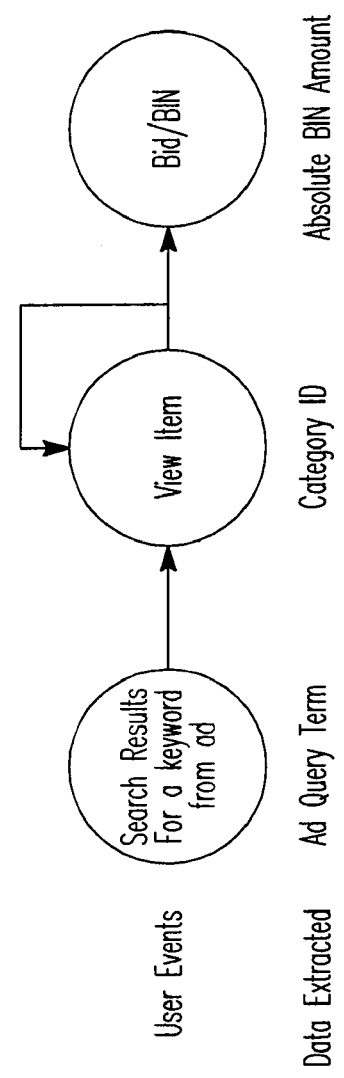

Step 2:
EK server normalizes the values and assigns a probability between 0 and 1 to each keyword + category combination

| Keyword Extractor | | | EK Server |
|---|---|---|---|
| Keyword | Category | Value | Probability |
| iPod | MP3 Players | 45 | 0.52 |
| Nano | MP3 Players | 20 | 0.23 |
| MP3 | Portable Audio | 10 | 0.11 |
| Apple | Electronics | 7 | 0.08 |
| Headphones | Accessories | 5 | 0.06 |
| | | 87 | 1.00 |

Step 4:
To populate Slot 2, "Nano" is removed from the keyword list and Step 3 is repeated.

| Keyword Extractor | | | EK Server |
|---|---|---|---|
| Keyword | Category | Value | Probability |
| iPod | MP3 Players | 45 | 0.67 |
| MP3 | Portable Audio | 10 | 0.15 |
| Apple | Electronics | 7 | 0.10 |
| Headphones | Accessories | 5 | 0.07 |
| | | 67 | 1.00 |

*FIG. 17*

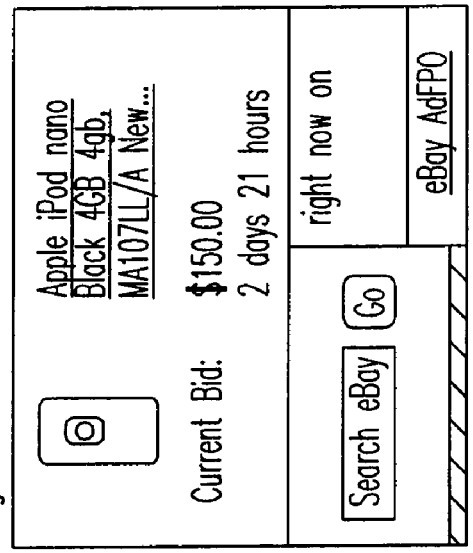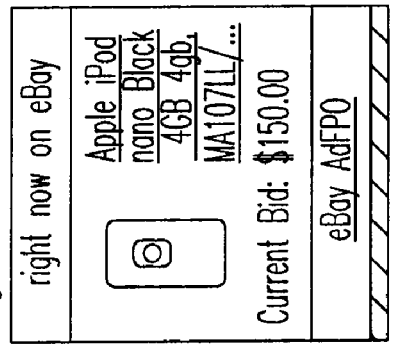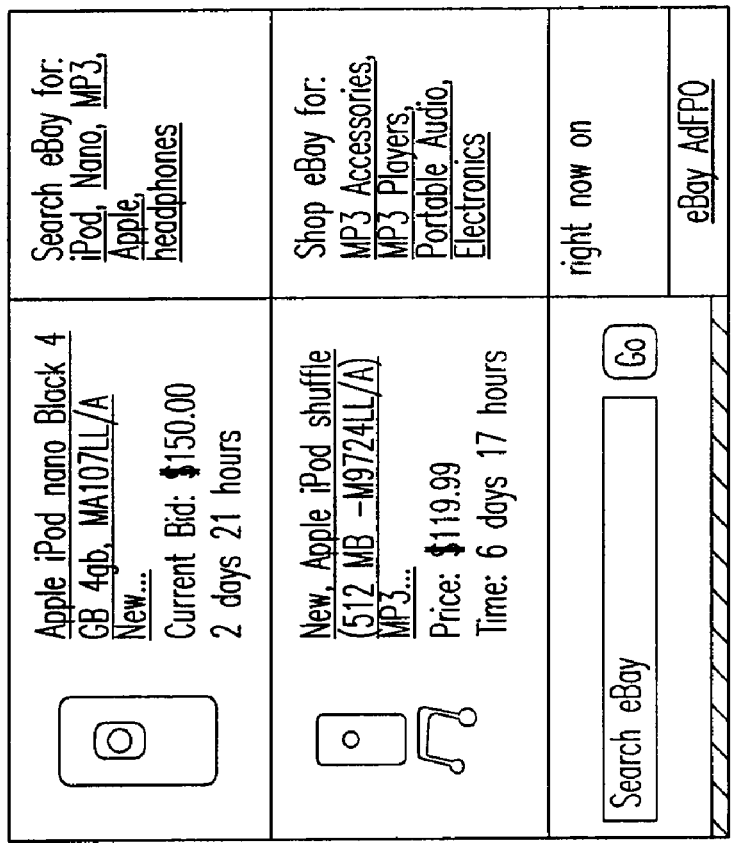
FIG. 18

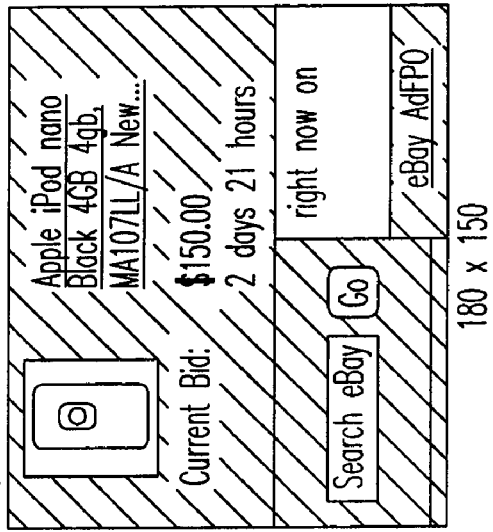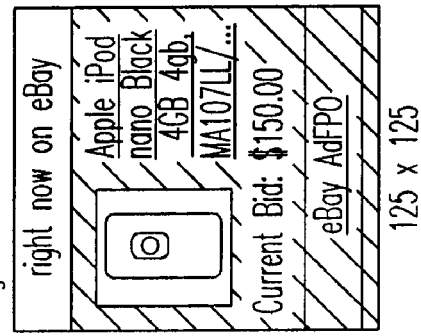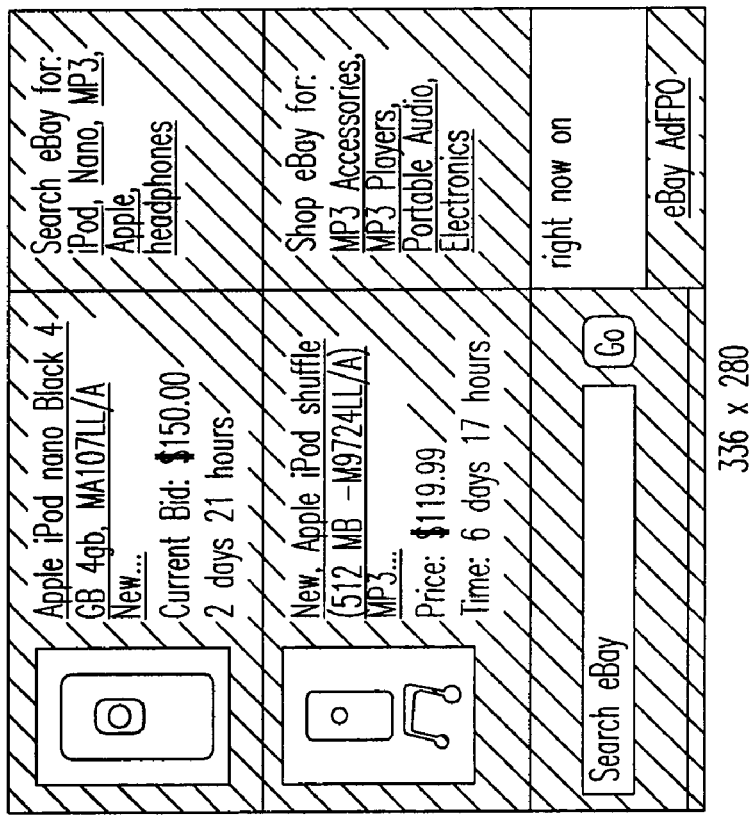
FIG. 19

| right now on eBay |
|---|
| Apple iPod nano Black 4 GB 4gb. MA107LL/A New... Current Bid $150.00 2 days 21 hours Search eBay for: iPod, Nano, MP3, Apple, headphones |
| eBay AdAFPO |

180 x 150

| right now on eBay |
|---|
| Apple iPod nano Black 4 GB 4gb MA107LL/A New in Box Get it... Current Bid $150.00 6 days 17 hours |
| eBay AdAFPO |

125 x 125

| Apple iPod nano Black 4 GB 4gb. MA107LL/A New... Current Bid $150.00 2 days 21 hours | New Apple iPod shuffle (512 MB – M9724LL/A) MP3... Price: $119.00 6 ays 17 hours | New Apple iPod shuffle (512 MB – M9724LL/A) MP3... Price: $119.00 6days 17 hours |
|---|---|---|
| Apple iPod nano Black 4 GB 4gb. MA107LL/A New... Current Bid $150.00 2 days 21 hours | New Apple iPod shuffle (512 MB – M9724LL/A) MP3... Price: $119.00 6 days 17 hours | Search eBay for: iPod, Nano, MP3, Apple, headphones |
| Apple iPod nano Black 4 GB 4qb. MA107LL/A New... Current Bid $150.00 2 days 21 hours | New Apple iPod shuffle (512 MB – M9724LL/A) MP3... Price: $119.00 6 days 17 hours | Shop eBay for: MP3 Accessories, MP3 Players, Portable Audio, Electronics |
| right now on eBay | | eBay AdWindow |

Home > Affiliates > Tools eBay Affiliate Program home | pay | register | service | site map

Buy | Sell | My eBay | Community | Help

Hello! Sign in/out

Start new search [Search]
Advanced Search
Powered By IBM

Choose a Topic

Welcome
Learning Center
Program Details
eBay Ads
Tools
- Flexible Destination Tool
- Keyword Linking
- Dynamic Landing Pages
- Shopper ID
- More Tools Best Practies
API Developer Kit

Tools

The eBay Affiliate Program strives to provide our affiliate community with the most advanced applications and tools available. The eBay Affiliate Toolbox consists of tools and products relevant for all affiliate and compatible with all business models.

*Flexible Destination Tool*

⊗ xxxxx
  xxxxxx
  xxxxxx

⊗ xxxxx
  xxxxxx
  xxxxxx

Instantly create trackable links to any eBay URL.

*Keyword Linking Tool* xxxx Keyword xxxx xxxx xxxxx xxxxx
xxxxx
xxxxx
xxxxx
xxxxx

Choose xxxx Page type
○ xxxxx xxxxx xxxx
  xxxxx xxxxx xxxx

Search By [Keyword]

Easily create 1,000's of customized affiliate links.

Continued on next page

*FIG. 24a*

CHOOSE CONTENT ⓘ
CONTENT SELECTION
MANUAL ▼
ENTER KEYWORDS * ⓘ

☐ SEARCH BOTH TITLE AND DESCRIPTION TO FIND MORE DESCRIPTIONS

*FIG. 26*

HOME > COMMUNITY > AFFILIATE PROGRAM > CREATE EBAY AD > TEXT AND IMAGE eBAY AFFILIATE PROGRAM : TEXT AND IMAGE  Comments  Customize  Help CHOOSE THE CONTENT AND SEE THE PREVIEW
- SUMMARY TEXT TO SET CONTEXT FOR THIS PAGE
-

CHOOSE CONTENT ⓘ

CONTENT SELECTION
[ AUTOMATIC ▼ ]

WEB ADDRESS * ⓘ
[ HTTP:// ]

CATEGORIES (OPTIONAL) ⓘ
- CLOTHING SHOES & ACCESSORIES > WEDDING APPAREL > BRIDES MADE DRESSES | REMOVE
- CLOTHING SHOES & ACCESSORIES > WEDDING APPAREL > BRIDES MADE DRESSES | REMOVE

CHANGE CATEGORIES

SELECTED CATEGORIES DISPLAY

ADVANCED OPTIONS (OPTIONAL)
NO ADVANCED OPTIONS HAVE BEEN SELECTED
ADVANCED OPTIONS

ENTER TRACKING SERVICE ⓘ

PROVIDER
[ ▼ ]

TRACKING ID (LEARN MORE)
[ ]

NOT AN AFFILIATE? JOIN NOW

[ PREVIEW ] | REFRESH PAGE | RESET

HOME > COMMUNITY > AFFLIATE PROGRAM > CREATE eBAY AD > TEXT AND IMAGE

| eBAY AFFILIATE PROGRAM: TEXT AND IMAGE | | | |
|---|---|---|---|
| Choose the content and see the preview<br>• Summary text to set context for this page<br>• | Comments | Customize | Help |

CHOOSE CONTENT  (?)

CONTENT SELECTION

[AUTOMATIC ▽]

WEB ADDRESS * (?)

[http://]

CATEGORY (optional) (?)
• BABY > CAR SAFETY SEATS > INFANT HEAD SUPPORT
CHANGE CATEGORY ADVANCED OPTIONS (optional)
No advanced options have been selected
ADVANCED OPTIONS Enter Tracking Services (?)

PROVIDER [▽]     TRACKING ID (Learn more) [    ]

Not an affiliate? Join now

[Preview]   |   Reset

Preview Area

Color Theme: [Default ▽]
Status 120 x 60

| Apple kPod nano Black 4 GB 4gb, MA107II... Current Bid $119.99 | Search eBay for iPod, Nano, MP3, headphones | Shop at eBay for: MP3 Accessories, MP3 Players | right move on eBay eBay AdFPO |

```
<a href="http://www.ebaywindow.com/?
q=affiliatesaid=0&t=188"><img
border="0"
```

[Copy Code]

Size: 128 x 88

| | Apple kPod nano Black4 GB 4gb, MA107LL/A New... Current Bid $150.00 2 days 21 hours | Search eBay for iPod, Nano, MP3, headphones |
| | New Apple iPod | |

*FIG. 32*

| Picture | Product | Price | Bids | Time Left |
|---|---|---|---|---|
| Gallery Image | Content Sample – iPod 20 gb New | $85.25 | 5 | 2h 30m |
| Gallery Image | Content Sample – iPod 20 gb New | $85.25 | 5 | 2h 30m |

The title should go here — Custom Ad Title Text

View all 122 items on eBay    Disclaimer

FIG. 36

SYSTEM AND METHOD FOR APPLICATION PROGRAMMING INTERFACES FOR KEYWORD EXTRACTION AND CONTEXTUAL ADVERTISEMENT GENERATION

CROSS-REFERENCE TO RELATED PATENT APPLICATIONS

This patent application claims the benefit of the filing date of U.S. Provisional Patent Application Ser. No. 60/804,387, filed Jun. 9, 2006, and entitled, "SYSTEM AND METHOD FOR KEYWORD EXTRACTION AND CONTEXTUAL ADVERTISEMENT GENERATION", the content of which is incorporated by reference herein.

BACKGROUND

1. Technical Field

This disclosure relates to methods and systems supporting online advertising and online transactions by a user. More particularly, the present disclosure relates to application programming interfaces for keyword extraction and contextual advertisement generation.

2. Related Art

An increasingly popular way of delivering Internet advertisements is to tie the presentation of advertisements to particular user behaviors and/or user profiles, and/or user demographics. Such user behaviors include user access to a particular web page, user selection (also called mouse-clicking or clicking) of a particular location on a web page, user entry of a particular search string or keyword, and the like. In order to target advertising accurately, advertisers or vendors pay to have their advertisements presented in response to certain kinds of events--that is, their advertisements are presented when particular user behaviors warrant such presentation. If a particular advertisement (ad) leads to some user action, an advertiser may receive remuneration for the ad.

Using other systems and processes on the Web, users can search for goods and services via the Internet and shop or make purchases of goods or services over the Internet. Unfortunately, conventional systems have not been able to create an effective way of extracting keywords from web pages and create contextual advertisements that may lead to a user purchase transaction.

Some conventional web-based merchants use affiliate programs. In an affiliate program, the merchant itself must track purchase transactions and reward $3^{rd}$ party affiliates when purchase transactions are completed. This transaction tracking and rewarding process imposes a significant administrative burden on the merchant. Moreover, the tracking/reward functionality must be replicated for each merchant that chooses to use such a system. Current technology does not provide a solution for off-loading this tracking/reward functionality to a $3^{rd}$ party without risking an increase in fraudulent transactions and a decrease in the time-efficiency of processing purchase transactions.

U.S. Pat. No. 5,948,061 discloses methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisements based upon profiling of users and networks.

BRIEF DESCRIPTION OF THE DRAWINGS

Embodiments illustrated by way of example and not limitation in the figures of the accompanying drawings, in which.

Figure 3:
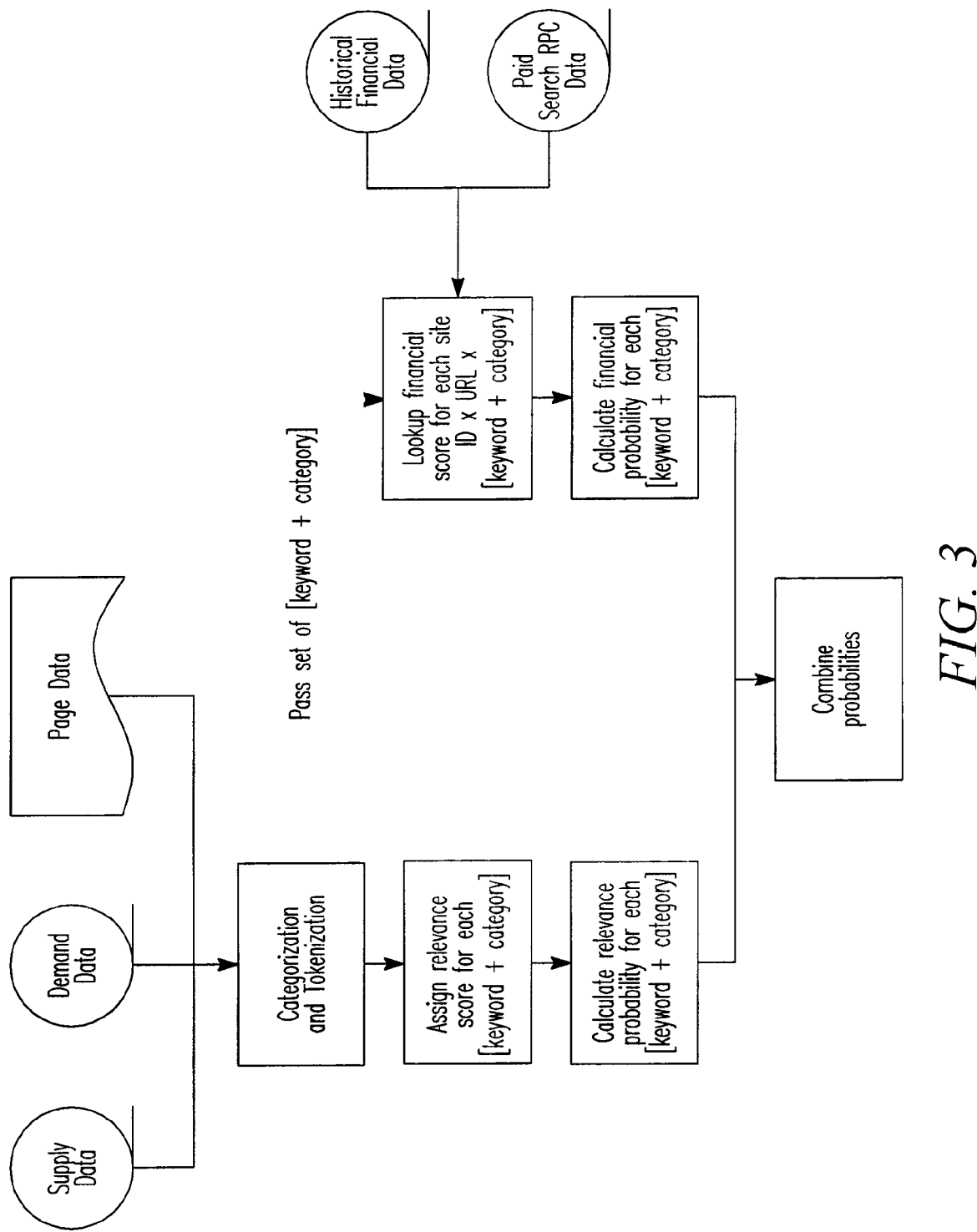

The overall keyword ranking process in an example embodiment is illustrated in FIG. 3.

Figure 4:
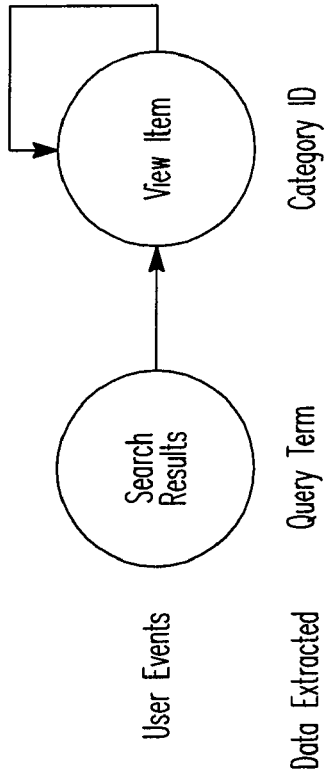

FIG. 4 illustrates a graph showing association of category ID to query term in an example embodiment.

Figure 5:
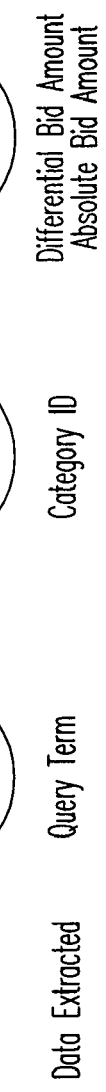

FIG. 5 illustrates a graph showing association of bid amounts to query term.

Figure 6:
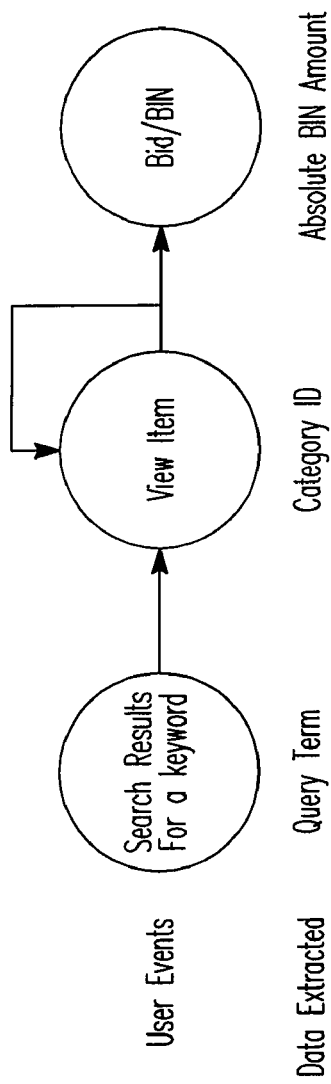

FIG. 6 illustrates a graph showing association of BIN amount to query term.

Figure 7:
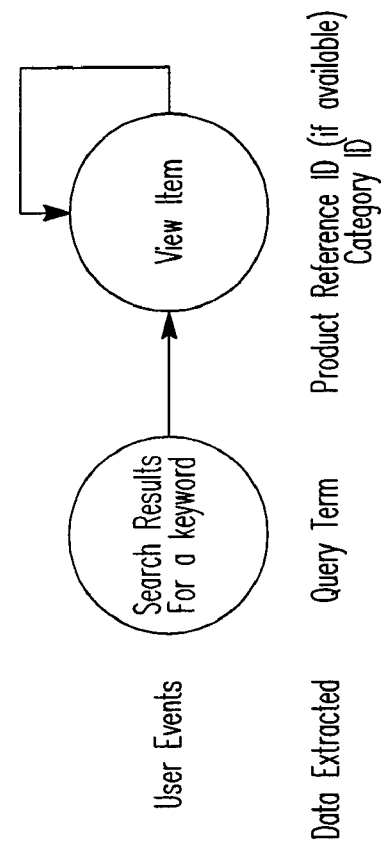

FIG. 7 illustrates a graph showing association of product reference ID to query term.

FIG. 8 illustrates a graph showing association of Bid amounts to ad query term.

FIG. 9 illustrates a graph showing association of BIN amount to query term.

Figure 10:
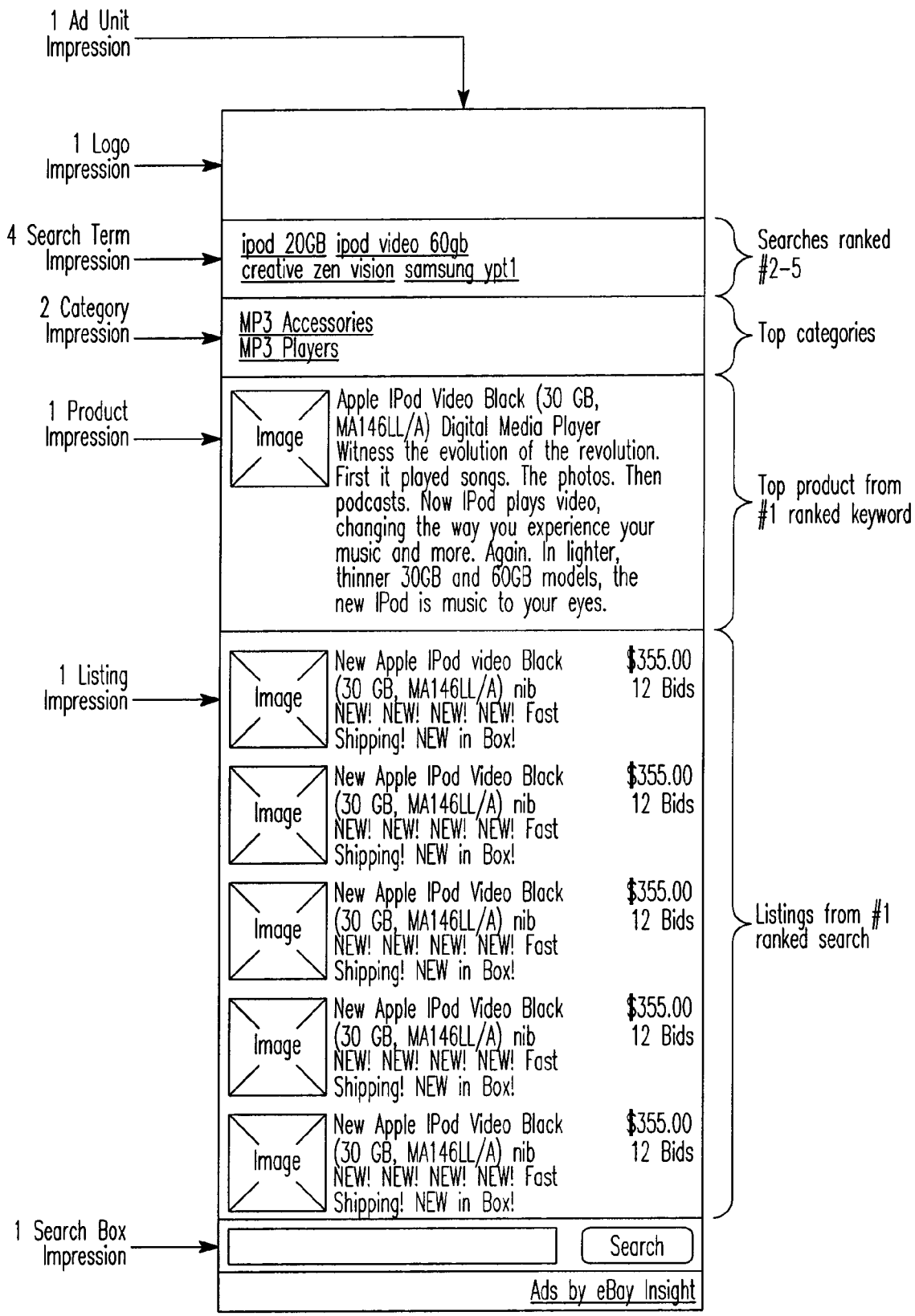

A user interface in an example embodiment is presented in FIG. 10 as a generic mockup showing impressions generated from one ad unit.

Figure 11:
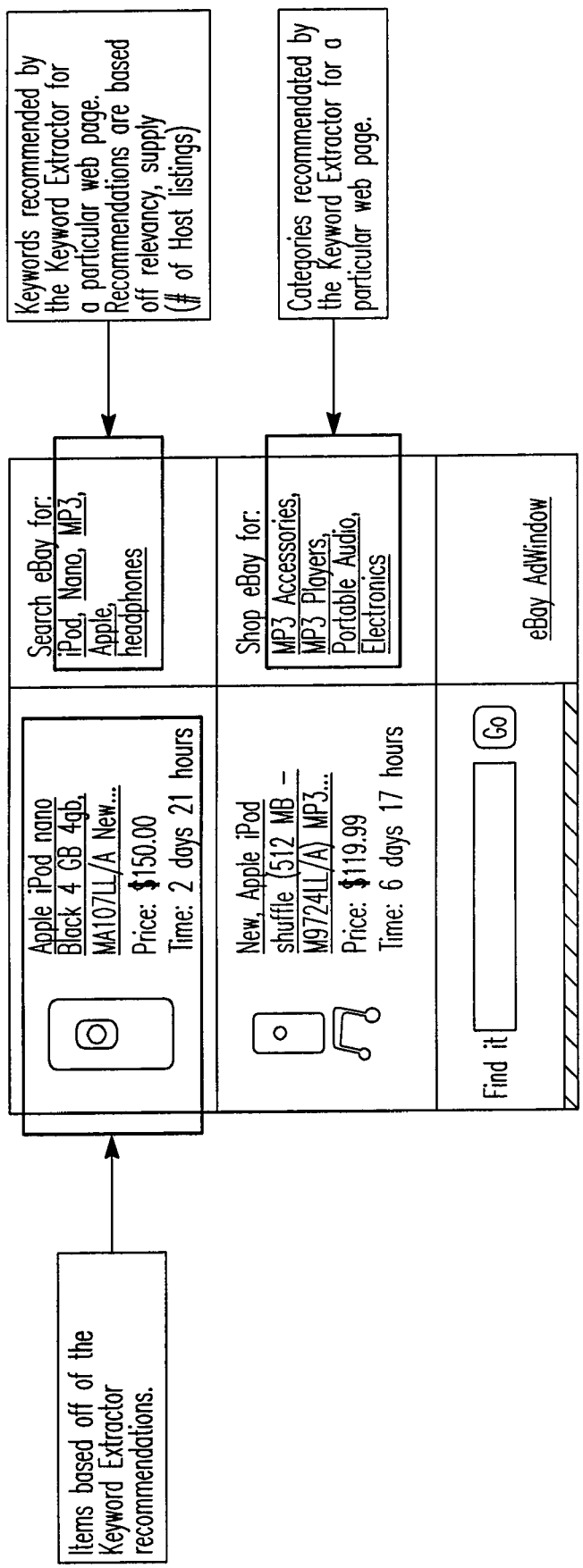

An example of the contextual ad is illustrated in FIG. 11.

Figure 12:
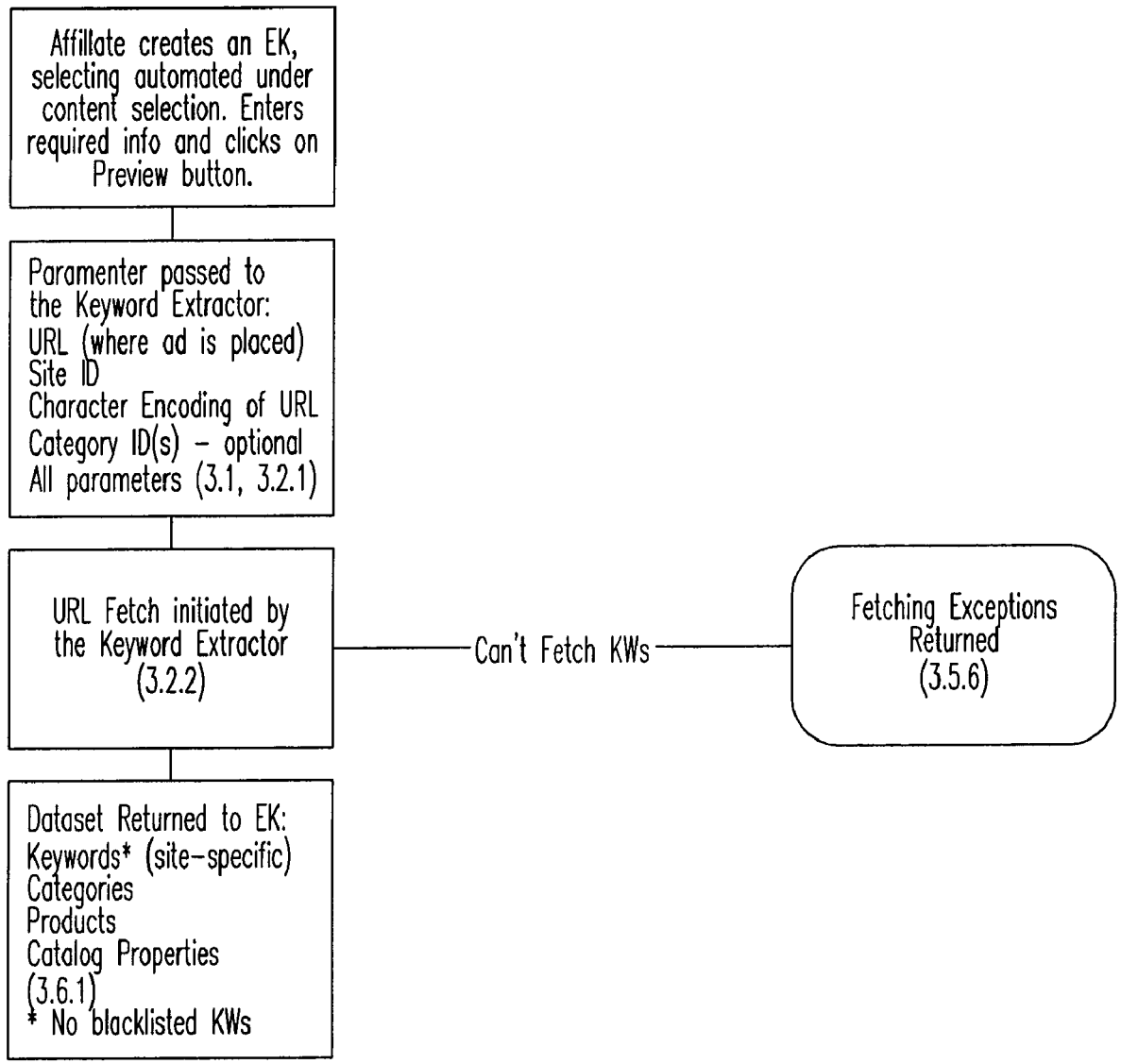

FIG. 12 illustrates an example of a real-time preview in an example embodiment.

Figure 13:
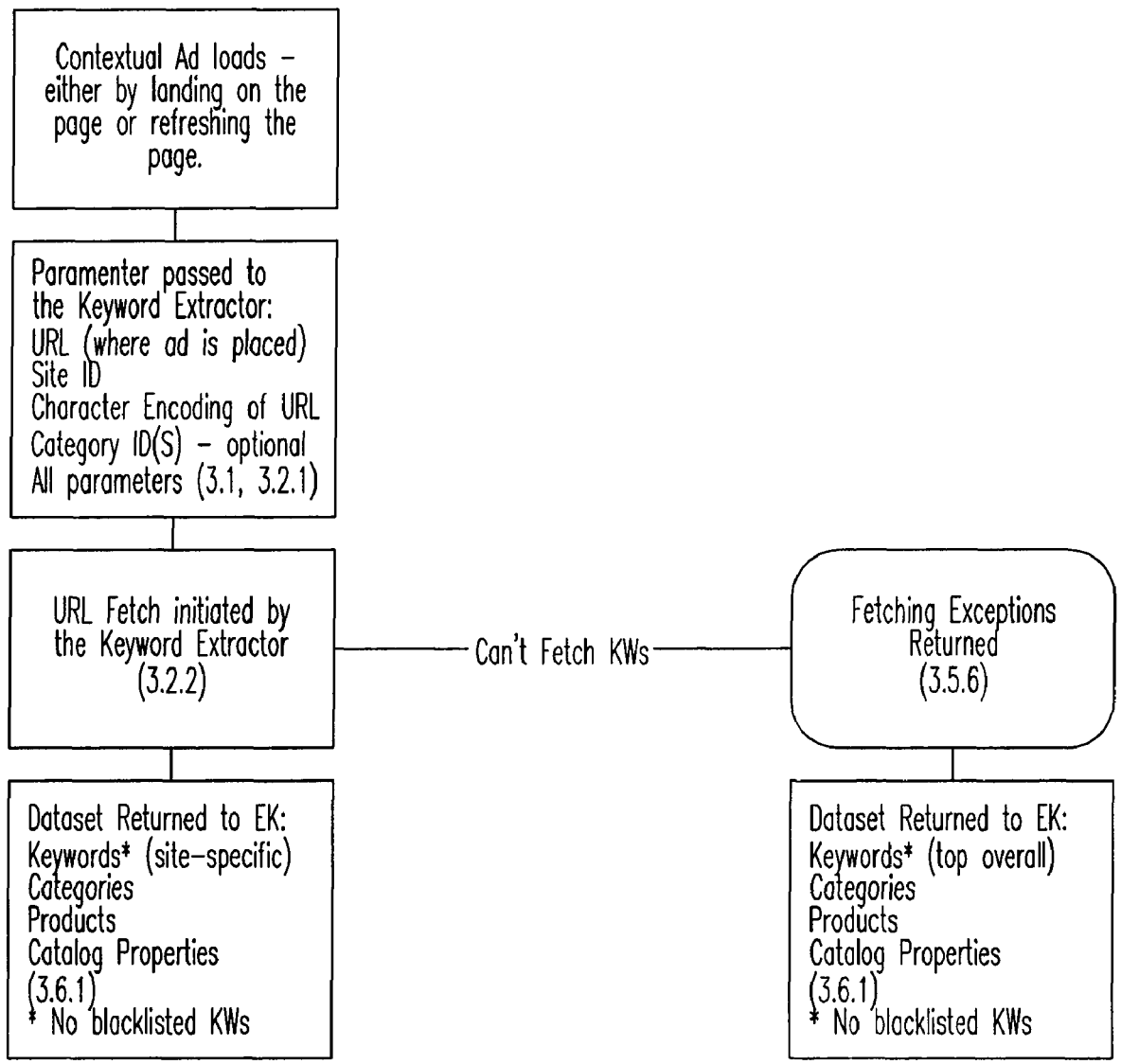

FIG. 13 illustrates an example of an EK to KE interface interaction for various embodiments.

14-17 illustrate a flowchart to diagram the slot selection process in an example embodiment.

Graphic and text ads are available with a fixed color scheme as pictured in FIG. 18 in an example embodiment.

Examples of customizable ads are pictured in FIG. 19 in an example embodiment.

Examples of the text ads are pictured in FIG. 20 in an example embodiment.

Figure 21:
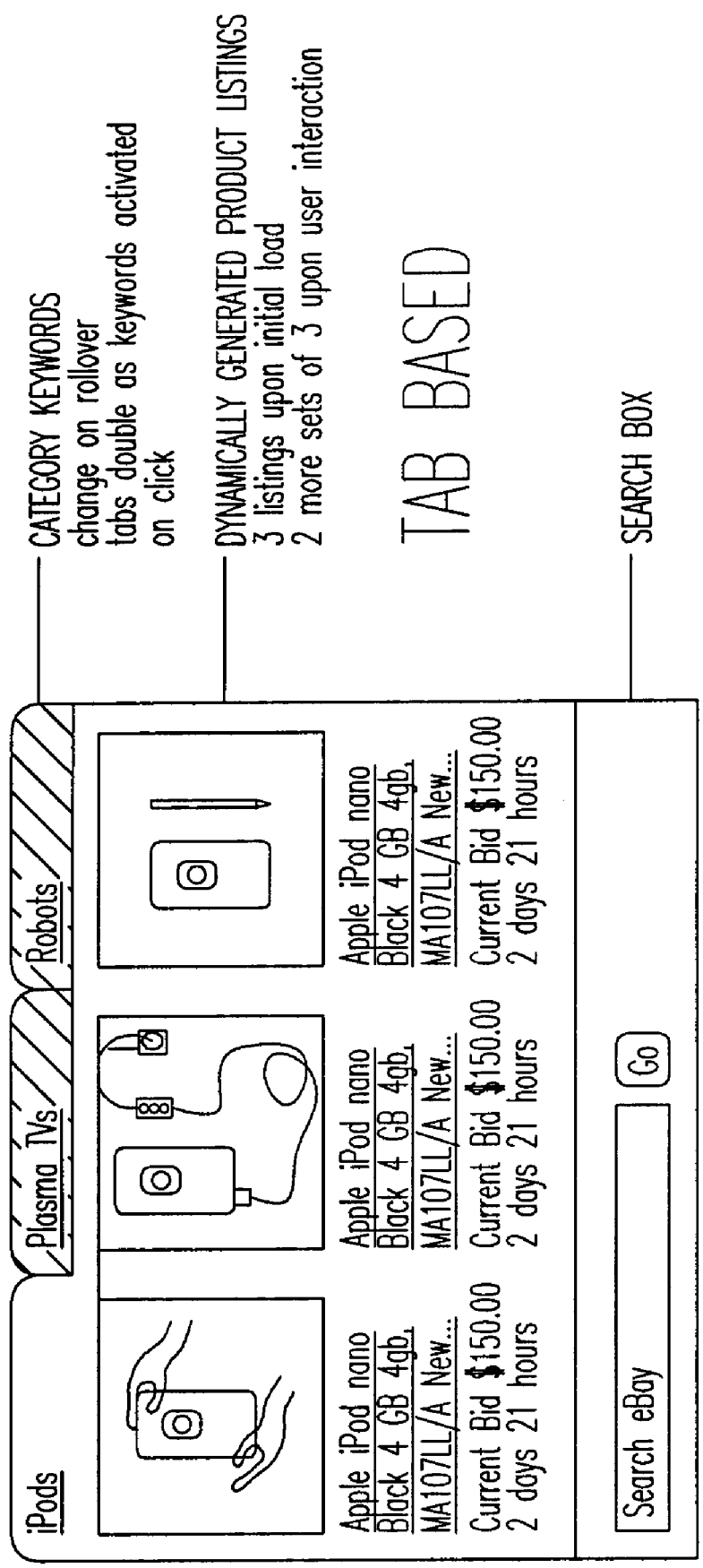

A visual example of the tab-based flash ad in an example embodiment is shown in FIG. 21.

Figure 22:
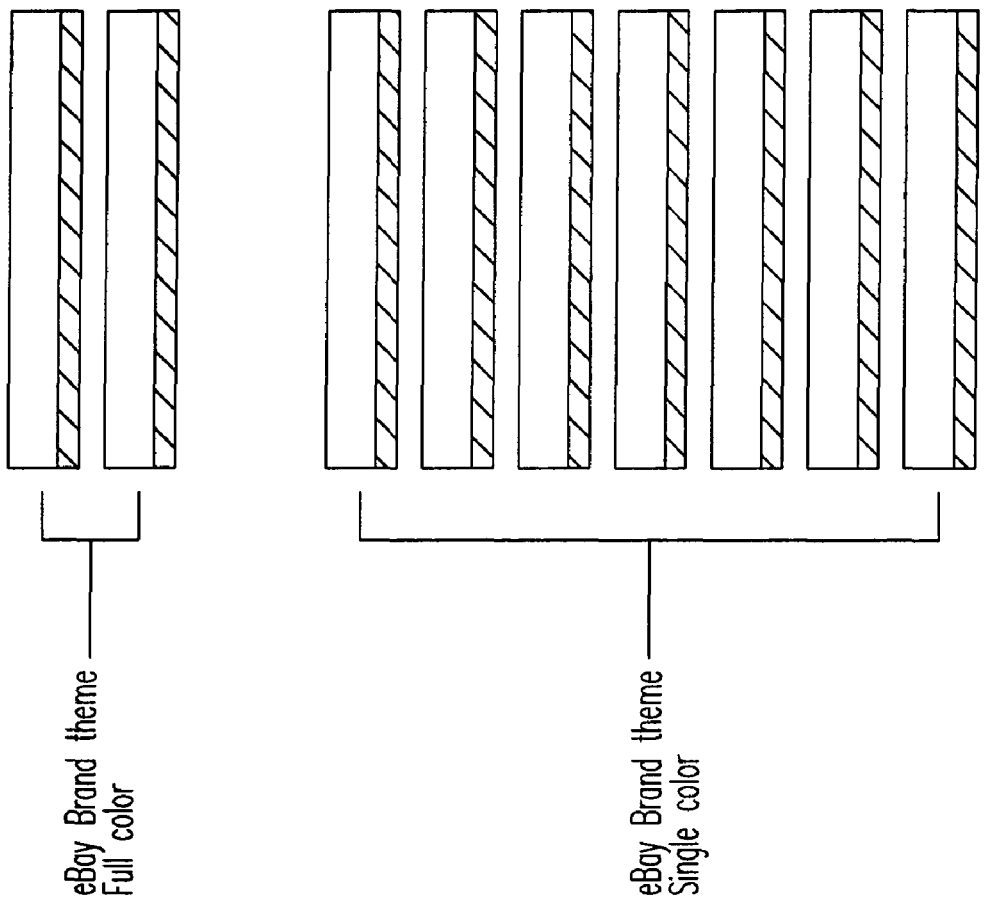

FIG. 22 illustrates fixed color theme examples in an example embodiment.

Figure 23:
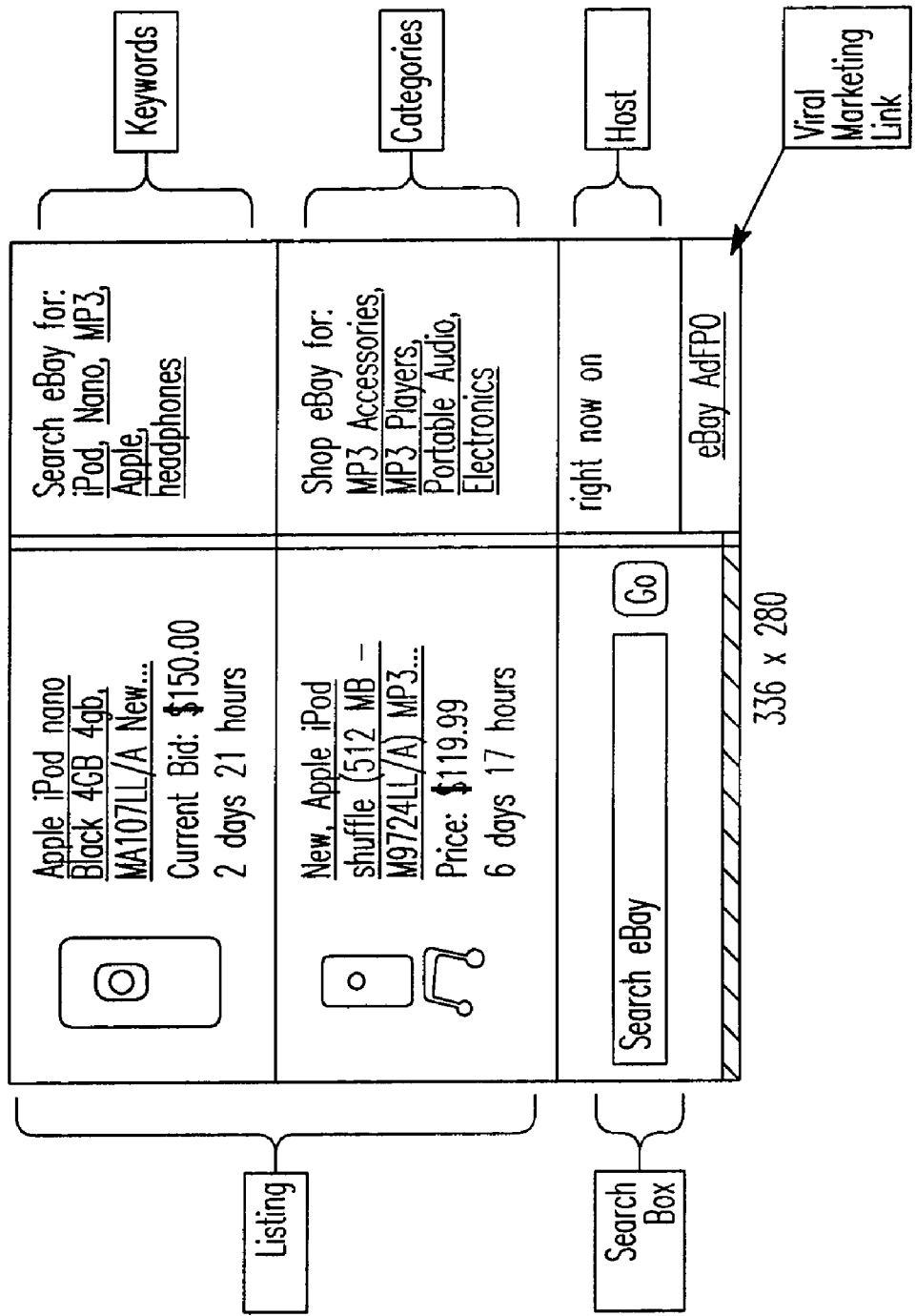

FIG. 23 illustrates an Ad Components Legend in an example embodiment.

An example of a Host Tools page is illustrated in FIG. 24 for an example embodiment.

Figure 25:
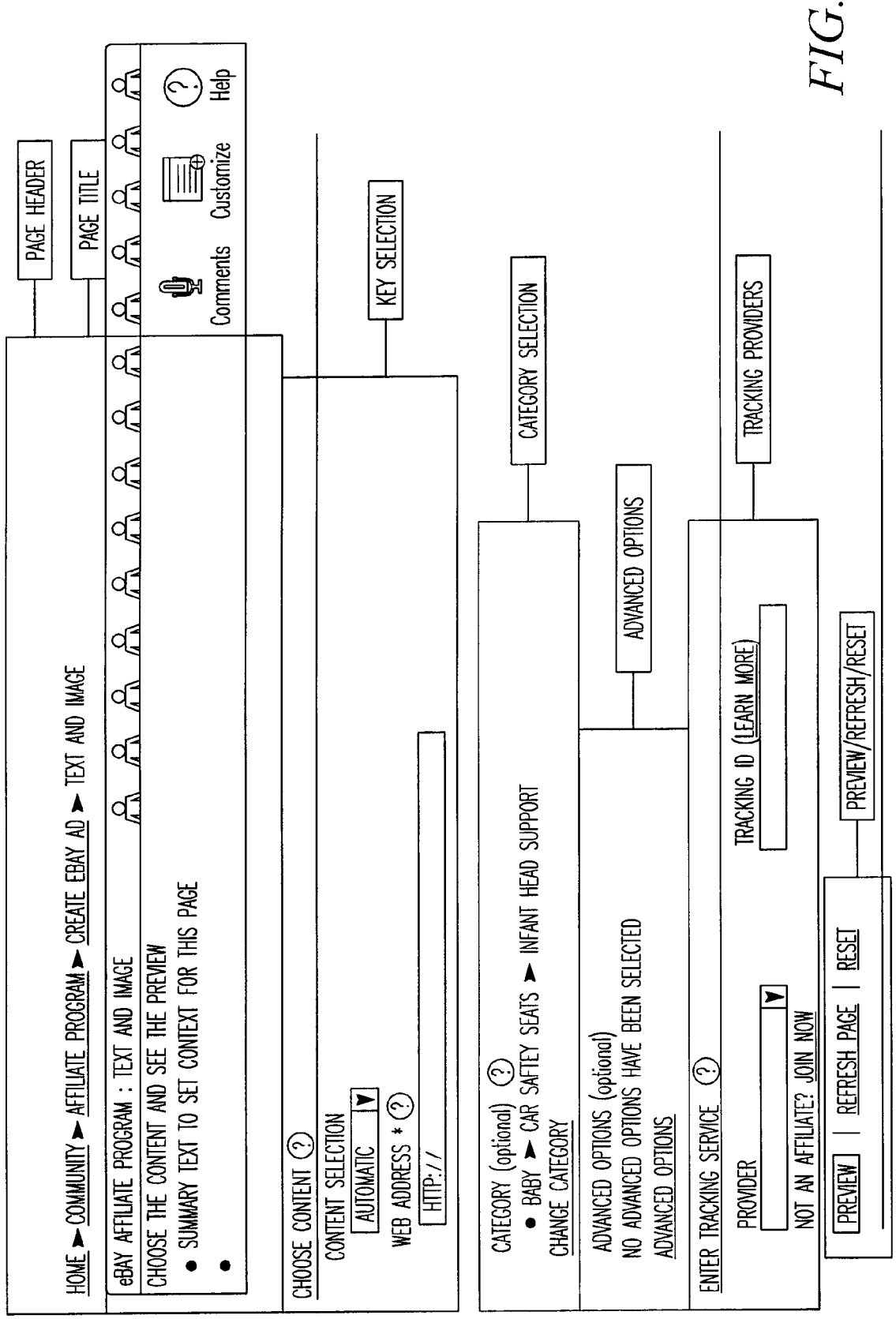

An example of a "Create Your Own Ad page" is illustrated in FIG. 25 for an example embodiment.

An example of choosing manual content is shown in FIG. 26 for an example embodiment.

Figure 27:
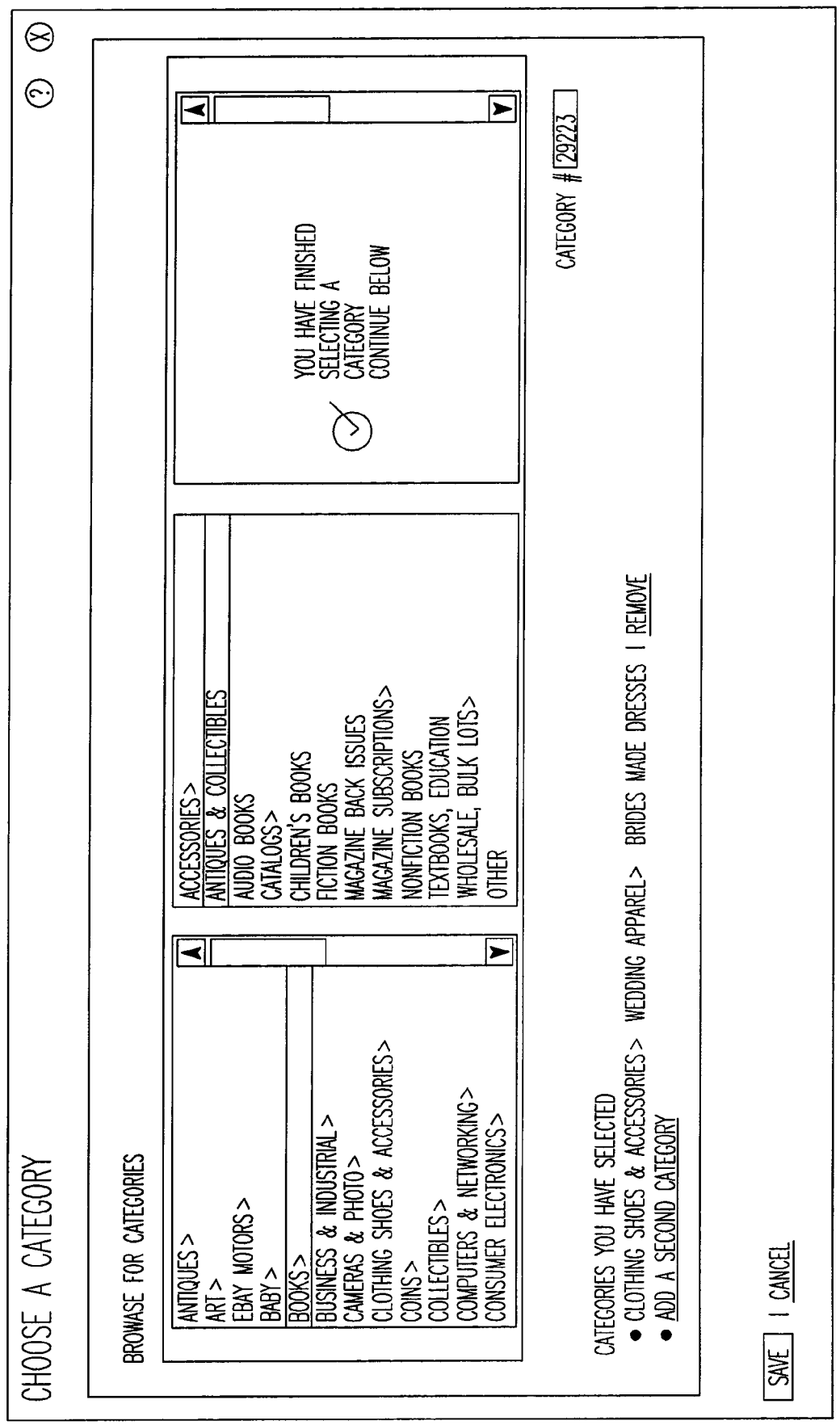
Figure 28:
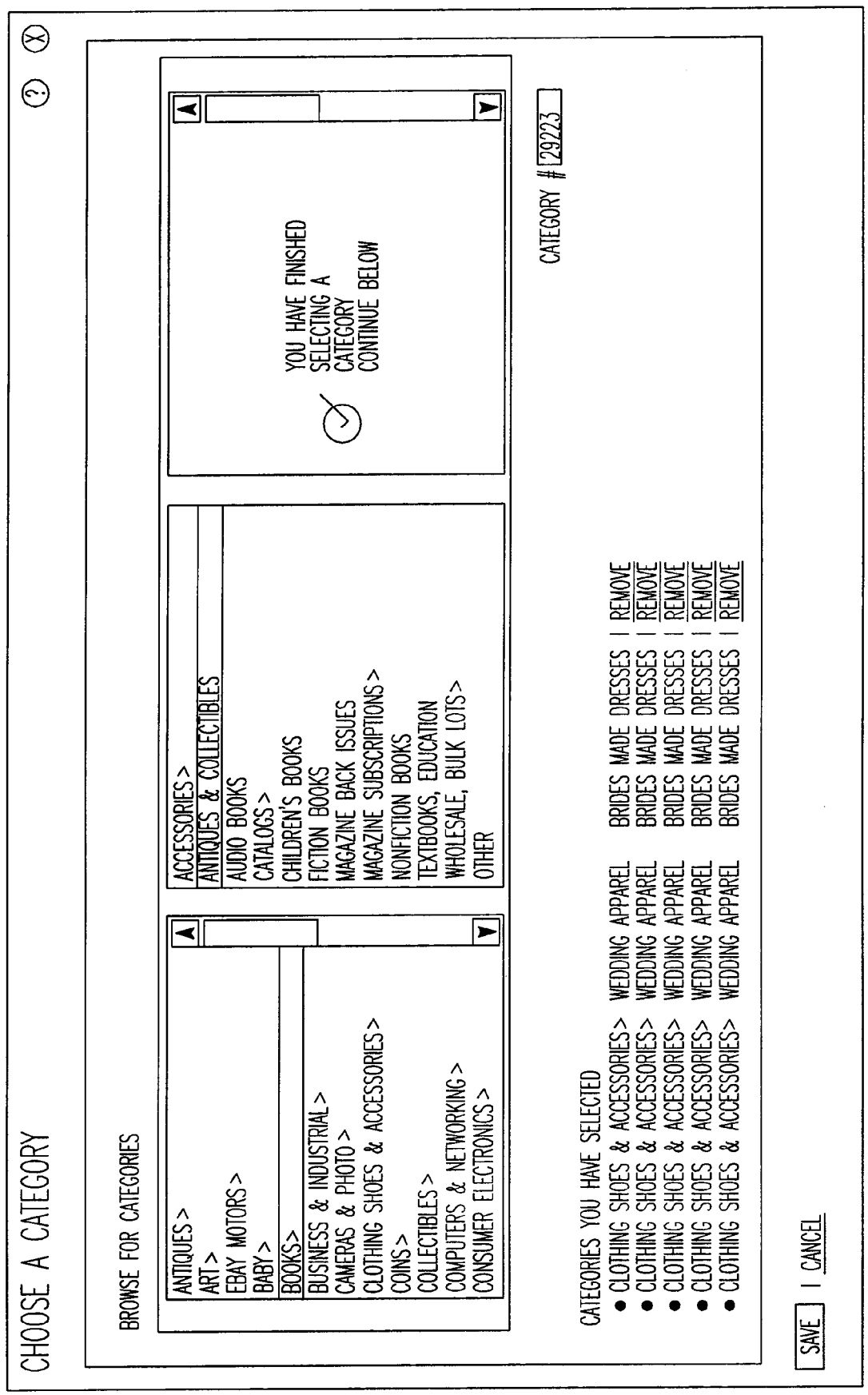

FIGS. 27 and 28 illustrate category selection in an example embodiment.

FIG. 29 illustrates the selected category display mock-up for an example embodiment.

Figure 30:
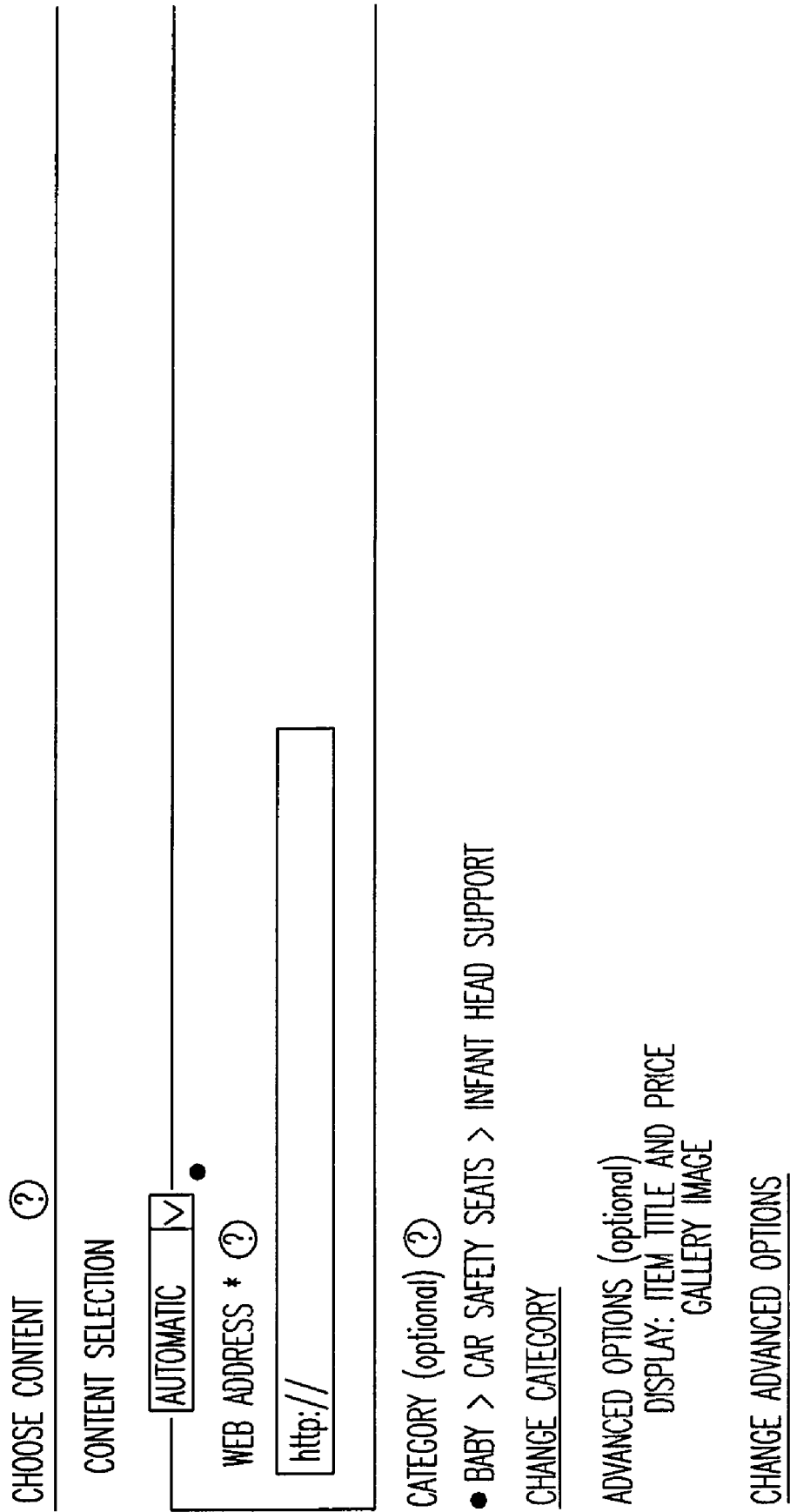

FIG. 30 illustrates the selected advanced options mock-up for an example embodiment.

Figure 31:
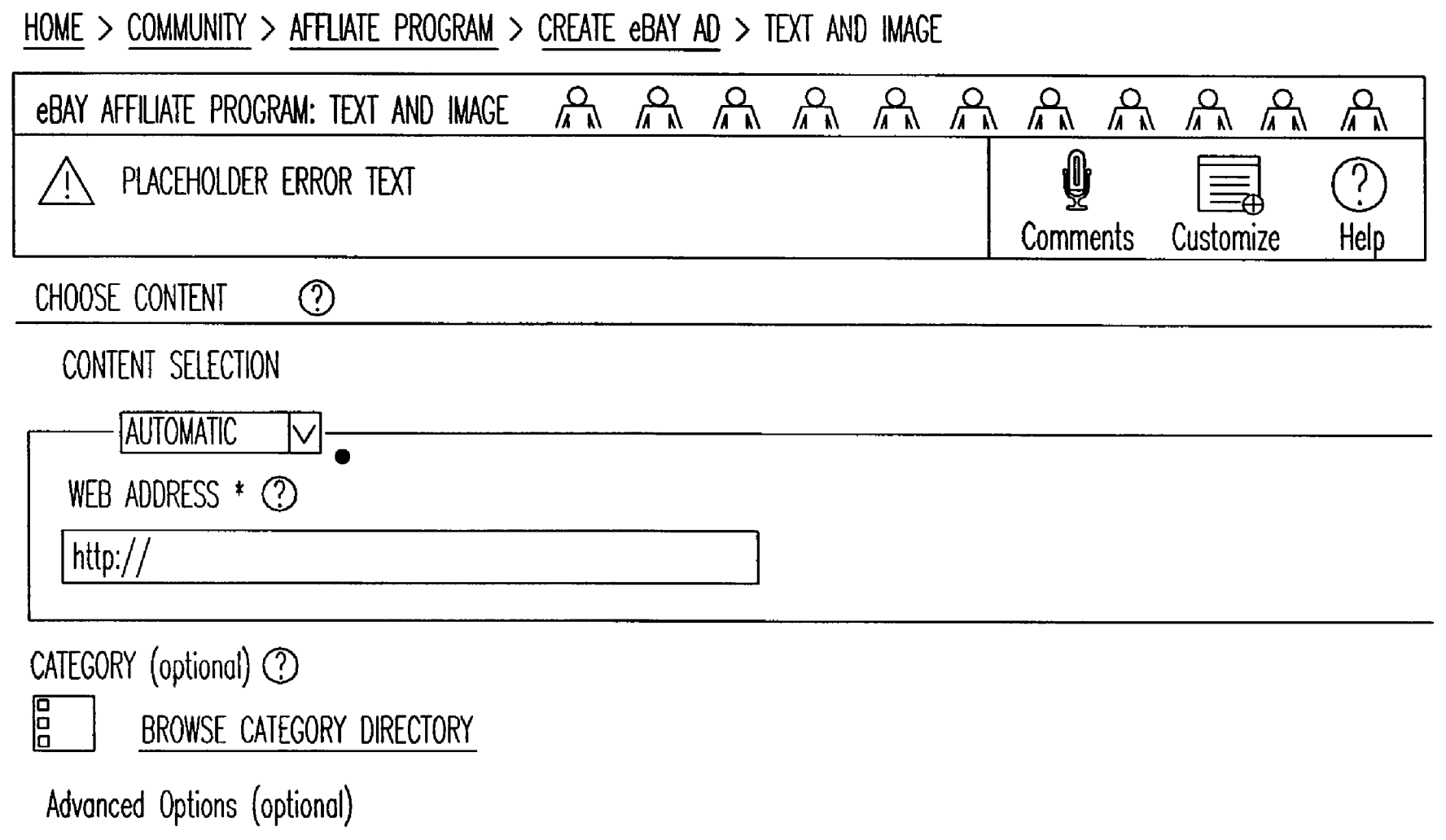

FIG. 31 illustrates the error message mock-up for an example embodiment.

FIG. 32 illustrates the preview area mock-up for an example embodiment.

Figure 33:
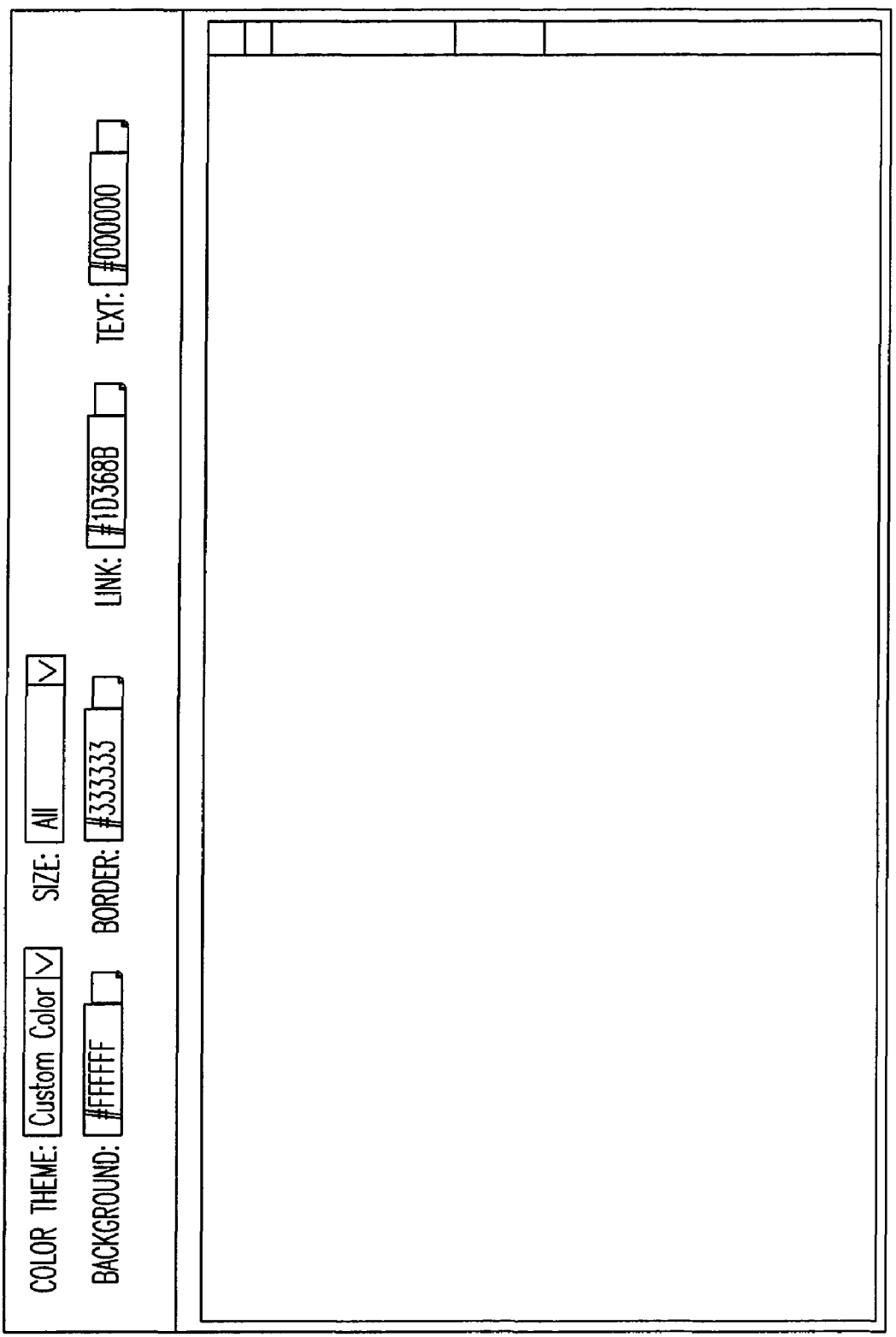

FIG. 33 illustrates the custom color mock-up for an example embodiment.

Figure 34:
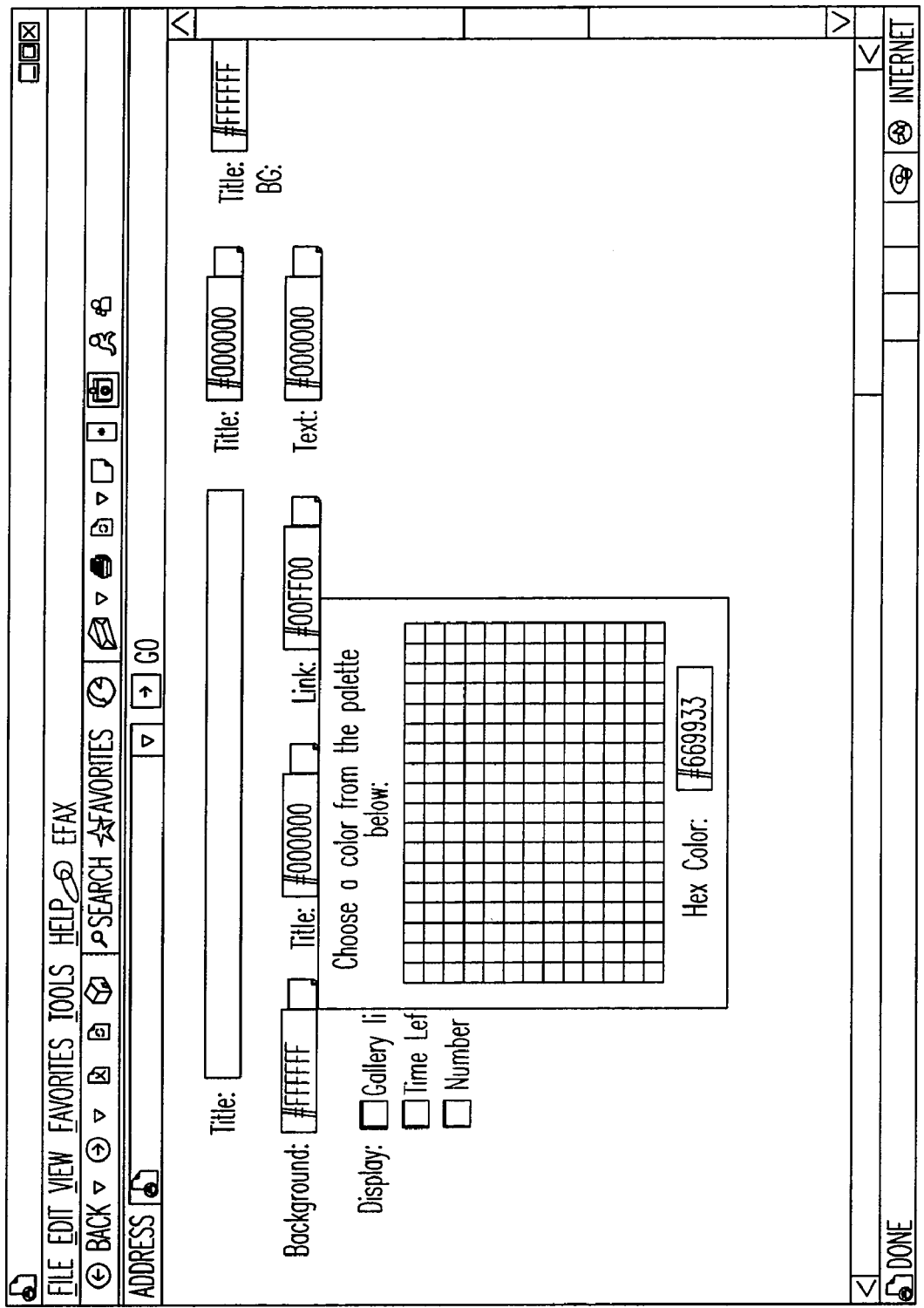

FIG. 34 illustrates the color palette mock-up for an example embodiment.

Figure 35:
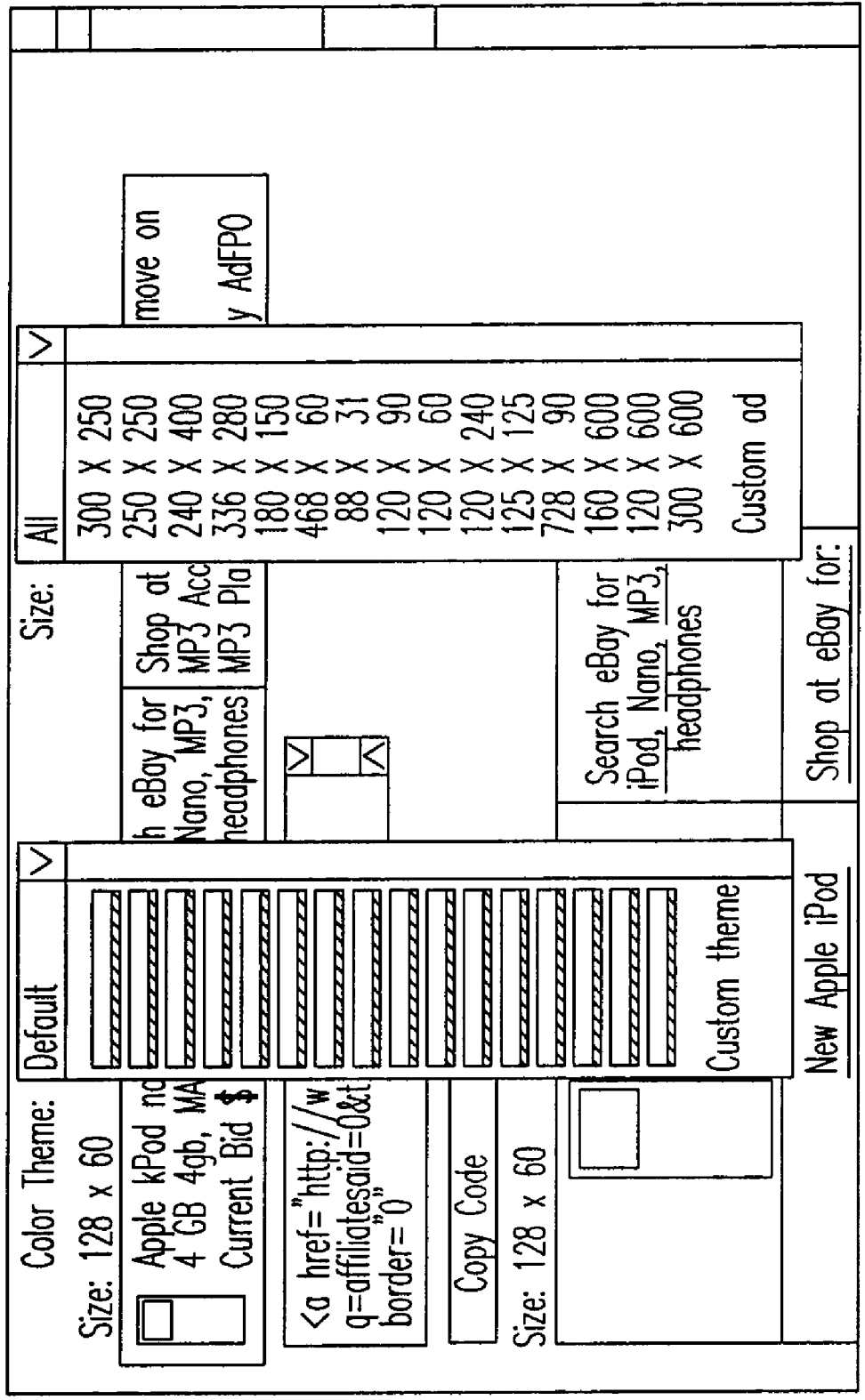

FIG. 35 illustrates an example of a color/size drop down in an example embodiment.

FIG. 36 illustrates an example of a custom ad title for an example embodiment.

Figure 37:

FIG. 37 illustrates an example of the Create Your Own Ad page for an example embodiment.

Figure 38:
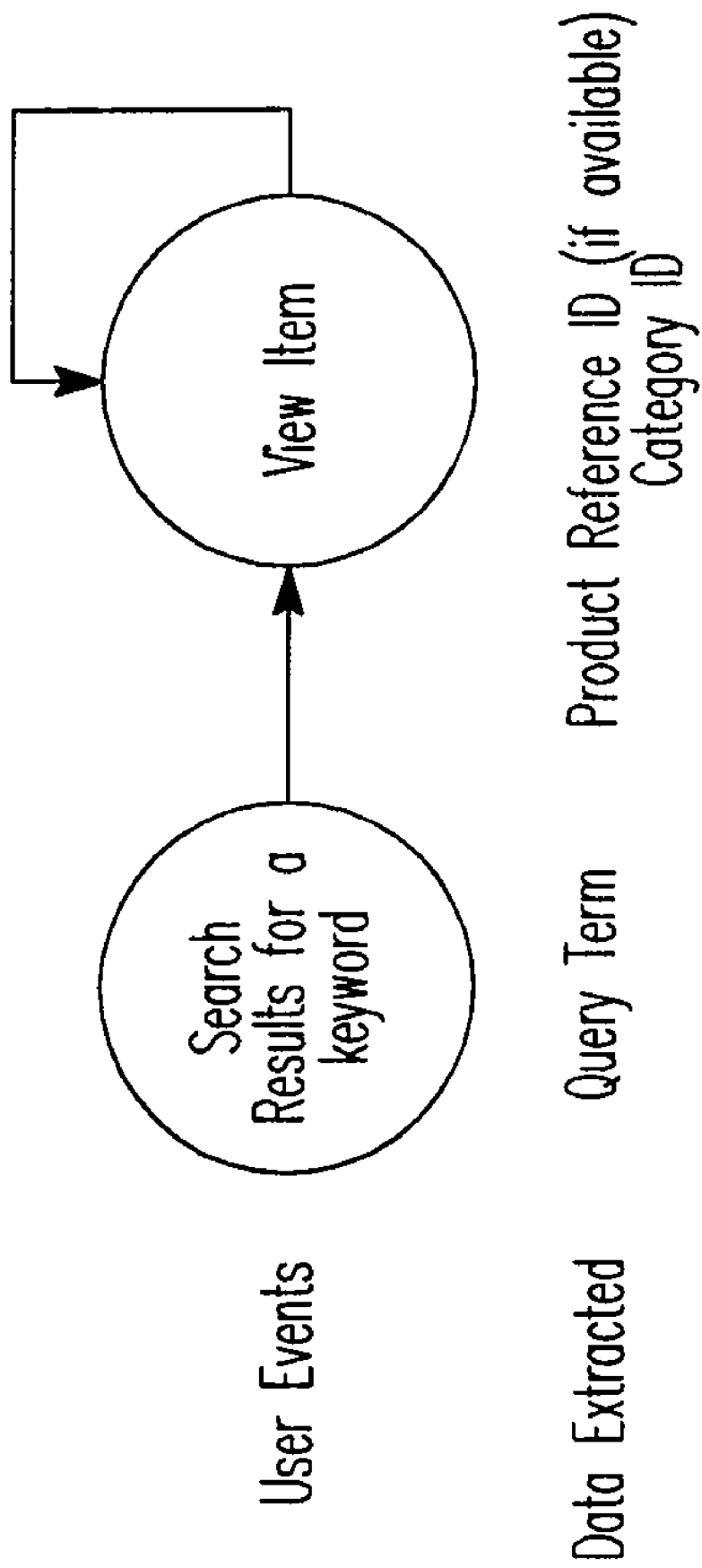

FIG. 38 illustrates a graph showing association of product reference ID to query term in an example embodiment.

Figure 39:
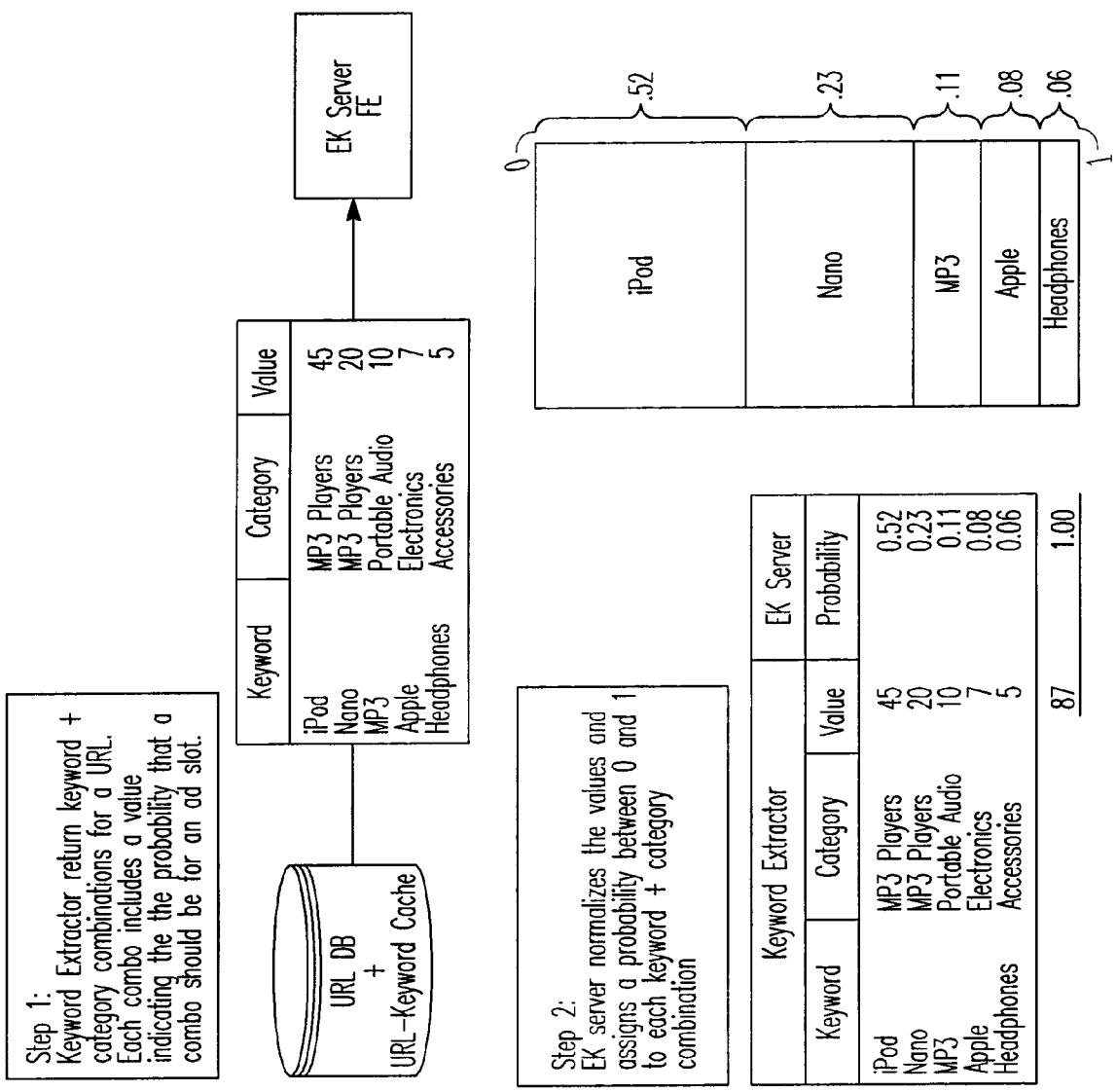
Figure 40:
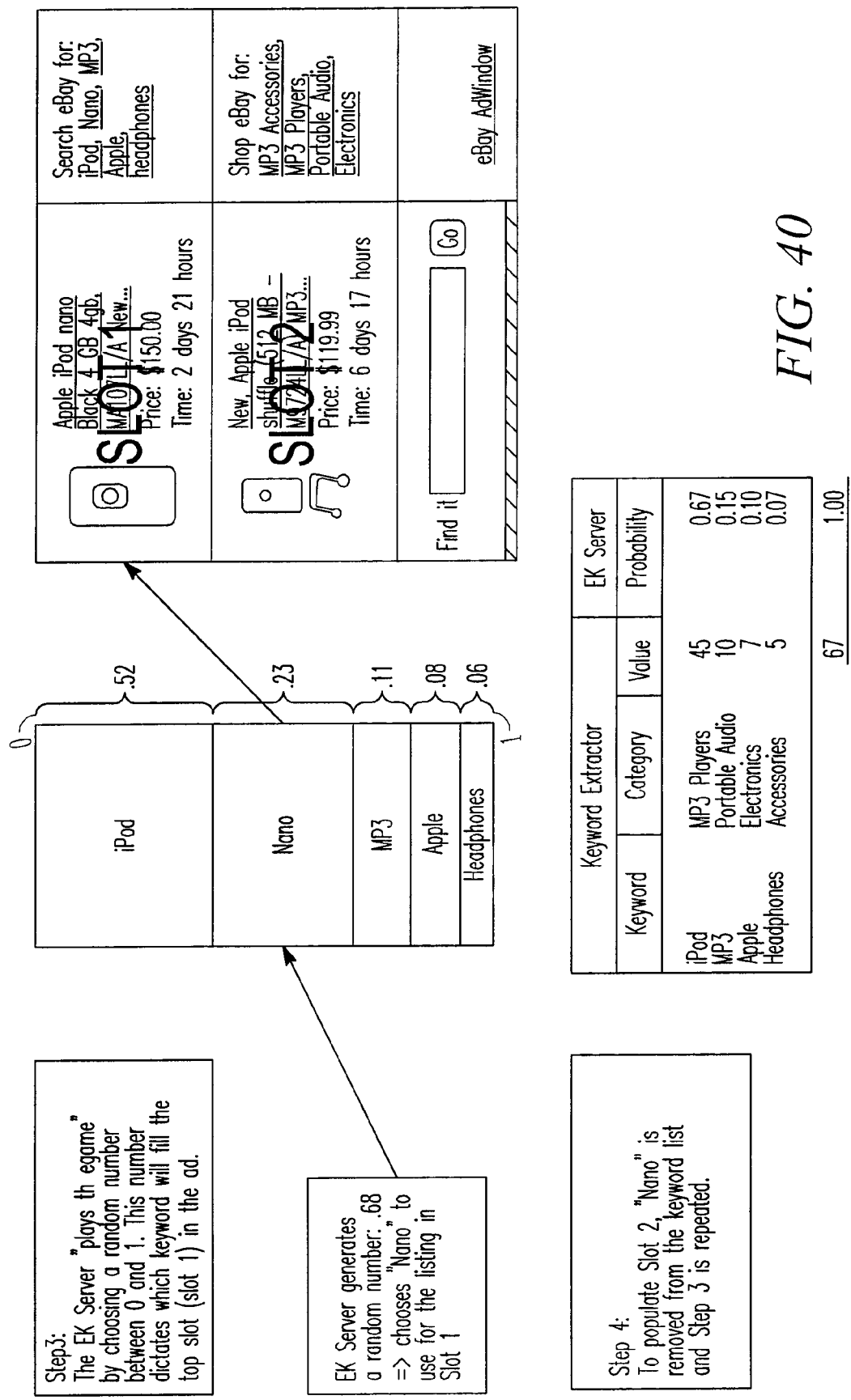

FIGS. 39-40 illustrate a step-by-step process in an example embodiment of how the Host AdContext component selects item listings to display based on the Keyword Extractor recommendations.

Figure 41:
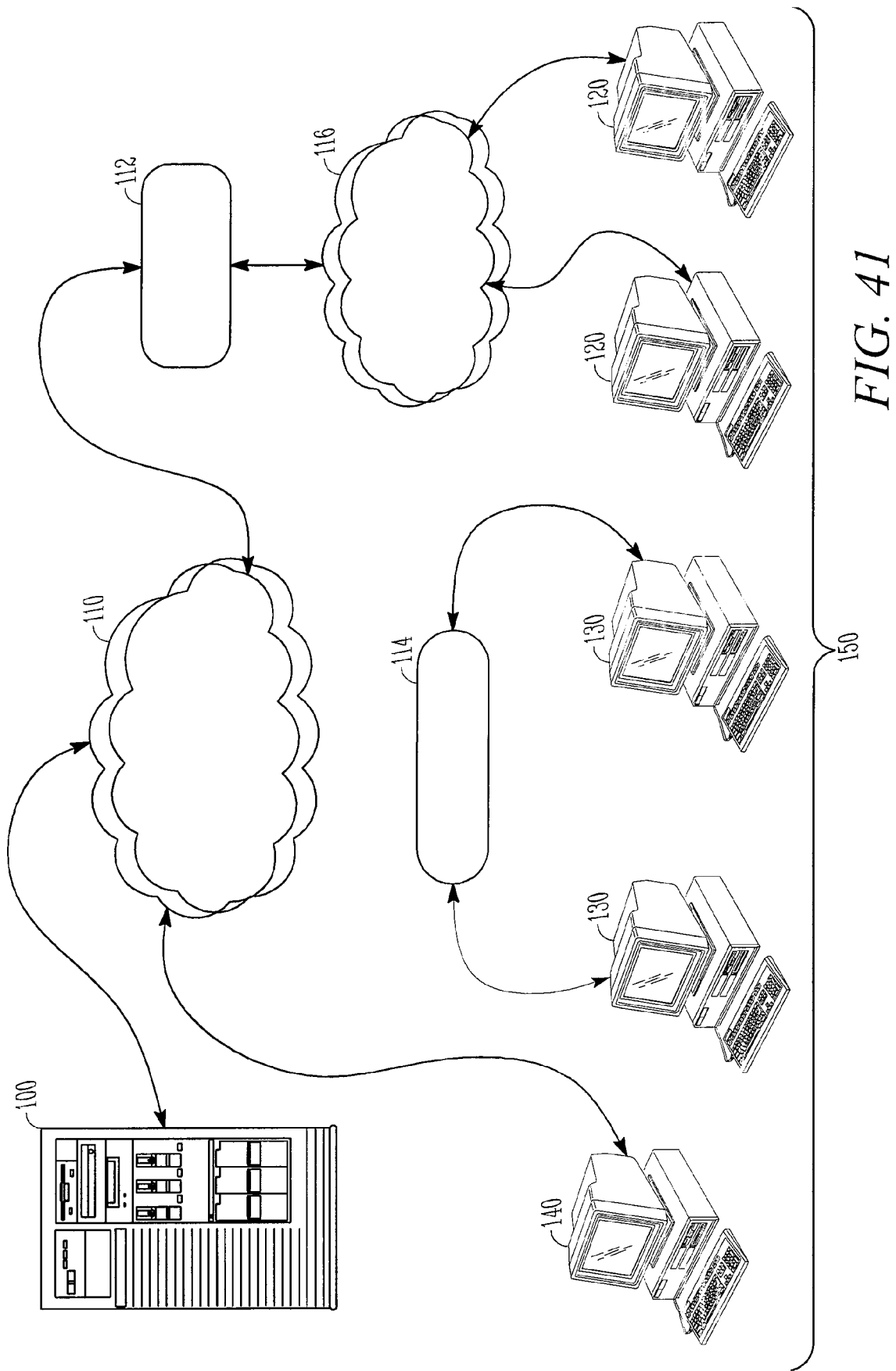

FIG. 41 is a block diagram of a network system on which an embodiment may operate.

Figure 42:
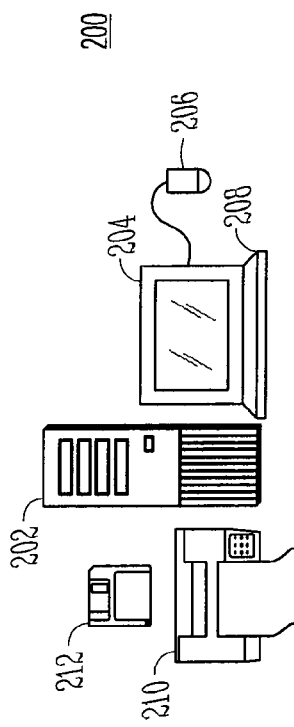
Figure 43:
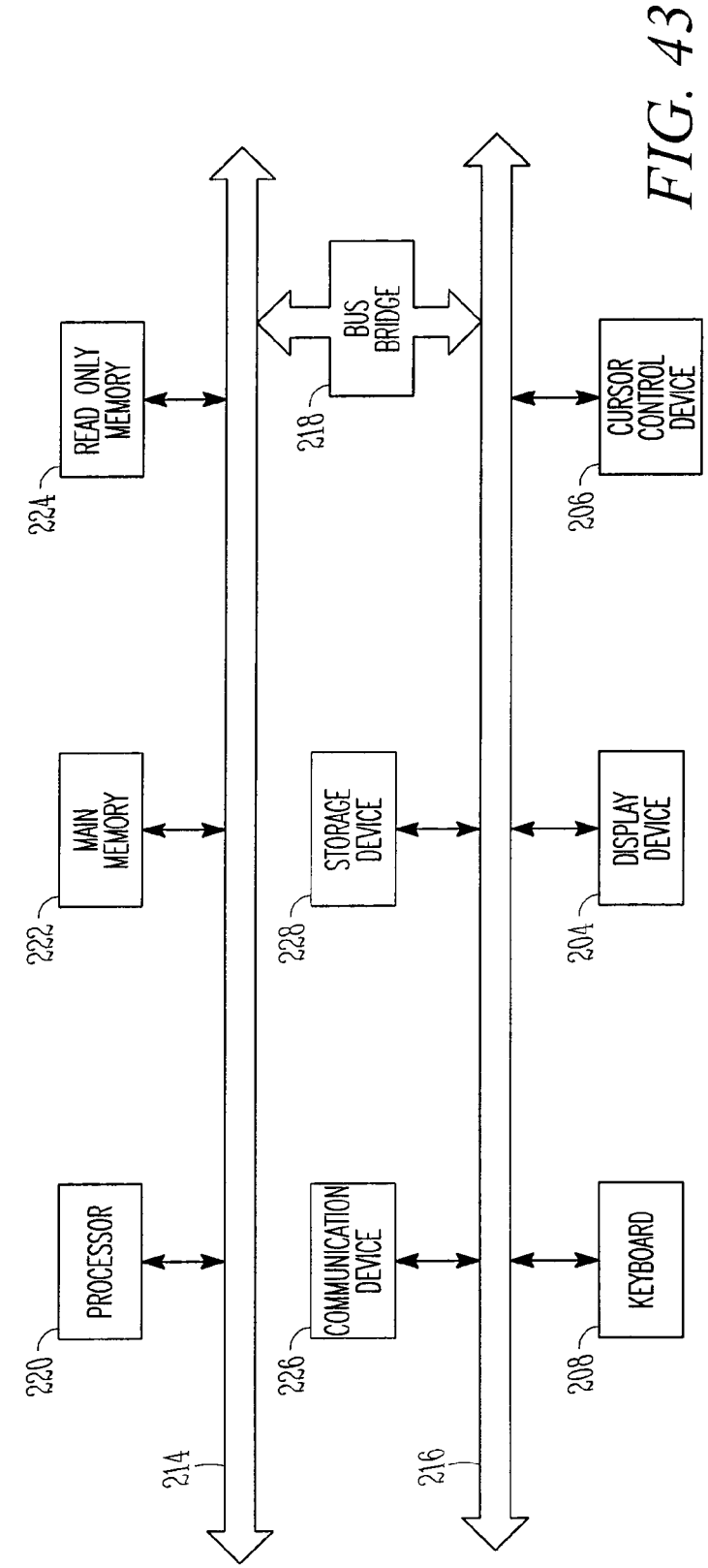

FIGS. 42 and 43 are block diagrams of an example computer system on which an embodiment may operate.

DETAILED DESCRIPTION

A computer-implemented system and method for application programming interfaces for keyword extraction and contextual advertisement generation are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method for keyword extraction and contextual advertisement generation. The system includes a keyword extraction engine operable to extract keywords from various sources based on user interaction with networked content. Further, the system includes a contextual advertisement generator to produce advertising or information content correlated with content with which a user is or has interacted. Various embodiments are described below in connection with the figures provided herein.

Introduction to the Keyword Extraction Engine

Overview of Various Embodiments

Functionality for various embodiments includes components for: 1) building the core components to analyze content and perform keyword extraction for a Host platform; 2) building the additional components to enable the Editor Kit to integrate with the keyword extraction system and provide contextual advertisements; 3) enabling contextual advertising capabilities for the Editor Kit by providing ranked and scored suggestions for: searches (keywords+category constraint), categories, products and catalog properties; 4) using the keyword extraction system in multiple system features both on and off the Host where unstructured text content is read by users.

The Host may lack the capability to analyze large volumes of unstructured text and determine if that text contains any keywords that would be of value to the user reading the text with relation to the Host. Creating this capability will enable several short-term and long-term product opportunities for on-Host product features, the Host related sites and off-Host third-party deals.

The first use case of this capability is contextual advertising with the use of the Editor Kit. This will help content oriented affiliates who publish diverse content frequently and across large numbers of pages and sites.

Basic Functionality for Various Embodiments

In various embodiments described herein, functionality is included to analyze content from any URL via HTTP; extract searches (keyword+category constraint), categories, products and catalog properties that are relevant to the content; rank the relevant results according to measures of popularity, supply and other performance measures obtained from tracking aggregate user behavior on the site; and use feedback to improve the rankings and results over time.

Use Cases

The following use cases illustrate how the keyword extractor service of an example embodiment is used in different system features. The service is designed to make it extensible across all the use cases.

| Use Case | Description |
| --- | --- |
| Editor Kit - Contextual Advertiser | Affiliates place an Editor Kit (EK) sniplet on one or more web pages. When the page is viewed the sniplet is executed, informs the EK servers of the URL and other parameters. The EK server invokes the keyword extractor service and passed in the URL. The affiliate web page is fetched and analyzed. The EK server uses the keywords to create ad placements on the affiliate page. |
| Dynamic Folksonomy | The product description on the PDPs is analyzed by the keyword extractor service. Tags or inline linking is used to help promote serendipitous finding experiences. |
| Meta Content Generator | Meta keyword and description tags are generated automatically based on the content of certain pages |
| Guides & Reviews Cross-Merchandising | Based on user written content on guides and reviews, keywords are extracted and used to surface products or listings on the pages. |
| Kijiji | Instead of surfacing the Host search results, products or categories use the same technology to surface Kijiji listings, or listings from any site identified by the Host. |
| Affiliate Applications | Through an API call, affiliates could perform keyword extraction on their own content and build innovative applications on top of this service. |

Performance Requirements

The Keyword Extraction (KE) service provides at least two levels of service in an example embodiment. One is a near real-time capability for time critical applications. The second is a delayed analysis capability with a less stringent expectation for the return of results.

Figure 1:
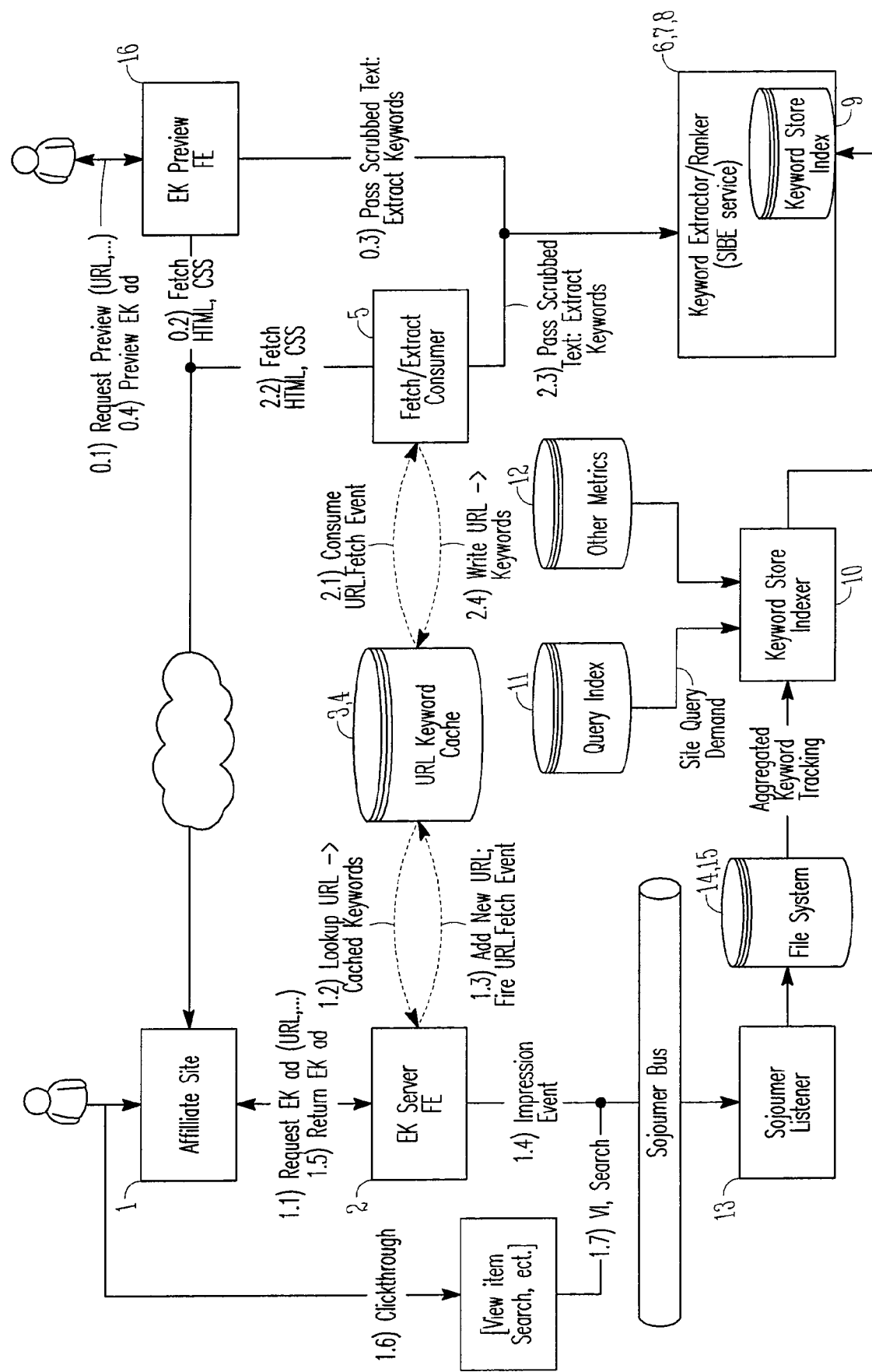
FIG. 1 illustrates a high-level architecture of the keyword extractor system in an example embodiment.

The Keyword Extractor is a system/service that analyzes HTML content and extracts relevant keywords from that content by using a variety of information. This information includes frequency of user queries, listings availability and catalog data. FIG. 1 illustrates a high-level architecture of the keyword extractor system in an example embodiment.

Consumer Application

There will be many different types of consumer applications that will call the keyword extractor service. The main ways consumer applications interact with the service include: submitting URLs to the service; receiving data back from the service; and emitting impression and clickthrough tracking events (only the Host consumer applications).

The consumer application could either be an internal Host product feature or an API (application programming interface) call being used by affiliates to access the service. The following parameters can be provided by the consumer application when requesting results from the keyword extractor.

| Parameter | Default Value | Description |
| --- | --- | --- |
| URL | n/a | This is a URL that specifies the location of the content that the consumer application would like to have keywords extracted for. The only protocol that will be supported is HTTP. HTTPS may also be supported. The URL should be for an HTML document and not some other file format (i.e. JPG, PNG, AVI, etc.) |
| Host Site ID | 0 or US | This identifies which site and therefore set of keywords and metrics that should be used to perform the keyword extraction and ranking against. This will also restrict the results (i.e. keywords, listings, products) that are returned. Only one site ID allowed. |
| Category ID Hints | n/a | Allows an optional category ID to be specified in order to provide more accurate results by defining the starting category (or categories) for the category determination process. Multiple category IDs will be accepted. A category ID can be provided at any level in the category tree. Various embodiments are beneficial and advantageous in the capability for an affiliate to pass a hint with the API call in the form of one or more host item category IDs that cause the system to refine its search and return only keywords and categories within those user provided categories specified in the affiliate API call. |

Editor Kit Server Front-End

Figure 2:
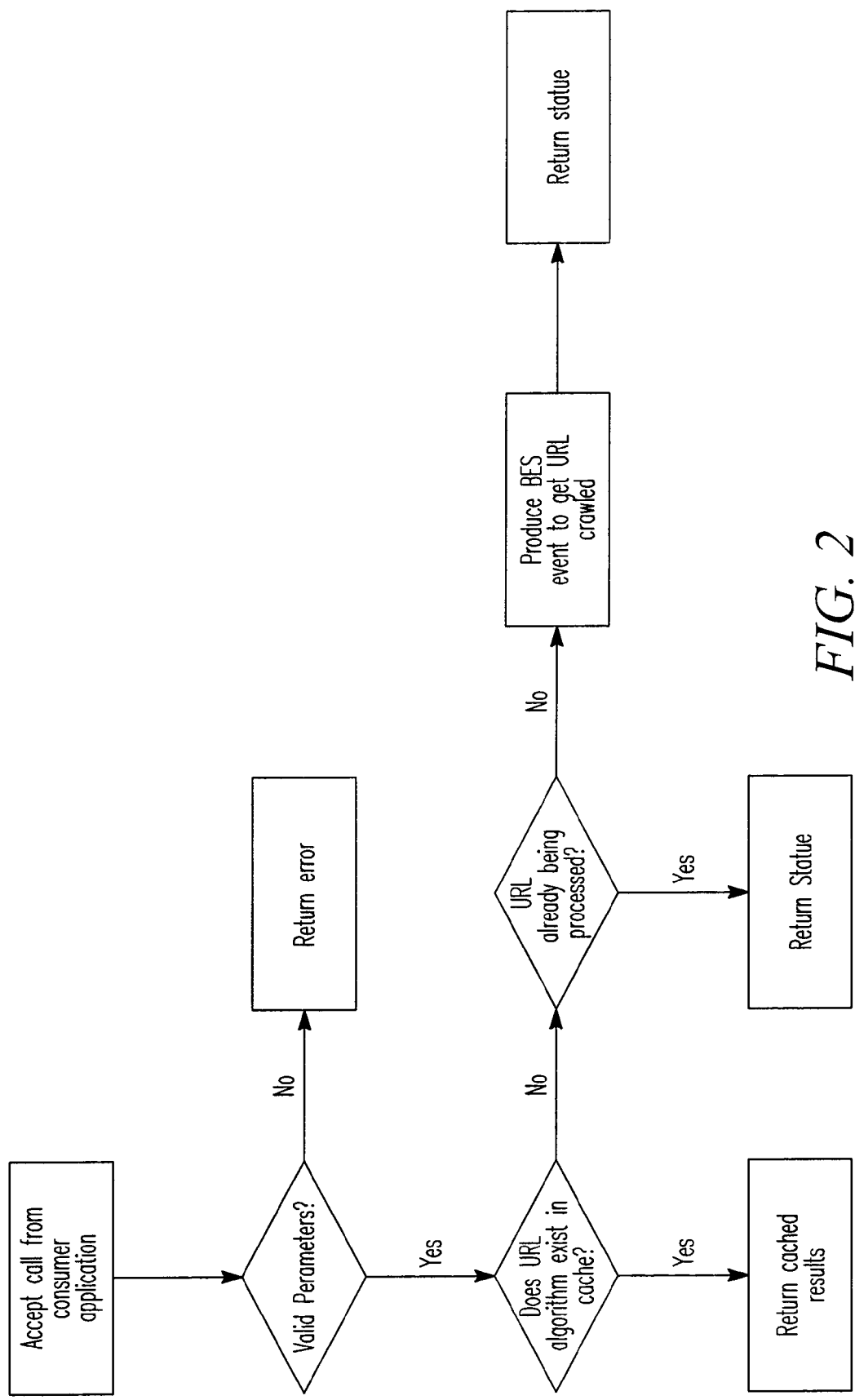
FIG. 2 illustrates the basic logic used in the Editor Kit front end of an example embodiment.

This component is the primary interface to the keyword extractor service. If the particular URL-algorithm combination that the consumer application is requesting has already been processed and exists in the cache then the data is returned. If the URL-algorithm combination has not been processed and cached yet then a check to determine whether it's still being processed or this URL-algorithm combination has never been seen before. Depending on the result either a status code is returned to the consumer application or the URL-algorithm required is published as a batch execution event in order to get the URL fetched and analyzed. FIG. 2 illustrates the basic logic used in the Editor Kit front end of an example embodiment.

Interface to Extractor Service

The interface is a method available for consumer applications to call the service and obtain results. Many different types of consumer applications will call the service and may generate a high load of requests. In order to invoke the service, several parameters may be provided, some are required while others are optional. Only internal Host applications will call the service directly through the interface. External consumer applications (e.g. affiliate applications) will have to use a Developer's Program API call in order to access the service. The parameters described below are fairly specific to the Contextual Editor Kit use case. In addition, these can be extended in order to support keyword extraction for other sites (e.g., Kijiji).

| Parameter | Default Value | Description |
| --- | --- | --- |
| Algorithm | "Default" | The consumer application can optionally specify the name of an extractor/ranker algorithm (i.e. particular extraction process) to use. This will be used to either force the service to use a specific algorithm or to allow A/B testing between different algorithms to determine which one is more effective. |
| Algorithm version | 1.0 | Different variants of the same algorithm may exist. This will be used to either force the service to use a specific version or to allow A/B testing between different versions to determine which one is more effective. |
| Refetch Interval | 24 hours | The initial amount of time that will pass before the URL is re-fetched and analyzed again to determine if the content has been changed. This is just the initial value and the system will change this automatically on subsequent fetches. Zero indicates that the URL should not be re-fetched. |
| Assets | Return all assets | Allows the consumer application to specify which set of assets to return in the dataset. |

All of the input parameters should be validated to make sure they are properly formed and contain valid values. Any invalid parameter should cause the front end to return an error code to the consumer application.

Fetch Initiation

If the URL is brand new (actually if the URL-Site ID-Category ID Hint-Algorithm-Algorithm Version combination is new; since this combination defines the primary key) then the URL needs to be fetched and analyzed. If the same URL is submitted again but any of the other parameters in the combination is different, then a new fetch and analyze is required since these parameters will influence the result. In addition, various embodiments can initiate a re-fetch of the content of a particular page based on the observed changes in the keywords extracted for that page. In this manner, the keywords extracted for a page can act as a proxy for the content of the page. Thus, as observed changes in the keywords extracted for a page occur, changes to the content of the page can be inferred and a re-fetch of the page can be automatically initiated.

URL Uniqueness

If URLs are submitted with session specific parameters embedded in the query string (i.e. session ID), then the system will treat each of these URLs as unique (even if they display essentially the same content). The system may not attempt to identify these types of URLs.

URL-Keyword Cache

This database contains the information that is generated by the Extractor Service for each URL and returns the data to the Editor Kit Server FE (Front End) when a particular URL is requested again in order to eliminate the latency associated with the fetch-and-extraction process. The cache needs to be periodically flushed (e.g. every 7 days) of URLs that have not been accessed during the previous time period in order to save space. The time period for performing the check and flushing the cache should be made configurable. The cache needs to be extensible enough to hold different result data types in the future (i.e. Listings, Reviews, Guides, Kijiji postings) or the system should be able to support multiple types of caches, depending on the use case. The cache should support all languages, including double-byte ones.

URL Database

This component contains queues for unfetched and fetched URLs as well as associated metadata for those URLs.

Fetch/Extract Consumer

The Fetch/Extract Consumer component is responsible for consuming URL.FETCH events via BES. For each event consumed the component will fetch the HTML content and any associated external CSS files from the target URL. Once the HTML and CSS have been fetched from a URL, the information is passed to the Extractor Service for processing.

Pages Fetched

The fetcher will save content on only single pages identified by the URL in the URL.FETCH BES event. The fetcher will not identify additional URLs (i.e. links) on the page in order to crawl deeper into the site.

Page Re-Fetch

Any URL submitted needs to be periodically re-fetched (unless the re-fetch time was set to zero) in order to determine if the content on the page has changed and caused a different set of keywords to be created. Each page has an optimal re-fetch time that is algorithmically determined by the system. The goal is to refresh the cache contents at or near the same frequency as the URLs publishing frequency.

There are two methods for initiating a page re-fetch: batch job and impression triggered.

Batch Job

The traditional method of determining whether to re-fetch a page would be to schedule a periodic batch job that would check the re-fetch times on all URLs to determine if any of them had expired. Those URLs whose re-fetch times had expired would be queued up for fetching and re-analysis.

Impression Triggered

Instead of having a batch job periodically examine all URLs for those whose re-fetch times have expired, the alternative is to examine re-fetch times of those URLs that are requested as a result of an impression event. If a URL is served and its re-fetch time has expired or is close to expiring (i.e. within 30 minutes, configurable without a train roll) then an event to re-fetch and analyze the URL is published.

Content Fetched

All page source content should be fetched, this includes everything unless there is a specific exception noted in the following table.

| Content Type | What to do with it |
| --- | --- |
| Scripts | The Fetcher should not execute any scripting commands on the page, but the script code should be saved along with everything else in the page source content. The HTML-to-Text Parser will be responsible for separating out useable content from non-content such as scripts. |
| Multimedia Graphics Java Applets | Objects that are referred to on the page and not text oriented, such as Flash, Java applets, graphics or multimedia assets, will not be fetched or saved. |
| CSS | If the page references an external CSS file, then that CSS file should be read as well. The CSS file passed to the HTML-to-Text Parser along with the HTML. If the CSS is inline to the HTML in the head or element level commands then just save it as part of the page source. |
| IFRAMES | For pages that contain IFRAME tags, the Fetcher should only fetch the content of IFRAMEs whose src is in the same domain as the parent document that is being fetched. If the src is in a different domain then do not fetch the content of the foreign IFRAME. |
| FRAMESET and FRAMEs | Do nothing special. The EK sniplet should be placed within a specific FRAME and does not need to know that it is part of a FRAMESET. |

| Content Type | What to do with it |
| --- | --- |
| SSI | The Fetcher should not see SSI directives as they should've been processed by the server and the Fetcher would only see the results of the SSI directive. In any case, if there are any types of SSI directives, they should be ignored by the Fetcher. |

Calculating Re-Fetch Interval

Each URL has a re-fetch interval or time that is calculated after each time the page contents are fetched, extracted and analyzed. The purpose of calculating the re-fetch interval is to determine the optimal frequency at which a URL changes or updates its content, on average, so that the results that are cached for the URL are as up-to-date as possible. The system should continuously monitor and adjust as the publishing patterns of the URL change. To start with, all URLs receive a default re-fetch interval (i.e. 24 hours). In order to determine if a URL's content has changed a fingerprint needs to be generated for each extract and analysis. In this case, the fingerprint will be generated from the top n Searches (keyword and category) for a given URL. To determine if a fingerprint has changed a set comparison needs to be made between the Searches in the previous fingerprint and the current one. If any of the individual Searches has changed (keyword or category) or the sets have a different number of Searches in them then the fingerprint has changed; ranking or scores are not relevant. If the sets are equivalent then the fingerprints and therefore the URL contents can be considered the same. Based on changes in a URL's fingerprint the following decisions need to be made: 1) whether to increase, decrease or not change the re-fetch interval; and 2) how much to increase/decrease the re-fetch interval. The general scheme for this is outlined below.

| Fingerprint Change | Re-fetch Interval Decision | Re-fetch Interval Delta |
| --- | --- | --- |
| No change | Increase - if last delta was above the delta threshold or it was a negative percentage change No change - if last delta was at or below the delta threshold | Positive percentage of current re-fetch interval |

If the Keyword Store is refreshed with new data, this may cause a certain set of pages to change their fingerprints the next time they are refreshed causing a decrease in their re-fetch interval.

User-Agent String and Exclusion Tag

When fetching pages from sites, the fetcher should identify itself as a robot belonging to the Host.

| String | Description |
| --- | --- |
| User-agent | The string should be "HostBot/1.0" or something similar. This will be the string that appears in web server logs. |
| Exclusion tag | This string should be "ebaybot" or something similar. This will be used by webmasters in robots.txt files to prevent the Fetcher from accessing specific areas of their website. |

Fetching Exceptions

The fetcher will likely encounter many situations (i.e. 4xx status codes) where it cannot properly fetch a page. In general, the fetcher should attempt to re-fetch the page when it encounters problems. Appropriate error messaging should be provided to the consumer application (i.e. EK Server FE) so that the consumer application can take the appropriate action.

| Exception | What to do |
| --- | --- |
| Timeout | If the fetcher cannot access a URL within a reasonable number of retries (i.e. 3) then the URL should be put back into the queue for another attempt in the future (i.e. 60 minutes) and a warning logged or the entry in the DB flagged.<br>If an excessive number of attempts occurs (i.e. 5), then the error should be logged/URL flagged and the fetcher should not attempt to process the URL any further. |
| Excessive content | If the amount of content (HTML only, not inline CSS in the head or external CSS files) exceeds a certain size (i.e. 100 kB) then the fetch should be terminated. The content that was fetched should be passed to the Extractor Service. |
| Pages behind a login | If the fetcher cannot access the URL then it should not attempt to do so any further. |
| Redirects | If a permanent or temporary redirect is encountered then the redirect should not be followed since we are not guaranteed to find the ad placement on the page. |

Extractor Service

This component is responsible for taking the page data (HTML and CSS) from either the Fetch/Extract Consumer or Editor Kit Preview FE components and extracting and ranking keywords from that data with the help of the HTML-to-Text Parser and the Text-to-Keyword Extractor/Ranker components.

Dataset Returned

The results should be assembled into a dataset that is easily parsed (i.e. XML) by the consumer application (EK Server FE or EK Preview FE). The dataset should be easily extended to hold new types of data (i.e. Listings, Reviews, Guides, Kijiji postings). Each data type should have its own section in the data. Each section should its results sorted by rank in ascending order.

No Results Default

No results can occur in two situations:
1) The URL submitted is not in the cache and must be fetched and have keywords extracted first.
2) No keywords can be extracted from the content on the URL (i.e. minimal content on the page or content about a subject that has no overlap with the Host buyer and seller interests).

In either situation when no results can be extracted or returned for the given URL (i.e. not enough content or content that does not overlap well with the Host community) then a default set of results should be provided. The default results will be the top n ranked keywords within one or more categories. If no category hints were provided, then the category root will be used. In situation #2, when no keywords can be extracted from the content, the system should remember this so that the page is not re-fetched and a useless extraction performed each time the URL gets an impression.

HTML-to-Text Parsing

This requirement is for taking the raw HTML and CSS, if it exists, and generate clean text for easier processing by the Keyword Extractor/Ranker SIBE service. The parsing will also analyze the content and provide weightings for certain pieces of text that it thinks are more important. These weightings will influence the final weighting of the keywords.

Extracting Text

The main goal of the parser is to extract the content and remove all the extraneous elements that are needed to format a page. In general all tags for structural and formatting should be removed, unless specifically mentioned in the table below, and all the content in the body of the document should be kept. Note that some of the tags and CSS directives will be used to generate weightings to influence keyword ranking. Additionally, meta information tags can be used to determine keywords and context of a page.

Content Indicator Tags

The page being parsed may implement content indicator tags. These are the Host proprietary tags that indicate which ranges of text are actual content (as opposed to UI (user interface) navigation elements). These will allow better accuracy on pages that contain a lot of irrelevant content on the pages. The tags are optional and may not be embedded in all of the pages that the system fetches. A page may have multiple pairs of content indicator tags embedded in it. If the one or more pairs of content indicator tags are present, then only the text in those sections should be parsed. Any content outside of those tags will be thrown away, unless there are no tags present at all—then the entire page should be analyzed. The content indicator tags should not be nested or overlapping in any manner. The content indicator tags should be easily parsed and should not cause the page they are embedded in to render differently. Possible implementations are using a DIV tag with a custom class or using a comment tag with a specific string. Comments are probably preferred because they will not cause browsers to place a line break before and after the DIV element.

Weighting Scheme

The weighting scheme will apply a set of rules that are based on the formatting and metadata of a page. The rules will assign a weighting to the areas of text and metadata that meet the requirements of a rule. Text that does not meet any of the rules will be classified as neutral weight (zero). Note that this does not mean that neutral weighted text has zero weighting. Adding new rules and changing weightings for existing rules should be easily configured without a train roll. The weighting of the text should not destroy any of the context in the document (i.e. phrases should not be broken up). This is because formatting boundaries are not guaranteed to coincide with token boundaries; therefore weighting chunks of text should not create artificial token boundaries. There will be only one set of weighting rules for all sites (having per-site rules is too much of a maintenance problem).

Rules can apply to various elements on a page but will mostly apply to meta tags, HTML tags and CSS rules.

Weighting Rules per Site/Language

The ability to configure a different set of rules for different languages or groups of sites should be supported by the system. Different languages use different text sizes, but that doesn't mean words in one language are more important than words in another language. For instance, compared to English words, Chinese words must use a larger text size to be readable. Since other languages will be sized differently due to character set differences, the default weightings may produce undesired results.

Text Scrubbing

The text should be pre-processed in order to normalize all variations and put the text into a consistent format. Some scrubbing procedures may not apply to all languages. The scrubbing process should be identical to the one used for scrubbing queries on the site in order to ensure that both processes are generating the same output.

Text-to-Keyword Extractor/Ranker

The Text-to-Keyword Extractor/Ranker component consumes the output (derived from the actual content) of the HTML-to-Text Parser and analyzes it with the aid of the data in the Keyword Store. The output is a set of assets that is contextually related to the analysis and metadata for each asset. An asset represents anything that could be surfaced to the user reading the original content. This document will only focus on specific assets that exist on the Host (.com and country sites) but the system should be designed to be extensible enough so that other assets could be added, whether from the Host (i.e. Reviews and Guides) or come from affiliated sites such Kijiji (i.e. postings).

Spell-Check, Stemming and Transliteration

All of the tokens should be run through three operations: spell-check, stemming and transliteration. Each token should be spell-checked and replaced with the top spell-check suggestion if there is an error in the original token. Perform stemming and transliteration on all the tokens in order to normalize them. After these three processes are performed on the tokens then the metrics should be combined according to pre-defined rules.

Combine Metrics

After spell-check and stemming operations, tokens that are identical should be combined into one metric along with their associated metrics. All the metrics should be added together.

Relevance Ranking

The general framework of the ranking system in an example embodiment is to use multiple inputs in the form of histograms and combine the data from the histograms in an equation that will produce a numerical value for each token. The framework should be flexible enough to add additional algorithms in the future and also change the equation that combines the data from the histograms into producing a numerical value for each token. This is needed to support A/B testing of different algorithms.

New algorithms can be created either by: 1) configuring the weightings of various histogram inputs into an existing algorithm. This should be done by without requiring a new train roll. Different weightings for the same basic algorithm should be available simultaneously for A/B testing; or 2) creating a brand new algorithm that computes the ranking in a brand new manner. This can be done with a new train roll.

In an example embodiment, rankings will be produced for the following: Searches (keyword +category constraints) and Categories. The ranking system should be extensible to allow the addition of other types of rankings (i.e. reviews, guides, Kijiji postings, etc.).

Detailed Keyword Ranking Algorithm

Ranking keywords will use both relevance data and financial data to rank each [keyword+category]. Both sets of information may be combined in order to create a single value for each [keyword+category] that indicates the relative value of the [keyword+category] compared to the other [keyword+category] items in the same result set.

The overall keyword ranking process in an example embodiment is illustrated in FIG. 3 and explained as follows:

1. Perform categorization and tokenization on content
2. Produce set of [keyword+category] items along with a relevance score for each
3. Calculate a relevance probability based on the relevance scores of the entire set
4. Lookup an expected financial value for each [keyword+category] item
5. Calculate a financial probability based on the expected financial values of the entire set
6. Calculate an overall probability for each [keyword+category] by combining the relevance and financial probabilities weighted appropriately

Keyword Scoring Step 1

The step of categorization and tokenization of the content is based on site-wide supply and demand data as well as URL specific data all of which are processed by the pseudocode set forth below. Note that site-wide bid/BIN data will not be used in this step.

Keyword Scoring Step 2

Each [keyword+category] will have a relevance score computed for it as part of the categorization and tokenization step.

Keyword Scoring Step 3

The relevance score for each [keyword+category] is transformed into a probability score based on the relative difference between [keyword+category] elements for the page.

Keyword Scoring Step 4

Given a set [keyword+category] items from the relevance scoring steps, the system should use the combination of "Host ID×URL×[keyword+category]" to look up the historical financial performance of that combination (recency-weighted average of bid, BIN and registration activity). If the historical financial performance is not available then an estimate should be used by looking up the alternate aggregate financial information for the keyword. The financial score will be in the currency of the Site ID used and represent the expected value of bid/BIN and registration activity created per one thousand impressions of a given "site ID×URL×[keyword+category]" combination.

Keyword Scoring Step 5

The expected financial value for each [keyword+category] is transformed into a probability similar to relevance probability in step 3, where the expected value of the [keyword+category] combination is considered in relation to the combined expected value of all the other [keyword+category] combinations for the page.

Keyword Scoring Step 6

The relevance probability and financial probability for each [keyword+category] item are mathematically combined to produce a single probability score for each [keyword+category] item.

Once the single probability score is calculated for each of the [keyword+category] items in the set, the results can be stored in the URL to keyword cache for a front-end application to access.

Keyword Store

The Keyword Store, contains the various histograms that act as inputs to the ranking algorithm. Each country site on the Host should have its own set of histogram data to provide accurate results for content-driven ads that will be driving users to that specific site. This component should also be made extensible so we can add sets of metrics from additional platforms to the system (i.e. Rent.com or Kijiji sites) when we extend keyword extraction to those platforms and suggest assets from those systems. Different platforms will likely have different sets of histograms. The histograms in this section are those that will specifically run the keyword extractor system for the Host platform. The data for the following histograms do not necessarily need to be implemented as separate data structures. They are separated logically in the diagram for clarity. The histogram data should be refreshed on a regular basis in order to accurately track trends and provide accurate recommendations.

Demand Histogram—Query Frequency

This histogram will associate with each search query the frequency with which users clicked through to a view item page on a per category basis. FIG. 4 illustrates a graph showing association of category ID to query term in an example embodiment. For each listing that a user views after a search, the category ID of the listing is associated with query term and the count of view item actions for that particular query term-category ID combination is incremented by 1. If a user views multiple listings after a search (i.e. repeatedly clicking back in their browser and clicking on different listings in the search results), then all of those actions should be counted. View item counts at child categories should be aggregated up the category tree to parent categories.

Supply Histogram—Supply Frequency

This histogram will associate with each keyword (i.e. search query) the number of listings available on the site on a per category basis. This histogram should be built by determining the number of listings (all formats) whose listing title and description match the given keyword available across all categories (i.e. execute a search). This data should be broken out on a per category basis and the number of listings at child categories should be aggregated up the category tree to parent categories.

Site Bid Histogram

This histogram will associate with each keyword the frequency with which users bid or BIN on listings related to those keywords on a per category basis. FIG. 5 illustrates a graph showing association of bid amounts to query term. For each listing that a user bids on after performing a search then the category ID of the listing, as well as the bid amounts (absolute and differential), are associated with the query term and the count of bid actions for that particular query term-category ID combination is incremented by 1. The event should be tracked regardless of how it was generated (i.e. manual bid or proxy bid). Bid counts and amounts at child categories should be aggregated up the category tree to parent categories.

Site BIN Histogram

This histogram will associate with each keyword the frequency with which users BIN-through on those keywords on a per category basis. FIG. 6 illustrates a graph showing association of BIN amount to query term. For each listing that a user BINs on after performing a search then the category ID of the listing, as well as the BIN amount (absolute), are associated with the query term and the count of BIN actions for that particular query term-category ID combination is incremented by 1. BIN counts and amounts at child categories should be aggregated up the category tree to parent categories.

Site Product Reference ID Histogram

This histogram will associate with each keyword the frequency with which users clickthrough to an item which is associated with specific product on a per category basis. FIG. 7 illustrates a graph showing association of product reference ID to query term. For each listing that a user views after a search, the product reference ID of the listing, if available, is associated with query term and the count of view item actions for that particular query term-product ID combination is incremented by 1. If a user views multiple listings after a search (i.e. repeatedly clicking back in their browser and clicking on different listings in the search results) then all of those actions are counted, if a product reference ID is available. If no product reference ID is associated with the listing then no event is registered and not stored in the histogram. Product reference ID counts at child categories should be aggregated up the category tree to parent categories. Only the top n products within each category need to be stored. The rest of the data accumulated by the query index does not need to be held in the Keyword Store since, for Keyword Extractor purposes, we will only be interested in suggesting the top few products associated with a keyword and/or the products that show the greatest acceleration in search to view item clicks.

Editor Kit CTR Histogram

Based on the total number of impressions and clickthrough events, the clickthrough rate (CTR) can be calculated for any asset that is made available in ads via the Contextual Editor Kit. By tracking the clickthrough rate (CTR) for Contextual Editor Kit ad placements, the system can be influenced to rank assets with better CTRs higher and produce better results. Note that there can be multiple CTRs for a given keyword due to the various types of impressions and clickthrough events.

| CTR Type | Description and Calculation |
| --- | --- |
| Ad CTR | This tracks the overall clickthrough rate of the ad unit regardless of the specific click event that occurs.<br>Ad CTR = (# of click events of all types/# ad unit impressions) |
| Listing CTR | This tracks the clickthrough rate of the listing section that is surfaced for a specific search (keyword + category).<br>Listing CTR = (# of listing clickthroughs/# listing impressions) |
| Product CTR | This tracks the clickthrough rate of the product suggestion that is surfaced for a specific keyword.<br>Product CTR = (# of product clickthroughs/# of product impressions)<br>This tracks the clickthrough rate of the category suggestions that are surfaced for a URL. |

-continued

| CTR Type | Description and Calculation |
| --- | --- |
| Category CTR | Category CTR = (# of category clickthroughs/# of category impressions)<br>This tracks the clickthrough rate of the search term suggestions that are surfaced for a search term. |
| Search Term CTR | Search Term CTR = (# of search term clickthroughs/# of search term impressions)<br>This tracks the usage rate of the search box when it is surfaced on an ad. |
| Search Box CTR | Search Box CTR = (# of search box clickthroughs/# of search box impressions) |

Editor Kit Bid Histogram

This histogram is similar to the one described above, but differs in one key data point. The data should be attributed back to the keyword impression that was made in the ad placement on an affiliate site (not any intermediate keywords a user searched on during their session) while the category ID and dollar amounts are derived from the particular listing. In addition, the various other feedback tracking dimensions described herein need to be captured as well. FIG. 8 illustrates a graph showing association of Bid amounts to ad query term.

Editor Kit BIN Histogram

The data should be attributed back to the keyword impression (not any intermediate keywords they searched on). This histogram is similar to the one described above, but differs in one key data point. The data should be attributed back to the keyword impression that was made in the ad placement on an affiliate site (not any intermediate keywords a user searched on during their session) while the category ID and dollar amounts are derived from the particular listing. In addition, the various other feedback tracking dimensions described herein need to be captured as well. FIG. 9 illustrates a graph showing association of BIN amount to query term.

Aggregating Editor Kit Data For Feedback Optimization

In order to refine keyword probabilities based on actual performance, the system needs to analyze feedback events in aggregate. The financial value driven by a particular site ID×URL×[keyword+category] combination will be tracked and aggregated on a regular basis. The aggregate data is then used to refine the financial expectation and probability score.

Aggregation of Data

Various embodiments can accumulate data over the course of regular intervals.

Calculate Weekly Financial Value

For each unique site ID×URL×[keyword+category] the total financial value driven per thousand impressions should be calculated based on various financial events such as bids and registrations. The calculation needs to be statistically significant, so an adequate number of impressions need to be shown to reach a desired confidence interval.

Keyword Store Builder

This component will periodically update the histograms stored in the Keyword Store from various data sources. The Keyword Store should be refreshed on a regular basis.

Blacklist

A blacklist should be used to filter keywords, based on precise match, prior to the keywords entering the Keyword Store. This will prevent these keywords from being recommended (assuming the Keyword Store gets rebuilt and not incrementally updated). There will be an additional blacklist check in the Editor Kit Server Front-End in order to catch keywords that are added to the blacklist between refreshes of the Keyword Store.

Query Index

The query index will use data generated by various embodiments to find queries entered by users searching on the Host and aggregate metrics about the user's actions after they obtain their search results and associate those aggregate metrics to the query terms. The user's search and related activity must all occur within the same user session. The query index should support all languages used by on-platform sites. The index should be refreshed periodically (i.e. ideally daily refresh, minimum weekly refresh) in order to accurately track changes in aggregate user actions.

Metric Sources

The system will be extensible to incorporate additional sources of data to be used in the keyword extracting and ranking algorithms.

Keyword Data Mart Metrics

Additional data will be sourced from the Keyword Data Mart (KWDM). The metrics will be used in the token scoring algorithm to influence the final ranking of keywords towards those keywords that are expected to generate more revenue. If the Keyword RPC metric is not available for a keyword during the ranking process, then the ranking algorithm should use the other keyword metrics available.

Tracking/Listener

Two classes of events will be tracked in an example embodiment. The first class is feedback events. These events will allow the system to improve its performance, over time, by incorporating actual user activity into the system. The second class is performance tracking events. These are for internal reporting purposes in order to evaluate the system's performance. The tracking system should be extensible enough to add different events for different use cases or to track new performance measures in the future. The feedback events will be aggregated on a regular basis by a batch job in order for easier consumption by the Keyword Store Builder. The events should be tracked only for users that are shown an impression and clickthrough on one of those impressions and navigate the site. Events should be tracked at 100%. Note that some of the tracking information will only be available at impression time but will need to "follow the user" as downstream tracking events are generated. The following are the individual measures that should be tracked when events occur.

| Measures | Description |
| --- | --- |
| # Impressions | The number of times that an asset is displayed to a user. |
| # Clickthroughs | The number of times that a user clicks on an asset. |
| # View items | The number of times that a user, who has previously viewed an asset and clicked through and, has also viewed a listing. |
| # Bids and $ Bids | The number of times that a user, who has previously viewed an asset and clicked through and, has also placed a bid (either manually or by proxy). Also measures the amount of the bid in terms of absolute bid and bid increment. |
| # BINs and $ BINs | Also measures the amount of the BIN. |
| # Registrations | Counts when a user, who has previously viewed an asset and clicked through, also registers. |

The following are the dimensions that the individual measures can be identified by. Not all dimensions may be applicable for particular type of event. Note that certain dimensions will follow a user throughout their session (i.e. the affiliate URL where they initially viewed the impression).

| Dimensions | Description | Feedback Loop |
| --- | --- | --- |
| Asset type | Indicates the type of asset that the event is associated with. Ad unit Search term Category Product Listing Search box Host logo - graphic and text version (not for feedback) Viral marketing link (not for feedback) Not all asset types may generate all types of events. Note that additional asset types may be added over time. | Y |
| Site ID | Identifies the Host site that the event is associated with or was generated on. Impressions are still associated with a site ID, even though they do not occur on a site. This may be extended in the future to include other sites, such as Kijiji or Rent.com, not just the Host site IDs. | Y |
| Application + version | Identifies the particular consumer application that generated the event. | Y |
| URL | Identifies the URL that the event is associated with. | Y |
| Domain | Identifies the domain that the event is associated with. This can be derived from the URL. | Y |
| Date/Time | The date and time that the event occurred. | N |
| Search term (keyword + category ID) | Identifies the search term that the event is associated with. This is the original search term that was surfaced in the ad placement. If a user clicks through on the ad and then proceeds to search using a different term and then views some items because of that, then the original search term would still be used, not the new user query term. | Y |
| Impression Category ID | Identifies the category that the event is associated with. This is the original category ID that was surfaced in the ad placement. If a user clicks through on the ad and then proceeds to browse to items in a different category, then the original category ID for the ad impression would still be used, not the new category ID. | Y |
| Product reference ID | Identifies the product that the event is associated with. | Y |

-continued

| Dimensions | Description | Feedback Loop |
|---|---|---|
| Ad Type | Identifies the type of ad (i.e. flash, text + image, text only) that created the impression that the event is associated with | N |
| Ad Format | Identifies the specific ad format (size/layout) that created the impression that the event is associated with | N |
| Ad Color Theme | Identifies which particular color theme out of the fixed set available was used. | N |
| # Listings Displayed | For the custom ad format, the number of listings is controlled by the affiliate. Tracking this will enable reporting on what the most popular custom # of listings is. | N |
| Custom Display Options | For the custom ad format, the information displayed is controlled by the affiliate (i.e. image, title, price, # bids, time left). Tracking this will enable reporting on what the most popular combinations are. | N |
| Category Hint | A Y/N flag to track whether the affiliate provided category hint(s) on their ad placement to track whether this improves performance of ads over time. The user hint/category hint is provided by the publisher of the web page in order to refine the search results that are provided. | N |
| Display Rank | Identifies the display rank of the asset that user clicked on that the event is associated with. The display rank is on a per-asset basis (i.e. if two types of assets are displayed then there will be at least two display ranks of 1). This will allow reporting on which assets are displayed the most and if there is any correlation with overall performance. This should also take into account flash ads where the assets are shown in multiple rotations. | N |
| Keyword Rank | The actual ranking of the keyword associated with the asset being displayed. This will allow reporting on which keywords are performing better if multiple assets of the same type are displayed and each asset is associated with a different keyword. | N |
| Algorithm + version | Identifies the extractor and ranking algorithm that were used to generate the results | N |
| Bid/BIN category ID | Identifies the category that the bid/BIN event occurred in (allows for analysis to determine what factors drive bid/BIN activity) | N |

Feedback Events

The objective of the feedback tracking is to determine which assets (i.e. searches, listings, products, categories, etc.) are actually performing the best and to use that data to influence the ranking of various assets. In the Contextual Editor Kit use case, we are interested in tracking user activity both on the affiliate site and on the Host to determine which searches (keyword+category), categories and product suggestions actually produce the best clickthrough rate and activity on the Host site.

Impression Events

If ad unit is requested, the system should register one or more of the following impression events (the number and type of impressions is dependent upon what results are displayed). A user interface in an example embodiment is presented in FIG. 10 as a generic mockup showing impressions generated from one ad unit.

| Impression Type | Description | Number of Impressions |
|---|---|---|
| Ad Unit Impression | This is the parent ad unit that may contain one or more sub-sections (and therefore cause additional impression type events). This impression event will registered once everytime an Editor Kit sniplet is viewed on a page. | Always once each time the ad is served. |

-continued

| Impression Type | Description | Number of Impressions |
|---|---|---|
| Product Impression | If a product is displayed then a product impression should be registered. If multiple products are displayed then a product impression for each product should be registered. | Once for each unique product reference ID displayed. |
| Listing Impression | If one or more listings for a single search (keyword + category) are displayed then a listing impression should be registered. The number of listings displayed does not affect the number of impressions registered. | Once for each set of listings displayed that are from one search. If listings are displayed from two different searches then two impressions events should be registered. |
| Search Term Impression | If a search term (keyword + category) is displayed then a search term impression should be registered. | Once for each unique search term (keyword + category). |
| Category Impression | If a category is displayed then a category impression should be registered. | Once for each unique category. |
| Search Box Impression | If a Host search box is displayed then a search box impression should be registered. | Once each time a search box is displayed (there should be no multiple impressions of this type within a single ad unit). |

Impressions may need to be differentiated from each other in some embodiments. For example, there are multiple types of search on the Host (core search, product based search, three variations of Stores search).

Clickthrough Events

Whenever a user viewing an impression actually takes and action and either clicks through or executes a search then the clickthrough event should be registered. All clickthrough events should be counted. There will be no filtering of repeat clicks from the same user as there will be no issues with click fraud.

| Clickthrough Type | Description |
|---|---|
| Ad Unit Clickthrough | This clickthrough event should never occur since the overall ad unit itself is not really clickable. However all the separate impression and clickthrough events will need to be correlated back to the parent ad unit so overall ad unit clickthrough rate can be calculated. |
| Product Clickthrough | The clickthrough to the product's associated PDP should be registered. |
| Listing Clickthrough | The clickthrough to the corresponding VIP should be registered. |
| Search Term Clickthrough | The clickthrough to the corresponding SRP should be registered. |
| Category Clickthrough | The clickthrough to the corresponding DCP should be registered. |
| Search Box Clickthrough | The clickthrough to the corresponding SRP should be registered. This should be registered as a different type of event than a search term clickthrough. |
| Host Logo Clickthrough | The clickthrough to the home page should be registered. |

Onsite Tracking Events

Once a user performs a clickthrough to a Host site via an ad unit impression, certain events will be tracked as input to the feedback mechanism. Only the events that occur during the user's session will be registered.

| Event Type | Description |
|---|---|
| Bids | Whenever a user bids on a listing then the following information should be registered: The bid event itself (so the total number of bids can be aggregated) The differential amount of the bid The absolute amount of the bid Ignore quantity of items Store in local currency If the user places a proxy bid then the proxy bid information should be tracked even if the user's session ends |
| BINs | Whenever a user performs a BIN then the following information should be registered: The BIN event itself (so the total number of BINs can be aggregated) The absolute amount of the BIN (ignore shipping costs) Ignore quantity Store in local currency |
| View Item | Whenever a user views a listing the following information should be registered: The VI event itself The category that it occurred in The product reference ID if available |

Performance Tracking Events

Performance tracking events generate data that will allow us to analyze various aspects of system performance.

Impression Events

| Impression Type | Description | Number of Impressions |
|---|---|---|
| Host Logo Impression | If a Host logo (either graphic or text) is displayed then a Host logo impression should be registered. | Once each time the logo is displayed. |

-continued

| Impression Type | Description | Number of Impressions |
| --- | --- | --- |
| Marketing Link Impression | If the Host marketing link (i.e. Ads by the Host) is displayed then this impression should be registered | Once each time the link is displayed |

Clickthrough Events

| Clickthrough Type | Description |
| --- | --- |
| Host Logo Clickthrough | If the user clicks on the Host logo to arrive at the home page |
| Marketing Link Clickthrough | If the user clicks on the marketing link and arrives at the Contextual Editor Kit page |

Performance Reporting

Performance tracking data should be accessible so that ad-hoc queries can be run in order to determine how the Contextual Editor Kit ad placements are performing. Since the analysis will be mostly ad-hoc the types of queries and aggregations will not well-known in advance.

Batch Job to Aggregate Tracking Data

This batch job takes the detailed level tracking metrics for the feedback system and aggregates them into a useful form that can be used to complete the feedback loop. The batch job should aggregate data on a weekly basis. For the feedback data at the Editor Kit level, the primary purpose is to separate the data out at a keyword-URL level so when the aggregated data is folded back into the ranking algorithm that keywords on URLs that have higher clickthrough rates or higher onsite activity will have those keywords rank higher as time progresses. When ranking keywords for a given URL, if specific {URL|Page|Domain} level aggregated feedback data exists, then this should be used in the ranking algorithm to refine the final ranking of the keyword. The feedback data should only be used if a statistically adequate number of data points (i.e. impressions) for the given keyword-{URL|Page|Domain} had been received. This should be set to 100 data points initially and be made configurable without a train roll. Otherwise the ranking algorithm should simply leverage the existing site-wide tracking data for the keyword.

Aggregated Tracking Data

The feedback data should be aggregated according to the dimensions described herein. Each week of aggregate data should be maintained so that historical trends can be taken into account during the ranking of tokens.

Data Extract Keyword Data Mart

The aggregated keyword level data should be made easily accessible. It may be advantageous to pull the entire dataset on occasion to analyze the data for various correlations to paid search performance.

Keyword Extractor and Related Searches

Feature Overview

Keyword Extractor (KE) currently suggests keyword+category combinations only if the keyword appears on a page that it processes. KE cannot suggest keywords that do not appear on the page even if they are highly relevant to the context of the page. By leveraging the existing data that powers the Related Searches feature on a particular host, KE can gain the capability to suggest new and relevant keywords that do not appear in the original content of a page.

The current Related Searches feature works by aggregating data about consecutive searches performed by users. This data allows the website to know that users who search for, say "harry potter", are also likely to search for "harry potter wand" and "harry potter dvd" afterwards. These follow-on searches are automatically suggested whenever a person types in a search on a particular host.

KE combines Related Searches data with the keyword data extracted from a page. This could be done in a variety of circumstances, such as when page content is sparse, the page content is of the type that does not yield an adequate number of keyword matches or when related searches may yield better relevance or have a higher expected return.

For instance, the top ranked keyword+category combination extracted from a page would be used to look up all the related searches for it. Then the related searches returned would be scored according to their relevance and expected return (although, since the related searches do not appear on the page they will not have any context data which will need to be compensated for during scoring; this could involved the use of Related Searches clickthrough rate data). The keyword+category combinations and related searches can then be combined and rank ordered as usual. The combined data can then be passed to various applications for use, such as AdContext.

All standard tracking (impression, click and post-click activity) may be monitored for keywords that are surfaced through Related Searches data so that their performance is optimized over time.

Introduction to the Contextual Advertisement Generator

Definitions

Affiliate—a person or company who drives traffic to the Host via advertising placements. Affiliates are compensated by a revenue share and ACRU commissions.

Host AdContext—an Affiliate ad that will utilize the Keyword Extractor (KE) backend to provide contextual ad content. An example of the contextual ad is illustrated in FIG. 11.

Overview of Various Embodiments

Various embodiments utilize the Keyword Extractor (KE) service for two front-end applications.
1) Editor Kit (EK)—the current EK will include the Keyword Extractor backend in addition to redesigning the ads and EK creation flow.
2) Syndicated content—allows developers to access contextual data from the Keyword Extractor.

The Keyword Extractor service can be used to automatically generate contextual EK listings. The Editor Kit has been augmented to provide the Contextual Advertisement Generator.

Editor Kit Summary:
The EK is an ad used by Affiliates to direct traffic from their web site to the Host.
Affiliates earn revenue share and ACRU commissions from the traffic they drive to the Host.
The EK dynamically displays listings from keyword search terms specified by the Affiliate at set-up.

The keyword search terms remain static after the ad is created.

Keyword Extractor Interface

Various embodiments have a direct dependency on the Keyword Extractor functionality described above. Refer to the Keyword Extractor description herein for details on the following issues.

Consumer application—use cases for the Keyword Extractor including the Editor Kit.
    Editor Kit server front-end
        Interface to extractor service
        Input parameters
        Fetch initiation
    Fetching exceptions
    Dataset returned
    No results default
    Tracking There are three use cases when the EK will interact with the Keyword Extractor (KE) service.

Previewing ads with real-time content when creating an EK.
    Rendering an ad that has been placed on a web page.
    Tracking metrics in the feedback loop between the EK and KE.

Real-time Preview

When setting up a new EK ad, an EK to KE interface interaction may occur. This interaction may include a real-time preview, as detailed in FIG. 12 for an example embodiment. Performance requirements for the real-time preview are noted in the KE description above. The dataset returned to the EK is then used to generate relevant listings as outlined above.

Loading a Published Ad

After an EK is created, the Javascript code is then embedded into a web page's source code. The ad is then considered published. The ad will load once the web page is rendered, and the EK to KE interface interaction as shown in FIG. 13 may occur. The URL used for a published ad is the web page that the ad is placed. The URL submitted by the Affiliate at creation should not be used after the preview. Both the category ID(s) and site ID are the parameters specified by the Affiliate at creation. The KE service will return the top overall keywords if there is a Fetch error or if no keywords are found. The top keywords are described in the KE description section above.

Data Warehouse Reporting

A subset of the data tracked by various embodiments herein will be tracked by the Data Warehouse (DW). This data will be used to evaluate the performance of the Contextual Advertiser. The events and dimensions listed below have been defined in the KE description above. The following events may be tracked in the DW.

1) # of Impressions
2) # of Clickthroughs
3) # of View Item Pages viewed
4) # of Bids
5) $ of Bids
6) # of BINs
7) $ of BINs
8) # of Registrations The DW should track the above events by each of the following dimensions.

1) Asset Type
2) Site ID
3) Application+version
4) Date/Time
5) Domain
6) Ad type
7) Ad format
8) # of Listings displayed
9) Custom Display Options
10) Category Hint
11) Display Rank—for example, when listings and keywords are included in an ad, there will be a display rank of 1 for the top item for each of those assets.
12) Algorithm+version
13) KW Rank per listing—this refers to the rank described above.
14) Ad color theme—fixed only
15) Manual/Automatic—identifies if the metric event was attributed to an automated CA (using the Keyword Extractor) or the manual version (Affiliate chose the keywords).

Impression Tracking Pixel

Tracking pixels for both Commission Junction (CJ) and Mediaplex should be added to all ads. Commission Junction (CJ) and Mediaplex are well-known advertising-related services. These pixels will trigger CJ and Mediaplex to record an impression each time an ad is rendered.

Commission Junction Pixel

Below is the code for the CJ tracking pixel in an example embodiment.

```
<img src="http://www.ftjcfx.com/image-PID#-AID#"
width="120" height="120"
alt="Click here for Host.com!" border="0"></a>
```

PID# should be replaced with the PID provided by the Affiliate when the ad was created.
AID# should be replaced with the corresponding # for each site Mediaplex Pixel Below is the code for the Mediaplex tracking pixel in an example embodiment.

```
<script language=javascript>
mpt = new Date( );
mpts = mpt.getTimezoneOffset( ) + mpt.getTime( );
document.write("<a href=\"http://adfarm.mediaplex.com/ad/ck/ ROTATION_ID?"
+ "mpt=" + mpts
+ "\"><img src=\"http://adfarm.mediaplex.com/ad/tr/ ROTATION_ID?" +
"mpts=" + mpts
+ "\" alt=\"MPLX testing\" border=\"0\"></a>"
);
</script>
<noscript>
<a href="http://adfarm.mediaplex.com/ad/ck/ ROTATION_ID ">
<img src="http://adfarm.mediaplex.com/ad/tr/ ROTATION_ID "
alt="MPLX testing" border="0">
</a>
</noscript>
ROTATION_ID should be replaced with the corresponding # for each site
```

Cache Busting

In order to obtain more comparable impression counts between Mediaplex/CJ and Host, it is recommended to include cache busting. In the description below, replace all occurrences of [CACHEBUSTER] in the ad tags below with a value using one of the following two Cache Buster types.

1. Time Date Stamp (down to the millisecond or smaller time interval)
2. Random Number Generator (at least 4 digits)

The Cache Buster value must be identical on all ad tag components for each ad placement. Proper cache busting ensures the correct clickthrough URLs are delivered, and ensures correct banner weighting/rotation.

Debug Mode
  System debugging can be supported as follows.
  Create a new debug parameter for the EK javascript sniplet that only works in XML mode
  If the debug parameter is set to true, then display the debug information, otherwise do not display the debug information
  The debug information that is displayed should be the data supplied by the Keyword Extractor
    Keyword data: Keyword, rank, score, display rank, etc.
    Category data: Category ID, category name, score, etc.
      If possible, any other metadata related to the URL and captured by Keyword Extractor (i.e. last refetch time, next refetch time, etc.)
  The debug information should be formatted to be easily readable within the XML output
  If the sniplet is displaying normal HTML, do not display debug information
  The debug mode should work both on QA and Production environments.
  Debug mode is not required for the API.

Partner Contingency (PC)
  Partner contingency functionality can be supported as follows.
  A PC wire off option can be added to the KE integration with the CA.
    This will preclude the CA from relying completely on the Keyword Extractor to function.
    When the Keyword Extractor is wired off, the CA will only allow the manual method of choosing keywords.

Editor Kit Content Generation
  This section describes how the dataset returned from the KE service will be used to generate ad content for the EK.

Character Encoding
  All data from the Keyword Extractor will be character encoded in UTF-8 in an example embodiment. The Editor Kit must do the necessary conversion to match the EK content with the character encoding of the Affiliate's URL.

Scrubbed Keywords
  The keywords used by the EK should be scrubbed of the blacklisted keywords from the sources listed below.
    Host blacklist
    Affiliate-specified
    Paid IM Triton blacklist
  The excluded keywords should be based on a precise match.

Host Blacklist
  The most current keywords on the SIBE blacklist should be excluded from the keywords used for the EK.

Affiliate-specified Exclusions
  Affiliates may specify a keyword exclusion list when creating their EK. This functionality exists today with the current EK. These keywords should also not appear in the keyword section of the newly-designed ads.

Search Listings Content
  This section details the criteria used to determine which search listings should be displayed in the EK ads.

Search Listing Criteria
  The generated search listings should use the current Editor Kit functionality. Below are the current defaults used by the EK (mirrors search front-end default).
    Primarily searches Host core, both auctions and buy it now listings.
    Store listings are used as a back-up if no core listings are available.
    The sort option defaults to "Time: ending soonest".

EK-specific Default:
  Only listings with time left greater than some time limit (e.g. two hours) should be included. Make this parameter configurable to a shorter time without the need for a train roll. The keywords and categories from the KE service will be used to populate the EK with relevant search listings. Use the slot selection process below to select which keywords generate each listing.

[Keyword+Category] Slot Selection Process
  When the keyword set is retrieved from the URL-to-keyword cache the keywords must be assigned to the slots within the ad. The process to perform this assignment does so with a probabilistic selection process. Each [keyword+category] combination has a value assigned to it. This value indicates the probability that this keyword can be selected for a given ad slot. For each ad slot, starting with the first slot, a game must be played to determine which [keyword+category] from the entire set will win the ad slot. Once a [keyword+category] combination wins a slot, it is removed from consideration, for the current instance of the ad, and the game is played for the next slot and the remaining [keyword+category] combinations left in the set. To play the game, normalize the entire set of [keyword+category] values and assign each on a range from zero to one proportional to their value. [keyword+category] values that are relatively higher than other values in the set will be assigned a larger range. Then randomly generate a number from zero to one; the random number generator should have an even distribution. The random number will fall into the range of one of the [keyword+category] combinations and indicates that it has won the game for the specific ad slot. The winning [keyword+category] combination should be removed from gameplay and then the range assignments should be re-calculated for the next ad slot based on the remaining [keyword+category] combinations. The game should be played until all the ad slots are filled or all the [keyword+category] combinations are used. Note that each time an ad is played the game should be played, which may result in a different keyword-to-slot assignment each time.

$$R(KW_n) = \frac{V(KW_n)}{\sum_{i=1}^{k} V(KW_i)}$$

$R(KW_n)$ is the range of the $n^{th}$ [keyword + category]
$V(KW_n)$ is the value of the $n^{th}$ cached [keyword + category]

FIGS. 14-17 illustrate a flowchart to diagram the slot selection process in an example embodiment. If the ad layout is the tab-based Flash ad, the same selection process should be used to generate the keywords.

Editor Kit Ads
  This section describes the formats, colors, sizes and components of the EK ads in an example embodiment.

Ad Formats

In an example embodiment, there are three types of EK ads as follows.

Graphic and text
Text-only
Flash.

Graphic and Text Ads

The graphic and text ads incorporate the following content in an example embodiment.

Search listings (including images, titles, BIN prices/auction bids, time left)
Keywords
Categories (if available)
Search box
Host logo
Viral marketing link Graphic and text ads are available with a fixed color scheme as pictured in FIG. 18 in an example embodiment.

Graphic and text ads are also available as customizable ads. These ad designs do not include the horizontal stripe at the bottom. Examples of customizable ads are pictured in FIG. 19 in an example embodiment.

Text Only Ads

Text only ads will not include any graphics including listing images, logos or the horizontal stripe. The default color scheme for the text-only ads may be as follows.

White background (#FFFFFF)
Black text (#000000)
Blue link text (#1D368B)
Dark grey border (#333333)

Examples of the text ads are pictured in FIG. 20 in an example embodiment.

Flush Ad

Macromedia Flash Requirements

Conventional Flash 8 can be used to build the Flash ads. This version of Flash should allow .gifs to appear in the Flash ad.

Tab-based Flash Ad

There may only be one type of Flash ad created for a particular embodiment. It may be available in five different sizes. No other color options are available for this Flash ad. Flash ads will always use the "Top Keywords" as the fall back for null search results. Most-watched items will not be an available fall back option for null search results. Below is a table of the behavior for the different sizes

| Size | Tab Selection | Accessing the KW Search Results pages | If <3 keywords available | If < than 3 listings available per keyword | Notes |
|---|---|---|---|---|---|
| 468 × 60<br>728 × 90<br>300 × 250 | Mouseover | Click once on hyperlinked tab. | A keyword is required to generate a tab. There should never be a tab with no keyword listed, | If there are only 1 or 2 listings available for a keyword, then display those listings and leave the remaining space on the right blank. | Use case: If a user mouses over the tab of kw2, then it will select that tab; If clicking the tab of kw2, it will open a new browser window with that keyword's search results* page on Host. |
| 120 × 600<br>160 × 600<br>Vertical Skyscrapers | Click on tab | Click on hyperlinked KW of the selected tab. In order to see the search results page for a KW of another tab, first click on that tab and then click on the KW link to land on the search results page for that KW. | | | Reason for the different behavior for the skyscrapers: the vertically stacked buttons don't work well with mouseovers. |

*refers to the search results page on the Host site for that particular keyword. For example, when a user searches for "iPod" from the Host homepage, they land on this search results page: hftp://buy.ebay.com/ipod. A visual example of the tab-based flash ad in an example embodiment is shown in FIG. 21.

Flash Sniffer

It should be determined if the user who is viewing the Flash ad has Macromedia Flash 8 installed on their machine. If a user does not have Flash 8 installed, they will not be able to see the ad correctly. A contextual graphic and text ad should be displayed as the back-up for the Flash ad. One embodiment may do a silent downgrade (detailed below) to a text and image ad when Flash isn't installed on the user's machine.

1 Silent Downgrade to Graphics and Text

Page loads

JS include (query: testFlash=true)->backend detect HTTP request if—accept Macromedia Shockwave/Flash if YES Drop JS for flash Detect flash version—is flash version 8?

if YES display flash ads if NO

JS include (query: flash=false)—return "Graphics and Text" Ads if NO return "Graphics and Text" Ads Ad Sizes The size selection has expanded to accommodate the new sizes defined by the Interactive Advertising Bureau (IAB).

Fixed Sizes

The sizes available for each ad format are listed below. Each size has a fixed layout that is not configurable by the Affiliate.

Ad Colors

Fixed and customizable color themes are available for graphic/text and text-only ads. There may be no color choices for the Flash ads.

Fixed Color Schemes

The fixed color schemes available for each ad format are listed below. Fixed color schemes are not configurable by the Affiliate.

| Standard (Image/Text) | Text-only | Flash |
| --- | --- | --- |
| Host Stripe (default) | Host Stripe (default) | None |
| Red | Red | |
| Yellow | Yellow | |
| Blue | Blue | |
| Green | Green | |
| Orange | Orange | |
| Burgundy | Burgundy | |
| Dark Green | Dark Green | |
| With a white background: | With a white background: | |
| Host Stripe (default) | Host Stripe (default) | |
| Red | Red | |
| Yellow | Yellow | |
| Blue | Blue | |
| Green | Green | |
| Orange | Orange | |
| Burgundy | Burgundy | |
| Dark Green | Dark Green | |

Below are examples of the fixed color schemes that may be available in the color scheme drop-down. The Host Brand

| Standard (Graphic/Text) | Text-only | Flash |
| --- | --- | --- |
| 300 × 250 (Medium Rectangle) | 300 × 250 (Medium Rectangle) | 300 × 250 (Medium Rectangle) |
| 250 × 250 (Square Pop-Up) | 250 × 250 (Square Pop-Up) | 468 × 60 (Full Banner) |
| 240 × 400 (Vertical Rectangle) | 240 × 400 (Vertical Rectangle) | 728 × 90 (Leaderboard) |
| | | 120 × 600 (Skyscraper) |
| 336 × 280 (Large Rectangle) | 336 × 280 (Large Rectangle) | 160 × 600 (Wide Skyscraper) |
| 180 × 150 (Rectangle) | 180 × 150 (Rectangle) | |
| 468 × 60 (Full Banner) | 468 × 60 (Full Banner) | |
| 234 × 60 (Half Banner) | 234 × 60 (Half Banner) | |
| 120 × 90 (Button 1) | 120 × 90 (Button 1) | |
| 120 × 60 (Button 2) | 120 × 60 (Button 2) | |
| 120 × 240 (Vertical Banner) | 120 × 240 (Vertical Banner) | |
| 125 × 125 (Square Button) | 125 × 125 (Square Button) | |
| 728 × 90 (Leaderboard) | 728 × 90 (Leaderboard) | |
| 160 × 600 (Wide Skyscraper) | 160 × 600 (Wide Skyscraper) | |
| 120 × 600 (Skyscraper) | 120 × 600 (Skyscraper) | |
| 300 × 600 (Half Page Ad) | 300 × 600 (Half Page Ad) | |

Custom Size

Affiliates can customize the size of a graphic/text or text-only ad. Flash ads are only available at the fixed sizes. The custom size ad uses the existing functionality that the EK create page currently allows. The following parameters are configurable in an example embodiment.

Width (in pixels)

# of Listings

Minimum height (in pixels)

Single listings are stacked vertically in the ad layout. The ad will flex to the specified width. Keywords and categories can't be added to the custom size layout.

themes with the single color are also available with a white background. FIG. 22 illustrates fixed color theme examples in an example embodiment.

Custom Color

Affiliates can customize the colors of a graphic/text or text-only ad. The configurable color options in an example embodiment include the following.

Background color

Border color

Text color

Link color

Colors can be specified by hex number or by choosing a shade on the color wheel.

Ad Components

Each component within an ad is highlighted in the figure pictured in FIG. 23 in an example embodiment. FIG. 23 illustrates an Ad Components Legend in an example embodiment. All links should open up the landing page in a new window.

Listings

The contextual listings are generated from the process detailed in the embodiments described herein.

Product Image

The product image for a listing should be resized according to the ad size specifications. No product images should appear in the text-only ads. Product images should link to the View Item Page (VIP) for that featured listing.

Title Text

The listing title should display at a maximum of 3 lines. Any titles that are longer than 3 lines will be truncated with an ellipses ( . . . ) at the end. Shorter listing titles can appear as just 1 or 2 lines. The title text should link to the View Item Page (VIP) for that featured listing.

Price Display

For Buy It Now items, the price should be shown as "Price $x.xx". For Auction listings, the price should be shown as "Current Bid $x.xx".

Time Left

Check ad specifications to see if Time Left is included. Not all ad sizes will include this component. Time Left should display according to the following specifications.

| Actual Time Left | Ad Text Displayed |
| --- | --- |
| More than 24 hours | Display days and hours left |
| 24 hours or less | Display hours and minutes left |

Buy it now items should not display Time Left. The Buy It Now graphic should appear instead.

Search Box

Searches made in the search box will use the same default parameters used for searches from the Host homepage. Parameters include the following.
- Core searches are the default. Store searches only appear if no core results available.
- Sorting should default to listings ending the soonest displaying first.

The system includes Affiliate tracking for the EK search box. A search is initiated when the user clicks the Go button. A search can also be initiated by hitting the <enter>key. The search box may be pre-populated with "Search Host". When the user clicks on the search box, this text should disappear and a blank box with a text cursor should remain.

Categories

Those ads that include a categories section should display categories in the following order of priority.
- Categories specified by the Affiliate when creating the EK.
- Any additional categories returned by the KE service.
  - These categories should only be subcategories of the categories specified by the Affiliate.
  - The root category should never be displayed as a category.

If no categories are returned by the KE service or specified by the Affiliate, no categories should be shown. The keywords section will instead be extended into the categories section.

Host Tools

An example of a Host Tools page is illustrated in FIG. 24 for an example embodiment.

Create Your Own Ad page

An example of a "Create Your Own Ad page" is illustrated in FIG. 25 for an example embodiment. The user interface (UI) mock-ups in this document are for a visual example only.

Page Header

The Host Header as noted in the figures will remain as it does on the current page. Included elements—Host logo, site navigation, search, user greeting, breadcrumb trail, Sun logo.

Navigation Buttons

The three button icons in the upper right-hand corner of the page (FIG. 25) will link to the following pages.
1) Comments—Link to a discussion board that will be dedicated to the Contextual Ad.
2) Customize—Link to the Advanced Options pop-up
3) Help—Link to the Contextual Ad hub page Content Selection As shown in FIG. 25, Content selection determines if the new Editor Kit will use the Keyword Extractor backend (Automated) or the manually-selected keywords (Manual).

Automated

Automated is the default selection in the Content Selection drop-down. The "Website Address" field is a required field. The Keyword Extractor will fetch keywords from this URL for the real-time preview.

Manual

An Affiliate may choose to manually enter in keyword filters. The EK does not use the KE service under the "Manual" option.
- Multiple keywords can be input as separate keywords. These keywords will be comma-delimited.
- The backend processing will rank the keywords in ascending order, based on the order the Affiliate entered them in the keyword field.
- Each keyword is then filtered by the category filters provided by the Affiliate.
- The minimum # of keywords required is 1.
- The maximum # of keywords is 20.
- If no category is specified, then the keywords will be searched across all categories.
- The game will still be played to generate ad content.
- The Editor Kits that use the current manual keyword method should still function correctly after the Contextual Advertiser launches.

For example, a user types in harry potter, eragom. The user then selects Books >Children's Books and DVDs as two category filters. The backend processing will play the game with the following ranked keyword+category combinations.
1. harry potter+Children's books
2. harry potter+DVDs
3. eragom+Children's books
4. eragom+DVDs If "Manual" is selected, "Website Address" is replaced with "Keywords" as a required text field. A checkbox for searching "Title & Description" is added next to the Keywords text field. An example of choosing manual content is shown in FIG. 26 for an example embodiment.

Category Selection

As shown in FIG. 25, affiliates may choose categories to filter their ad content. These selected categories serve two functions.

Category hint(s) used by the Keyword Extractor to filter relevant keywords.
Category filter(s) used by the EK to filter search listings.

Categories Pop-Up

A pop-up layer may be used for Affiliates to select categories. This HTML pop-up layer is similar to an AJAX pop-up layer used to choose categories. Affiliates should not be required to choose the deepest subcategory possible. FIGS. 27 and 28 illustrate category selection in an example embodiment.

Category Selection Behavior

When the user first lands on the "Choose a Category" dialog, the behaviors below apply.
 a. Only the first column is shown and nothing is selected.
 b. The "Category #" text box is blank.
 c. Nothing appears under "Categories you have selected".
When the user selects a category (any level), the behaviors below apply.
 a. The next level appears (if the selected category is not a leaf).
 b. The "Category #" text box gets updated with the currently selected category number.
 c. The last item under "Categories you have selected" is updated.
  i. If there are none yet, or if the user just clicked on "Add another category", add an item.
  ii. If there are none yet, also add the "Add another category" link.
When the user clicks on the "Add another category" link, the behaviors below apply.
 a. Only the first column is shown and nothing is selected.
 b. The "Category #" text box is blank.
When the user clicks on the "Remove" link next to an item under "Categories you have selected", the behaviors below apply.
 a. Only the first column is shown and nothing is selected.
 b. The "Category #" text box is blank.
 c. The item under "Categories you have selected" is removed.
  i. If this was the only category in the list, also remove the "Add another category" link.

Selected Categories Display

All selected categories may appear on the main page after the AJAX window has been saved and closed. These selected categories should include the breadcrumb paths. See the selected category display mock-up illustrated in FIG. 29 for an example embodiment.

Advanced Options

Advanced Options will be displayed in an AJAX dialog (see Tools in the "Create Your Own Ad" page).

Advanced Options Pop-up

A pop-up layer is used for Affiliates to select advanced options. See the Tools in the "Create Your Own Ad" page section.

| Left-hand Pane | Right-hand Pane Options | Notes |
|---|---|---|
| Filters | Excluded Keywords: text field see Affiliate-specified Exclusions Include specific Seller IDs: text field Price Range: text fields for minimum and | All filters exist as options for the current EK. These options |

-continued

| Left-hand Pane | Right-hand Pane Options | Notes |
|---|---|---|
| | maximum price Show items with Gallery images only: filters the displayed listings to only those that have a gallery image Buy It Now Items only: check box Charity ID: check box and charity ID text box | will function for the new EK as they do for the current EK. |
| Display Options | Sort options: drop-down including Items ending first (default) Newly-listed items first Lowest prices first Highest prices first If no search results: radio buttons Use most popular keywords (default). Display top most-watched items. Include a field box to enter categories #'s and a link to http://listings.ebay.com/aw/listings/list/categories.html | All sort options exist for the current custom EK option. Sort options will be extended to all EK ads. These options will function for the new EK as they do for the current EK. Added the most popular keywords option. The category # entered in the most-watched items text box will not be validated in the pop-up layer. The category # will be validated after the preview button is clicked. An invalid category # will generate an invalid error code. |

Charity Filter

A filter can be added to allow for only charity listings to be displayed. This filter will be triggered when a checkbox is selected. The charity checkbox should not be selected by default. A charity ID can be specified to narrow the displayed listings to a specific charity. There is currently an API that allows for charity-specific listings to be returned when a charity ID is supplied. (http://developer.ebay.com/DevZone/SOAP/docs/Reference/Host/io_GetCharities.ht ml). The charity ID filter will not be configurable in the 'Create Your Own Ad' page. The default will be to include all charities.

Icon Links

Add or Remove Options 

The ? in the upper right-hand corner or the Advanced Options pop-up should link to the Contextual Ad Hub page.

Selected Advanced Options

All selected advanced options should appear on the main page after the AJAX window has been saved and closed. See the mock-up illustrated in FIG. 30 for an example embodiment.

Preview Ads

Preview Button

The preview button triggers the generation of ads in the preview area. As stated earlier, if "Manual" is selected, the current EK functionality is used. The KE service is not called.

The Refresh button must be clicked in order to update the preview ads with any user changes.

Reset Button

The reset button will clear all fields populated by the Affiliates. This includes any options selected in the Advanced Options and Category Selector pop-up windows. All fields should revert back to their default state. The reset button should trigger a warning message pop-up. An Affiliate must click on OK before the reset is completed.

Error Messages

When an Affiliate clicks on the Preview button, the following errors may occur.

| Error Type | Error Message | Page Treatment | Comments |
|---|---|---|---|
| Required fields not populated | Please enter required information. | Add messaging next to the form field missing the required input. Text should be in red. | Required fields: Tracking Provider, ID (unless 'Not an Affiliate' chosen), URL (if Automated chosen) or Keywords (if Manual chosen) |
| Unacceptable URL | Invalid Web address. Please check restrictions and re-enter the Web address. | Add messaging next to the "Website Address" field. Text should be in red. | Only http URLs are acceptable. According to the Keyword Extractor requirements, The only protocol that will be supported is HTTP. HTTPS will not be supported. The URL should be for an HTML document and not some other file format (i.e. JPG, PNG, AVI, etc.) |
| KE Fetching Exceptions | Invalid Web site address. Please check restrictions and re-enter the Web site address. | Add messaging next to the "Website Address" field. Text should be in red. | See the KE description above for details |
| No content found | No keywords found. Please enter another Web address or use the manual option to select keywords. | Add messaging next to the "Website Address" field. Text should be in red. | |

The reloaded pages with error messaging should retain any selections and inputs the Affiliate has already made. See the mock-up illustrated in FIG. 31 for an example embodiment.

Loading Graphic

An animated loading graphic will appear when the back-end call is initiated. The graphic will continuously run until one of the following occurs.

- The Keyword Extractor successfully returns assets and all updated ads are displayed in the preview area (see Preview Area)

OR

- An error occurs and the Create Ad page is redisplayed with the error messaging (see Error Messages)

Preview Area

The preview area is where the ads are displayed with real-time content. Affiliates can select color and size in this area. They can copy the code directly from this section into their source code. See the mock-up illustrated in FIG. 32 for an example embodiment.

Color Scheme

A drop-down of available color themes will display at the top of the Preview section. The color scheme drop-down will not appear for Flash ads. The default selection will be the Host Stripe. Custom Color/Font will be the last option in the drop-down. This selection will extend the section to display color and font options. The ads displayed will change to the color scheme selected by the Affiliate in real-time.

| "Select Color Scheme" Drop-down | Standard (Image/Text) | Text-only | Flash |
|---|---|---|---|
| Color Schemes Included | Host Stripe (default) Red Yellow Blue Green Orange Burgundy Dark Green With a white background: Host Stripe (default) Red Yellow Blue Green Orange | Host Stripe (default) Red Yellow Blue Green Orange Burgundy Dark Green With a white background: Host Stripe (default) Red Yellow Blue Green Orange | None |

-continued

| "Select Color Scheme" Drop-down | Standard (Image/Text) | Text-only | Flash |
|---|---|---|---|
| Custom Color/Font Available? | Burgundy Dark Green Y | Burgundy Dark Green Y | N |

Custom Color Scheme

When a user chooses "Custom Color/Font" under the Color Scheme drop-down, the default "Custom" template ads appear in the preview area. These default templates will have a dark gray border and white background as depicted in the ad specifications.

The Color Scheme section will expand to show the following options.

Background color
Border color
Link color
Text color
Font

If the user wants to enter in their hex values, they can do it directly in the text boxes on the main page. The color graphic next to the text box should update to reflect the manually updated hex value. A custom color mockup is illustrated in FIG. 33 for an example embodiment.

Color Picker

The color picker appears when a user is selecting a color in the custom color or custom ad sections. When choosing a specific color, a user can perform the following actions.

1. Enter in the hex value of the color they want in the text box.
   If an invalid hex color is entered, an invalid error is displayed and the previous color should not be over-written
2. When clicking on the color box, the popup layer opens near where the mouse is located.
   When mouse-ing over colors, the Hex Color input changes to reflect which color you're moused-over
   When clicking on a color, the corresponding input and color box are changed on the main page.
   When mouse-ing out of the color picker, the color picker closes
   Only one color picker can open at a time. Clicking on other color boxes, will move the color picker and associate to that color option.
   The "Hex Color" in the pop-up should only be changed by the color picker.

An example of a color palette in an example embodiment is shown in FIG. 34.

Font

When the custom color theme is chosen, a "Font" drop-down should also appear. The font options should appear in a drop-down.

Arial Medium (default)
Verdana Medium
Times Medium
Verdana Small
Times Small

Size Drop-down

A drop-down of all available sizes will display. The default size in the drop-down will be "All". The last listed size in the drop-down will be "Custom Ad". When a specific size is selected, the page will scroll down to that specific size. "Custom Ad" will not appear in the size drop-down for Flash ads.

| "Select Size" Drop-down | Standard (Image/Text) | Text-only | Flash |
|---|---|---|---|
| Sizes Included | 300 × 250 (Medium Rectangle) 250 × 250 (Square Pop-Up) 240 × 400 (Vertical Rectangle) 336 × 280 (Large Rectangle) 180 × 150 (Rectangle) 468 × 60 (Full Banner) 234 × 60 (Half Banner) 120 × 90 (Button 1) 120 × 60 (Button 2) 120 × 240 (Vertical Banner) 125 × 125 (Square Button) 728 × 90 (Leaderboard) 160 × 600 (Wide Skyscraper) 120 × 600 (Skyscraper) 300 × 600 (Half Page Ad) | 300 × 250 (Medium Rectangle) 250 × 250 (Square Pop-Up) 240 × 400 (Vertical Rectangle) 336 × 280 (Large Rectangle) 180 × 150 (Rectangle) 468 × 60 (Full Banner) 234 × 60 (Half Banner) 120 × 90 (Button 1) 120 × 60 (Button 2) 120 × 240 (Vertical Banner) 125 × 125 (Square Button) 728 × 90 (Leaderboard) 160 × 600 (Wide Skyscraper) 120 × 600 (Skyscraper) 300 × 600 (Half Page Ad) | 300 × 250 (Medium Rectangle) 468 × 60 (Full Banner) 728 × 90 (Leaderboard) 120 × 600 (Skyscraper) 160 × 600 (Wide Skyscraper) |
| Display "Custom Ad" | Y | Y | N |

FIG. 35 illustrates an example of a color/size drop down in an example embodiment.

Custom Ad

When selected, the preview section will expand to include custom color, font, logo size, and these following options.

Custom Size: (Show Only with Custom Ad)
    Width in pixels—default is 570
        Valid input range: 120-800 px
    Minimum height—no default, should be blank
        Max value: 20,000 px
    # of Listings—default is 2
        Valid input range: 1-200 items Custom Title (Show Only with Custom Ad)
    Title text
    Title text color
    Title font
        Arial Medium (default)
        Verdana Medium
        Times Medium
        Verdana Small
        Times Small
    Body font
        Adal Medium (default)
        Verdana Medium
        Times Medium
        Verdana Small
        Times Small
    Title background color Show Columns: (Show Only with Custom Ad)
    Gallery image
    Time left
    Number of bids
    Only gallery images Show Column Limitations by Size The table below outlines which "show columns" are available by size. The first column indicates the minimum width needed to fit the X'd show columns on the right. For example, if a user chooses the width of their ad to 340 or above but below 455, they are limited to 45 characters in their title, a gallery image, title and current price only. The checkboxes for the show columns are used to remove any show columns that the user does not want to appear in the ad. The remaining ad content will expand—no empty columns should appear.

| Minimum Width (in pixels) | Title Character Limit | Gallery Picture | Title | Current Price | Bids | Time Left |
|---|---|---|---|---|---|---|
| 570 | 76 chars | X | X | X | X | X |
| 500 | 76 chars |   | X | X | X | X |
| 455 | 60 chars | X | X | X | Either option | |
| 340 | 45 chars | X | X | X |   |   |
| 315 | 40 chars |   | X | X |   | X |
| 270 | 35 chars |   | X | X | X |   |
| 120 | 13 chars |   | X | X |   |   |

Custom Preview Section

When Custom Ad is selected, only an ad template will appear in the preview section. This template should reflect the real-time changes that are being made in the custom fields above. This preview template is identical to the existing functionality of the current EK ad. None of the new ad formats can be used when the custom ad is chosen. The updated Javascript code should be displayed next to the ad template.

Custom Ad—Title Text

The custom ad title is user text that can be added to a custom ad. This is existing functionality that the EK currently offers. The title text is added below the Host logo in the ad (see screenshot below). The default text color is black (#000000). 90 characters maximum are allowed. The title text may wrap depending on the size of the ad. Further customization is allowed. An example of custom ad title is shown in FIG. 36 for an example embodiment.

Custom Ad—Invalid Input Errors

For the custom size fields, user inputs that fall outside of the valid range will receive the following errors.
    Width: Please enter a width between 120-800 pixels.
    # of items: The # of items should be between 1-200 items.
    Min Height: Minimum height cannot exceed 20000 pixels.

Displayed Code for Each Ad Size

The corresponding Javascript for each ad should appear next to the ad preview. The Copy Code button will serve as a "hot key" to automatically highlight the code and trigger the copy function (ctrl-c). The URL included in the JS should have the tracking information embedded. An example of the Create Your Own Ad page is shown in FIG. 37 in an example embodiment.

Tools in the "Create Your Own Ad" Page

The AJAX and dialogs sections should be referred to for the Category Selection and Advanced Options sections in this document.

AJAX

Asynchronous JavaScript and XML, or AJAX, can be used to enable features to update the page without refreshing the entire page. Features can leverage AJAX and retrieve new data from the server asynchronously without stalling the Affiliate's interaction with the page. The result is a more responsive interface, since the amount of data interchanged between the web browser and web server is vastly reduced.

Example application: When the seller selects a meta category on the Browse Category page, the system will post the seller's selection to the sever and fetch the list of L2 categories for that the selected meta without reloading the page. The information exchanged between the client and the server will be kept to the minimal to minimize load time.

Dialogs

The following is a general description of the Advanced Options and Category dialogs. Additional components will be specific for each individual dialog.
    Display logic
        When a dialog is displayed, the parent form page will be grayed out and disabled. The seller will not be able to interact with features on the parent form page.
        The dialog will be automatically centered on the browser form page (excluding the help pane if it's visible). The dialog will be displayed to the maximum size allowed within the browser window or the maximum dialog size defined.
        When a dialog is dismissed, the features on parent form page will enabled.
    Display style
        Dialog size
            Fixed size dialog
                Width: 550 pixels
                Height: 350 pixels
            Flexible size dialog Minimum
    Width: 550 pixels
    Height: 350 pixels
Maximum
    Width: 90% of browser width not to exceed 1450 pixels
    Width: 90% of browser height not to exceed 950 pixels
Drag-able: Yes
Events
    Resize of the browser window
        When the browser window is resized, the system will reposition and resize (if it's a flexible dialog) the dialog based on the display logic.
    Dragging of the Title bar
        Dialogs will be movable if the user clicks and drags the title bar area.
        Dragging will not resize the dialog.

Disabled Javascript

If a user has disabled Javascript, the EK Create page should still be accessible. The real-time preview ads and the AJAX layers will not be appear. All non-JS features should still appear.

Disabled Javascript Warning

When a user lands on the "Create Your CA" page, a sniffer should detect if the user has turned off JS on their machine. If the user does not have JS enabled, a warning window should pop up directing the user to enable JS in their browser options.

Keyword Extractor API Call

There is an API call that will allow affiliates to access the Keyword Extractor service dataset. The keywords that the API returns should be scrubbed against the Host Blacklist. A configurable parameter should be added to limit the number of keywords returned. The default will be set at no limit. This limit should be configurable internally without a train roll. It should not be configurable by external developers using the API. The API will interface with the Keyword Extractor service. The real-time preview should not be accessible via the API.

Various embodiments of the Contextual Advertiser Frontend have revamped the Editor Kit by redesigning the ads, simplifying the ad setup flow and integrating the Keyword Extractor backend. Various embodiments will further enhance the ad as follows.

Adding another data source to the Keyword Extractor: Magellan
   Refining the ad content using additional data: geo-targeting, disallowing the same ad content from serving on multiple ads displaying on the same page, allowing the use of both Affiliate-given keywords and keyword extractor recommendations.
   Adding new components to the ads: products, Express links, saved user options.

Geo-Targeting

Host AdContext may only display content from the site ID of the Host site in which the ad was created. The ad may not take into account the site ID of the user who is viewing the ad. For example, if a German user views an American website, the Host AdContext should display a DE items and links.

Primary Requirements:

The location of a user viewing a Host AdContext advertisement generator (eAC) created advertisement should be identified and used to generate more targeted content. For example, an IP address can specify which country, region or city that a user is located.

A mapping of location to relevant site ID can either be done via a pre-defined lookup table or whatever automated method that already exists (e.g. from cross border trade logic)

Geo-targeting should be added to the Advanced Options section of the Create flow. Multiple site IDs can be supported for geo-targeting. The default site ID will be set to the site ID of the create flow (e.g. US create flow will have a default of 0). The default should be configurable by the Affiliate. Geo-targeting must be explicitly enabled by the Affiliate. Tracking geo-targeted impressions, clicks, conversion metrics, etc. should also be captured by site ID and by tracking provider.

Keyword Extractor Requirements:

The KE should use the viewer's location to determine which site ID to use for generating keyword/category recommendations. For example, if a viewer is identified as being in France, the Keyword Extractor will use Host.fr's supply, demand and conversion data to determine the most relevant keywords. The first time a viewer from a new site ID visits the Affiliate page, top keywords from the new site ID are returned. The Affiliate page for the new site ID is added to the queue to be scanned for keywords. This is how the KE currently functions when a user visits an Affiliate URL for the first time. Geo-targeting is only turned on for site IDs that have been set up by the Affiliate in the Create flow.

Affiliates can create ads featuring products with the Product Kit (non-contextual). This feature will add product data to the Host AdContext.

There should be different levels of how product data is displayed in the ads. The Affiliate should have the flexibility to choose which format they prefer, such as the following.

1. Only product data—catalog product data instead of item data is used.
2. Optimized automatically—the ad will display product data, item listings or a combination of both, depending on how "popular" the product is.

Product content can be driven by contextual recommendations from the KE and also Affiliate search terms provided at set-up.

A new product-specific histogram can be added to the current KE functionality. A site product Reference ID histogram will associate with each keyword the frequency with which users click through to an item which is associated with specific product on a per category basis. FIG. 38 illustrates a graph showing association of product reference ID to query term in an example embodiment. For each listing that a user views after a search, the product reference ID of the listing, if available, is associated with query term and the count of view item actions for that particular query term-product ID combination is incremented by 1. If a user views multiple listings after a search (i.e. repeatedly clicking back in their browser and clicking on different listings in the search results) then all of those actions are counted, if a product reference ID is available. If no product reference ID is associated with the listing then no event is registered and not stored in the histogram. Product reference ID counts at child categories should be aggregated up the category tree to parent categories. Note that the category ID may not be required, pending further investigation by ERL. Only the top n products (n=5, configurable parameter) within each category need to be stored. The rest of the data accumulated by the query index does not need to be held in the Keyword Store since, for Keyword Extractor purposes, we will only be interested in suggesting the top few products associated with a keyword.

Hybrid KW Model

The Host AdContext may only allow an Affiliate to choose either Keyword Extractor recommendations or a static list of keywords provided by the Affiliate. This feature will allow a hybrid of both sources to drive ad content.

An Affiliate can use the automated Keyword Extractor to drive content, in addition to providing keywords. These keywords can be used in the following ways.

- Use as an additional keyword to the KE recommendations
  - Either the Affiliate can specify the rotation % for each given keyword.
  - Or the Affiliate can specify that a keyword needs to be used for the top item slot.
- Use as a fallback mechanism when KE returns no or limited results.
  - Can also be used when the eAC returns too few item results.
  - Can also be used when the page has not been scanned by the KE yet.
- Use to suggest related categories and keywords.
  - User enters a KW in the create flow and the KE would then use suggest related categories and/or keywords

Multiple Ad Serving

If two or more eAC units are on the same webpage, all could potentially show the same ad content. The system can detect if multiple eAC units are displaying on one page. The system can ensure that the items displayed across multiple ads are not duplicated. The system can allow the user to differentiate between different placements, either on the same page or on different pages in their reporting.

Express/Magellan Integration

There are two methods of adding Express links to eAC. The Express Front-end feature only affects the items and URLs that are displayed in eAC. Magellan Integration adds Magellan data to the KE.

Express Front-end

These are the minimum requirements to add Express to eAC in an example embodiment.

- Items for eAC will be filtered to only include those that are available on Express.
- The item URLs will link to Express item pages.
- Changes will need to be made to the create flow and to the ads.

Magellan Integration

These requirements are in addition to the Express Front-end in an example embodiment.

- KE will need to generate histograms based on Express domains vs. Core categories
  - Supply—item and product histograms already exist per Express domain.
  - Demand—x-domain histograms already track user queries->domain(s)->item pages (available in SIBE).
  - Conversion metrics—will need to be optimized on the Affiliate model (7 days) vs. the current session model (24 hours).
- The feedback loop will need to separately track the impressions, clicks and conversion metrics of Express domains and keywords.
- If an Affiliate chooses to build an Express-specific ad, the create flow will need to change the category hints to domain hints.
- A hybrid ad with both Express and Core links included should be an option.
  - The links will self-optimize to land on the best site for keywords, categories and items.

Adding Personalization to Advertisements

Currently, Affiliate tools do not personalize ad content. RTM provides valuable data on user preferences and previous purchases. This information can further target Host ads to offer compelling recommendations to the user.

Various embodiments described herein add personalization to ads in order to increase click-through and also personalizing Host landing pages to increase conversion. Host users visiting non-Host sites can be identified (e.g. cookie sniffing) and matched with their Host user profile.

Various embodiments provide the following basic features.

- Refine Host AdContext content with personalization data using the following methods:
  - Use user-specific data to recalibrate the weightings for the KE keyword recommendation.
  - Extend KE recommendations with related keywords and categories.
  - Filter items by user preferences (e.g. BIN-only, location, etc.)
  - Build cluster profiles for users with matching attributes (segments).
- Add a personalized landing page for Internet Marketing traffic.

Personalize Host AdContext

Host AdContext uses keyword and category recommendations from the Keyword Extractor (KE) to decide what ad content to display. These recommendations are contextual to the page that the ad is placed. When a user visits an Affiliate page with a Host AdContext ad, we will check if there is a Host cookie on the user's machine.

- If yes, we will utilize their existing RTM profile to help determine the Host AdContext content.
- If no, Host AdContext will just use the Keyword Extractor as its content source.

Options on how to utilize user data to refine the ad content are described in the following sections.

Recalibrate KE Recommendations

KE recommendations can be enhanced using data to incorporate user data as an additional weighting factor when choosing ad content. This data can include the following.

- Previous buying habits
- Previous search behavior
- Previous Host site path activity
- The original scores for the KE keyword and category combinations will change based on which combos are related to a user's history.
- 2 For example, if the KE recommends the following keyword+category combinations for a page: iPod+MP3 Players, Leap Pad+baby toys and "iPod for Dummies"+computer books, and past buying behavior shows that the user has purchased many baby items from the Host in the past, then the Leap Pad +baby combination will be weighted heavier in the listing selection process.
- An algorithm that properly balances both the KE and personalization data will be essential in providing relevant and compelling ad content.
- This option does not explicitly show the user that we are personalizing the ad with their past Host behavior.
- A user's Host preferences can also be used to further refine the items featured in the ad (e.g. BIN-only, location, etc.)

Related Keyword/Categories Extension

The list of KE keyword and category combinations should be expanded for those combinations that are related to a user's history. Keywords can be expanded by related searches logic. Categories can be expanded by related categories logic.

Cluster Recommendations

Cluster profiles can be built for users with matching attributes—segments. The purchase and interest activity of these users can be tracked. These cluster interests can be used to recommend products and categories for other users that match the same attributes as the cluster.

Personalized Search Results Landing Page

When a user clicks through an Internet Marketing link, we do not personalize the Host page that they first land on. An embodiment can build a customized search results landing page with the following features.

Customized Results Set

The search results that the user sees on the landing page will be customized to a user's preferences.

Preference examples: only buys fixed price items, prefers to sort options by total price.

The preferred filters and search options for a user should be set as the default results set on this page.

RTM Placements

The landing page should also include RTM placements to the right of the results set.

These RTM placements will be used for personalized merchandising and other segment-specific ads controlled by the RTM platform.

Listings Selection Process for Host AdContext

FIGS. 39-40 illustrate a step-by-step process in an example embodiment of how the Host AdContext component selects item listings to display based on the Keyword Extractor recommendations.

Based on the various embodiments described above, systems and methods are taught herein for supporting a variety of functions related to keyword extraction and contextual advertisement generation. Among these supported features are the following features.

Post-Search Activity Analysis

Detection of an end-user interaction with a Web page, generating keywords based on the end-user interaction with the Web page, and performing a search using the keywords is described. For example, a program running on a client computer may monitor the end-user's browsing activities on the Internet. When the end-user clicks on a link, information associated with the link, such as the link's label, may be parsed and the Post-Search Activity analysis used to generate one or more keywords. The keywords may be used to perform a search to generate search results which would be the feedback responsive to the keywords. The post-search activity analysis maybe combined with inventory/listing available on the site.

User Hint

Detection of an end-user interaction with a Web page, generating keywords based on the end-user interaction with the Web page, and performing a search using the keywords is described. In one embodiment, a program monitors a—user's web browsing activity. The client program may be configured to trigger delivery of search results to the client computer when the user goes to a website in a category of websites. The search results may be responsive to one or more keywords derived from addressing information, such as the uniform resource locator (URL) of a website visited by the user.

Spidering

Detection of an end-user interaction with a Web page, generating keywords based on the end-user interaction with the Web page, and performing a search using the keywords is described. A keyword extracting device which extracts keywords by, a) monitoring the content change using frequency of spidering activity, b) using a pattern processing means and c) creating a fingerprint of content to monitor frequency of change is described.

Situation-Specific Processes

Detection of an end-user interaction with a Web page, generating keywords based on the end-user interaction with the Web page, and performing a search using the keywords is described. This is a system wherein said keyword extractor comprises plural and selectable extraction algorithms customized for different situations/content. The keyword extractor can monitor events (e.g., disaster vs. positive event) and selectively determine when to contextualize.

API for User Provided URL

Detection of an end-user interaction with a Web page, generating keywords based on the end-user interaction with the Web page, and performing a search using the keywords is described. The search results may be responsive to one or more keywords derived from addressing information as opposed to full text, such as the uniform resource locator (URL) of a website visited by the user. In general, there is no direct end-user interaction with a web page URL. The API's described herein allows a 3rd party programmer to utilize the KE service directly and receive the unformatted data to use as s/he sees fit. A URL is provided to the URL, but there may or may not be an end-user visiting that URL at that point in time the API is invoked.

Leveraging Related Searches

Detection of an end-user interaction with a Web page, generating keywords based on the end-user interaction with the Web page, and performing a search using the keywords is described. The system wherein said keyword extractor leverages on an on site feature called related searches. The related searches may be search results presented by a program including content that relates to a keyword employed by the user in the request for information. Because the keyword represents the user's interest in a topic, the chance of the user being interested in the related search content is increased.

Contextual Advertiser

A technique is described for delivering contextual information to end users using a keyword analyzing platform. Contextual information to be delivered to the end user is selected using the keyword information. According to a specific implementation, the contextual information corresponds to ad information which is provided by a campaign provider. The contextual advertiser uses keyword recommendations and categories from keyword extractor to customize the ad unit to have new ads that are flash, text and rich media advertisements. By using scores to statistically pick advertisement slots for keywords this invention gives them exposure, builds traffic and uses them optimally.

Contextual Product Toolbar

A system and method for processing a request using a contextual product toolbar is described. The method comprises the steps of a) sensing context on page and return keyword to be inserted into toolbar search box b) indicating insertion to user such that a pre-populated search box is arrived at, c) including call to action with highlighting (e.g. . . . , mouse-over, smart tag) to highlight contextual keywords on page, and d) retrieving items and populating toolbar. This functionality would either utilize an API call or directly call the KE service.

Ad Placements in Different Media

A system and method for ad placements in different media and forums like blogs, Emails, RSS and Wikis is described where the contextual information corresponds to ad information provided by a campaign provider.

Cross Asset/Site Suggestion

A system and method for generating cross asset/site suggestions which can include a product review or a product guide for a keyword or a score for a keyword is described. An important feature of this invention is the ad which suggests items that are monetized best based on the feedback, which is contextually sensitive and is not limited to listings.

Suggested Tags

A system comprising: a plurality of Web pages; a set of automatically generated suggested tags, each of which is associated with an indication of either the content of a Web page, or its relevance to certain search engine queries, or both; suggested tags associated with each of the plurality of Web pages, wherein the tag has been associated with the Web page according to the preference of a user is described.

Personalization of Keyword Suggestions

Detection of an end-user interaction with a Web page, generating keywords based on the end-user interaction with the Web page, and performing a search using the keywords is described. The systems and methods include a mechanism for providing interest and demographic data that may be applied to filter the Web page at the provider side resulting in personalization of keyword suggestions. The extracted keyword values are applied to filter content for delivery to a requesting Web client.

Referring now to FIG. 41, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Having briefly described one embodiment of the network environment in which an example embodiment may operate, FIGS. 42 and 43 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 41 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for application programming interfaces for keyword extraction and contextual advertisement generation are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method comprising:
receiving from a consumer application via a data network interface a request for activation of a keyword extraction service via an application programming interface, the request for processing by a processor of a computer system, the request including an identity of a content source, the request further including an identification of a particular extraction process of a plurality of selectable extraction processes, the particular extraction process as identified in the request is selected for use by the keyword extraction service on the identified content source, the keyword extraction service to extract un-registered keywords from the identified content source using the particular extraction process as identified in the request and to rank the extracted keywords according to performance measures obtained from tracking aggregate user behavior on a site, the extracted keywords not having been previously registered by the consumer application, the request further including a fetch interval indicating an amount of time after which the particular extraction process is repeatedly used by the keyword extraction service on the identified content source;
determining whether the keyword extraction service has already processed the identified content source and retained extracted keywords in a data store;
extracting keywords from the identified content source using the particular extraction process identified in the request; and
making the extracted keywords accessible to the consumer application.

2. The method as claimed in claim 1 wherein the identity of a content source is a uniform reference locator (URL).

3. The method as claimed in claim 1 wherein the identification of a particular extraction process includes an identification of a plurality of extraction processes, the method further including determining which of a plurality of extraction processes is most efficient for the identified content source.

4. The method as claimed in claim 1 wherein the request further including a category identifier hint indicating a starting category for the particular extraction process.

5. An article of manufacture comprising a data storage device having machine executable instructions embedded thereon, which when executed by a machine, cause the machine to:
receive from a consumer application a request for activation of a keyword extraction service via an application programming interface, the request including an identity of a content source, the request further including an identification of a particular extraction process of a plurality of selectable extraction processes, the particular extraction process as identified in the request is selected for use by the keyword extraction service on the identified content source, the keyword extraction service to extract un-registered keywords from the identified content source using the particular extraction process as identified in the request and to rank the extracted keywords according to performance measures obtained from tracking aggregate user behavior on a site, the extracted keywords not having been previously registered by the consumer application, the request further including a fetch interval indicating an amount of time after which the particular extraction process is repeatedly used by the keyword extraction service on the identified content source;
determine whether the keyword extraction service has already processed the identified content source and retained extracted keywords in a data store;
extract keywords from the identified content source using the particular extraction process identified in the request; and
make the extracted keywords accessible to the consumer application.

6. The article of manufacture as claimed in claim 5 wherein the identity of a content source is a uniform reference locator (URL).

7. The article of manufacture as claimed in claim 5 wherein the identification of a particular extraction process includes an identification of a plurality of extraction processes, the article of manufacture to determine which of a plurality of extraction processes is most efficient for the identified content source.

8. The article of manufacture as claimed in claim 5 wherein the request further including a category identifier hint indicating a starting category for the particular extraction process.

9. A system comprising:
a processor;
a memory coupled to the processor to store information related to keyword extraction; and
a keyword extraction service to receive from a consumer application a request for activation of a keyword extraction service via an application programming interface, the request including an identity of a content source, the request further including an identification of a particular extraction process of a plurality of selectable extraction processes, the particular extraction process as identified in the request is selected for use by the keyword extraction service on the identified content source, the keyword extraction service to extract un-registered keywords from the identified content source using the particular extraction process as identified in the request and to rank the extracted keywords according to performance measures obtained from tracking aggregate user behavior on a site, the extracted keywords not having been previously registered by the consumer application, the request further including a fetch interval indicating an amount of time after which the particular extraction process is repeatedly used by the keyword extraction service on the identified content source; determine whether the keyword extraction service has already processed the identified content source and retained extracted keywords in a data store; extract keywords from the identified content source using the particular extraction process identified in the request; and make the extracted keywords accessible to the consumer application.

10. The system as claimed in claim 9 wherein the identity of a content source is a uniform reference locator (URL).

11. The system as claimed in claim 9 wherein the identification of a particular extraction process includes an identification of a plurality of extraction processes, the article of manufacture to determine which of a plurality of extraction processes is most efficient for the identified content source.

12. The system as claimed in claim 9 wherein the request further including a category identifier hint indicating a starting category for the particular extraction process.

* * * * *

UNITED STATES PATENT AND TRADEMARK OFFICE
CERTIFICATE OF CORRECTION

| | | |
|---|---|---|
| PATENT NO. | : 7,831,586 B2 | Page 1 of 2 |
| APPLICATION NO. | : 11/645946 | |
| DATED | : November 9, 2010 | |
| INVENTOR(S) | : Alec Reitter et al. | |

It is certified that error appears in the above-identified patent and that said Letters Patent is hereby corrected as shown below:

On Sheet 1 of 40, in figure 1, Reference Numeral 1, line 1, delete "Affilliate" and insert -- Affiliate --, therefor.

On Sheet 2 of 40, in figure 2, Opposite Box "Return error", line 1, delete "Perameters?" and insert -- Parameters? --, therefor.

On Sheet 9 of 40, in figure 12, line 1, delete "Affillate" and insert -- Affiliate --, therefor.

Figure 14:
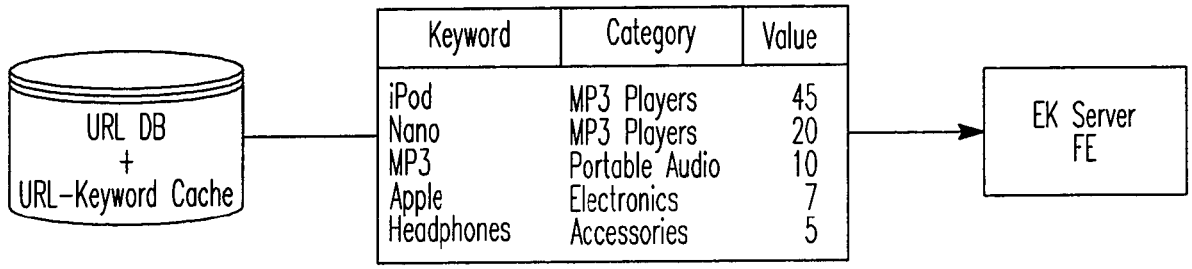
Figure 15:
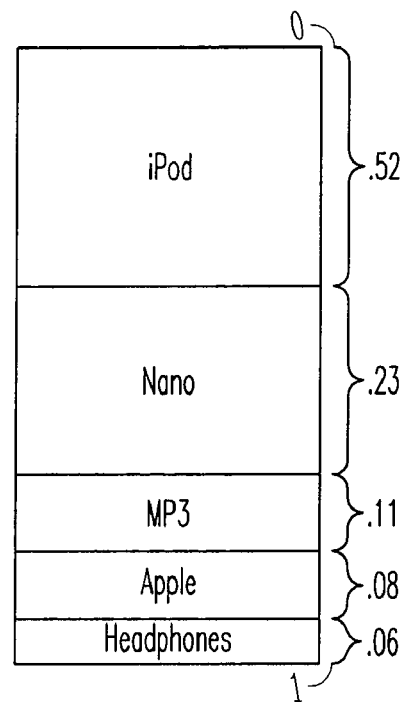

On Sheet 11 of 40, in figure 14, line 5, after "indicating the" delete "the".

Figure 16:
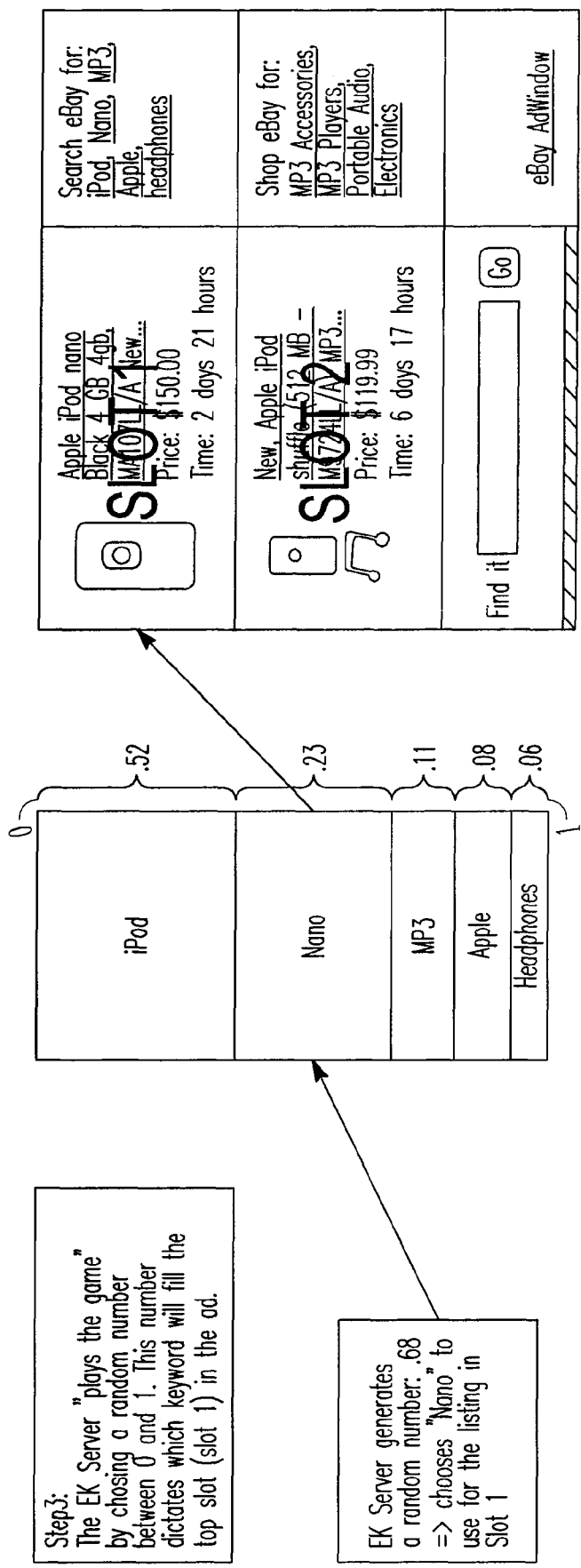

On Sheet 13 of 40, in figure 16, line 3, delete "chosing" and insert -- choosing --, therefor.

On Sheet 21 of 40, in figure 21a, line 9, delete "compatiable" and insert -- compatible --, therefor.

On Sheet 21 of 40, in figure 21a, line 19, delete "Practies" and insert -- Practices --, therefor.

Figure 24B:
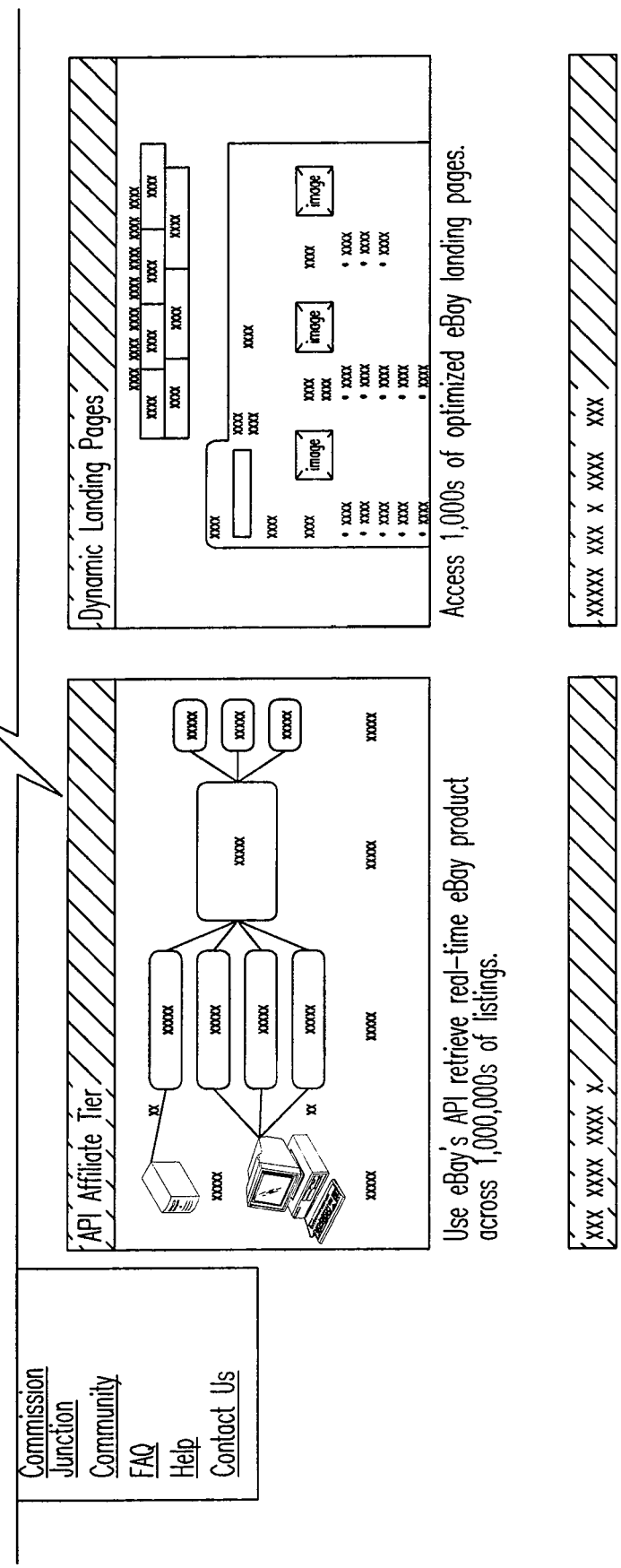

On Sheet 22 of 40, in figure 24b, line 1, delete "Comtinued" and insert -- Continued --, therefor.

On Sheet 25 of 40, in figure 27, line 2, delete "BROWASE" and insert -- BROWSE --, therefor.

On Sheet 29 of 40, in figure 31, line 1, delete "AFFLIATE" and insert -- AFFILIATE --, therefor.

On Sheet 30 of 40, in figure 32, line 1, delete "AFFLIATE" and insert -- AFFILIATE --, therefor.

On Sheet 38 of 40, in figure 40, line 2, delete "th egame" and insert -- the game --, therefor.

In column 26, line 38, after "site" insert -- . --.

In column 34, line 50, delete "eragom." and insert -- eragorn. --, therefor.

Signed and Sealed this
First Day of February, 2011

David J. Kappos
*Director of the United States Patent and Trademark Office*

CERTIFICATE OF CORRECTION (continued)
U.S. Pat. No. 7,831,586 B2

In column 34, line 56, delete "eragom" and insert -- eragorn --, therefor.

In column 34, line 57, delete "eragom" and insert -- eragorn --, therefor.

In column 40, line 5, after "written" insert -- . --.

In column 40, line 9, after "over" insert -- . --.

In column 40, line 13, after "closes" insert -- . --.

In column 41, line 25, delete "Adal" and insert -- Arial --, therefor.

In column 44, line 6, after "logic)" insert -- . --.

In column 44, line 46, delete "click through" and insert -- clickthrough --, therefor.

In column 45, line 22, after "keywords" insert -- . --.

In column 46, line 48, before "For" delete "2".

In column 48, line 26, delete "3rd" and insert -- $3^{rd}$ --, therefor.